(12) United States Patent
Lamburt

(10) Patent No.: US 6,421,683 B1
(45) Date of Patent: Jul. 16, 2002

(54) METHOD AND PRODUCT FOR PERFORMING DATA TRANSFER IN A COMPUTER SYSTEM

(75) Inventor: Leonid Lamburt, Marlboro, MA (US)

(73) Assignee: Verizon Laboratories Inc., Waltham, MA (US)

( * ) Notice: Subject to any disclaimer, the term of this patent is extended or adjusted under 35 U.S.C. 154(b) by 0 days.

(21) Appl. No.: 09/283,816

(22) Filed: Mar. 31, 1999

(51) Int. Cl.[7] .......................... G06F 17/00; G06F 13/00
(52) U.S. Cl. ........................................ 707/104; 710/33
(58) Field of Search ................... 707/1–2, 7, 102–104, 707/500; 710/113–130, 31–35; 705/1, 26; 709/213, 231, 232, 245, 248

(56) References Cited

U.S. PATENT DOCUMENTS 5,734,887 A * 3/1998 Kingberg et al. ............... 707/4
5,809,261 A * 9/1998 Lambrecht .................. 710/128

OTHER PUBLICATIONS

U.S. application No. 09/282,764, filed Mar. 31, 1999, Targetted Banner Advertisements.
U.S. application No. 09/282,356, filed Mar. 31, 1999, Common Term Optimization.
U.S. application No. 09/283,815, filed 31, 1999, Generic Object for Rapid Integration of Data Changes.
U.S. application No. 09/282,493, filed Mar. 31, 1999, Adaptive Partitioning Techniques in Performing Query Requests and Request Routing.
U.S. application No. 09/283,816, filed Mar. 31, 1999, Efficient Data Transfer Mechanism for Synchronization of Multi-media Databases.
U.S. application No. 09/283,837, filed Mar. 31, 1999, New Architecture for On–Line Query Tool.
U.S. application No. 09/282,342, filed Mar. 31, 1999, Data Enhancement Techniques.
U.S. application No. 09/282,295, filed Mar. 31, 1999, Data Merging Techniques.
U.S. application No. 09/283,820, filed Mar. 31, 1999, Techniques for Performing Incremental Data Updates.
U.S. application No. 09/282,730, filed Mar. 31, 1999, Weighted Term Ranking for On–Line Query Tool.
U.S. application No. 09/283,268, filed Mar. 31, 1999, Hybrid Category Mapping for On–Line Query Tool.

* cited by examiner

*Primary Examiner*—Kim Vu
*Assistant Examiner*—Alford W. Kindred
(74) *Attorney, Agent, or Firm*—Leonard Charles Suchyta; James K. Weixel

(57) ABSTRACT

Disclosed is a system for performing online data queries. The system for performing online data queries is a distributed computer system with a plurality of server nodes each fully redundant and capable of processing a user query request. Each server node includes a data query cache and other caches that may be used in performing data queries. The data query, as well as request allocation, is performed in accordance with an adaptive partitioning technique with a bias towards an initial partitioning scheme. Generic objects are created and used to represent business listings upon which the user may perform queries. Various data processing and integration techniques are included which enhance data queries. An update technique is used for synchronizing data updates as needed in updating the plurality of server nodes. A multi-media data transfer technique is used to transfer non-text or multi-media data between various components of the online query tool. Optimizations for searching, such as the common term optimization, are included for those commonly performed data queries. Also disclosed is a system for targeting advertisements that are displayed to a user of the system.

20 Claims, 71 Drawing Sheets

430

CATEGORIES

| $O_{11}$ | $O_{12}$ | $O_{13}$ | $O_{14}$ | $\cdots$ | $O_{1n}$ |
|---|---|---|---|---|---|
| $O_{21}$ | $O_{22}$ | $O_{23}$ | $O_{24}$ | $\cdots$ | $O_{2n}$ |
| · | · | · | · | | · |
| · | · | · | · | | · |
| · | · | · | · | | · |
| $O_{m1}$ | $O_{m2}$ | $O_{m3}$ | $O_{m4}$ | $\cdots$ | $O_{mn}$ |

LISTINGS

FIG. 6

| | |
|---|---|
| Cabinets | Cleaners |
| Cable Companies | Clinics |
| Cameras | Clocks |
| Camping | Clothing |
| Candles | Cocktail Lounges |
| Candy | Coffee & Tea |
| Carpets | Collection Agencies |
| Cars | Colleges & Universities |
| Casinos | Comics |
| Catalog Shopping | Commercial Printing |
| Caterers | Communications |
| Cats & Dogs | Computers |
| Cell Phones | Condominiums |
| Cemeteries | Consultants |
| Chambers of Commerce | Contractors |
| Chemicals | Convenience Stores |
| Child Care | Conventions |
| Chinese Food | Copying |
| Chiropractors | Cosmetics |
| Churches | Counseling |
| Cigars & Cigarettes | Crafts |
| City Government | Credit Unions |

| | |
|---|---|
| Dance Companies | Department Stores |
| Dance Instruction | Doctors |
| Data Processing | Dogs & Cats |
| Delivery Services | Dolls |
| Dentists | Dry Cleaners |

⬆ Jump to Top   ⬅ Previous Page   ➡ Next Page

Home | Help | About | Site Map | Privacy Policy
Add or Change Your Listing | Advertising Info | Purchase Ads Online | Link to Us
Shop Online | Consumer Guide® | Yellow Pages | Web Site Search | Classified Ads | Internet Access Copyright © 1995 - 1999 GTE New Media Services, Inc. a part of GTE Corporation. All rights reserved.

GTE Superpages™ INTERNET SERVICES | Shop Online | Consumer Guide® | Yellow Pages | Web Site Search | Classified Ads | City Link Click here to advertise. | MAPQUEST TRAVELING SOON?

Home → Distance Search → Categories

| MATCHING CATEGORIES | 1587 listings in 24 categories | Help |

View businesses related to "restaurants":
Eating Places (17)
Fish & Chips (2)
French Restaurants (8)
Grease Traps (Cleaning Service) (2)
Greek Restaurants (5)
Indian Restaurants (8)
Irish Restaurants (2)
Italian Restaurants (49)
Kosher Restaurants (3)
Middle Eastern Restaurants (4)
Oriental Restaurants (4)
Restaurant Design & Planning Service (1)
Restaurant Equipment & Supplies (Wholesale) (25)
Restaurant Equipment & Supplies-Manufacturers (5)
Restaurant Equipment-Repairing & Service (7)
Restaurant Information & Referral Service (1)
Restaurant Management (9)
Restaurants (1403)
Restaurants-Delivery & Information (1)
Restaurants-Foods Delivery (1)
Seafood Restaurants (12)
Spanish Restaurants (5)
Thai Restaurants (9)
Vietnamese Restaurants (4)

Related Links:
GTE Shop Online: Shop for Dining Services online
Consumer Guide®: Automobile and product reviews ⬆ Jump to Top Search Options: Simple Search   Detailed Search   Search By Distance   Search in Canada Home | Help | About | Site Map | Privacy Policy
Add or Change Your Listing | Advertising Info | Purchase Ads Online | Link to Us
Shop Online | Consumer Guide® | Yellow Pages | Web Site Search | Classified Ads | Internet Access Copyright © 1995 - 1999 GTE New Media Services, Inc. a part of GTE Corporation. All rights reserved.

> per month.
> - Gold
>   Appear ahead of Silver and Basic Weblinks. Only $45 per month.
> - Silver
>   An economical solution. Appear in our ADVERTISERS section for just $20 per month.
> - Basic
>   Add your company's Website link to your basic listing in our Yellow Pages. A low $5 per month.
>
> For more information and samples, click here.

More advertising options

You can enhance your basic listing in other ways, too, including:

- GTE SuperSite(sm) Website
- Display Ads
- County Buy
- Multi-City
- Banner Ads Call 1-800-376-0484 for information about these additional advertising options.

For assistance, please contact GTE SuperPages Customer Care at 1-800-428-8722 during business hours (7:30 a.m.-6:00 p.m. CST, M-F)

Not all advertising options are available in all areas.

This site requires Netscape Navigator 3.0, Microsoft internet Explorer 3.0, or a more recent browser.

Home | Help | About | Site Map | Privacy Policy
Add or Change Your Listing | Advertising Info | Purchase Ads Online | Link to Us
Shop Online | Consumer Guide® | Yellow Pages | Web Site Search | Classified Ads | Internet Access Copyright © 1995 - 1999 GTE New Media Services, Inc. a part of GTE Corporation. All rights reserved.

FIG. 17

Matching Business

Home ➡ Add or Change Your Listing

This business matches the telephone number you entered. Please click on the business name if this is the correct business:

| Matching Business: | Blue Cross & Blue Shield<br>(617) 832-5000<br>Boston, MA 02110-2190 |
|---|---|

If your business is not shown:

Add My Listing

Mistake Entering Telephone Number?

If (617) 832-5000 is not the correct telephone number for your business, please enter the correct number here:

| Try Again: | ( ) - |
|---|---|
| Then Click: | Look up my business |

For assistance, please contact GTE SuperPages Customer Care at 1-800-428-8722 during business hours (7:30 a.m.-6:00 p.m., CST, M-F)

This site requires Netscape Navigator 3.0, Microsoft internet Explorer 3.0, or a more recent browser.

Home | Help | About | Site Map | Privacy Policy
Add or Change Your Listing | Advertising Info | Purchase Ads Online | Link to Us
Shop Online | Consumer Guide® | Yellow Pages | Web Site Search | Classified Ads | Internet Access Copyright © 1995 - 1999 GTE New Media Services, Inc. a part of GTE Corporation. All rights reserved.

FIG. 18

| GTE SuperPAGES™ INTERNET SERVICES | Shop Online | Consumer Guide® | Yellow Pages | Web Site Search | Classified Ads | City Link |
|---|---|---|---|---|---|---|

Home ➡ Advertise With Us ➡ Purchase Advertising

Blue Cross & Blue Shield (617)832-5000      Modify this basic listing
Boston, MA 02110

Next Step:

- Choose a product below.
- Modify your existing information.

Enhance your listing with these affordable SuperPages advertising options:

Products Available Online

| Product | Description | Price |
|---|---|---|
| Create-A-Site: | Reach potential customers with an eye-catching full-color Webpage! Your GTE Create-A-Site™ Webpage includes:<br><br>• Several different design templates that allow you to quickly and easily design your webpage in the layout best suited for your business.<br>• Ability to emphasize your business' key selling points, products and services.<br>• Placement in the ADVERTISERS section in up to five Yellow Pages categories of GTE's SuperPages® service.<br>• A unique Web address ('URL') which you can feature on your print advertising and business cards, so that potential and current customers can find your business on the Web!<br>• Ability to update your webpage anytime you desire.<br><br>Create your One Page Website | Order $40 per month |
| Fact File:. | • A FactFile gives your listing Priority Placement, which places you in our special ADVERTISERS section, ahead of businesses who aren't advertisers.<br>• With a FactFile, your customers can learn the details about your business, including the brands or services you offer and your business hours, plus much more!<br>• Customers can also find your business on SuperPages by searching for keywords in your FactFile.<br><br>For more information and samples, click here. | Order $25 per month |
| Platinum HotLink: | Add a HotLink to your company's Website in your listing, and also appear near the top of the ADVERTISERS section.<br><br>For more information and samples, click here. | Order $80 per month |

FIG. 19

| | | |
|---|---|---|
| Gold HotLink: | Add a HotLink to your listing, and appear in the ADVERTISERS section above Create-A-Site and FactFile advertisers.<br><br>For more information and samples, click here. | Order<br>$45 per month |
| Silver HotLink: | Add a HotLink to your listing, and appear in the ADVERTISERS section.<br><br>For more information and samples, click here. | Order<br>$20 per month |
| Basic HotLink: | Add a HotLink to your listing.<br><br>For more information and samples, click here. | Order<br>$5 per month |
| Modify Your Existing Information | | |
| Basic Listing: | You can modify your basic listing information (business phone numbers, address, e-mail, and categories) | |

890

For assistance, please contact GTE SuperPages Customer Care
at 1-800-428-8722 during business hours (7:30 a.m.-6:00 p.m. CST, M-F)

**This site requires Netscape Navigator 3.0, Microsoft internet Explorer 3.0,
or a more recent browser.**

Help | Add or Change Your Listing | About | Working @ SuperPages® | Services | Talk to Us Home | Shop Online | Consumer Guide® | Advertise with Us
Web Site Search | City Link | Classified Ads | Internet Access Copyright © 1995 - 1999 GTE New Media Services, Inc. a part of GTE Corporation. All rights reserved.

FIG. 20

| GTE SuperPages™ INTERNET SERVICES | Shop Online | Consumer Guide® | Yellow Pages | Web Site Search | Classified Ads | City Link |

Home ➔ Add or Change Your Listing

Your Current Listing Information

Your business appears as:

Blue Cross & Blue Shield  (617) 832-5000
100 Summer Street FL 2, Boston, MA 02110-2190  fax: (617) 832-3353
 (800) 258-2226
 (800) 253-5210

Customers can find you by searching these categories:

• Insurance

| You may: | Change your business information |
| | Change your categories |

For assistance, please contact GTE SuperPages Customer Care
at 1-800-428-8722 during business hours (7:30 a.m.-6:00 p.m., CST, M-F)

This site requires Netscape Navigator 3.0, Microsoft internet Explorer 3.0, or a more recent browser.

Home | Help | About | Site Map | Privacy Policy
Add or Change Your Listing | Advertising Info | Purchase Ads Online | Link to Us
Shop Online | Consumer Guide® | Yellow Pages | Web Site Search | Classified Ads | Internet Access Copyright © 1995 - 1999 GTE New Media Services, Inc. a part of GTE Corporation. All rights reserved.

FIG. 21

| | | | | | | |
|---|---|---|---|---|---|---|
| GTE Super PAGES™ INTERNET SERVICES | Shop Online | Consumer Guide® | Yellow Pages | Web Site Search | Classified Ads | City Link |

Home → Add or Change Your Listing

Enter or Update Your Business Information

Enter the business information for your listing, or modify the previously entered information.

Fields marked ● are required as part of your listing.

Business Information

| | |
|---|---|
| Business Name: | ● [Blue Cross & Blue Shield] <br> (Use normal capitalization, e.g., GTE SuperPages, not GTE SUPERPAGES.) |
| Business Phone: | ● ( [617] ) [832] - [5000] <br> (Either Business Phone or Toll Free Phone is required.) |
| Toll Free Phone: | ( [800 ▽] ) [253] - [5210] Ext: [ ] <br> Description: [ ] <br> (e.g., 24-Hour Mail Order) |
| Alternate Phone: | ( [800] ) [258] - [2226] Ext: [ ] <br> Description: [ ] |
| Business Fax: | ( [617] ) [832] - [3333] |
| Street Address: | ● [100 Summer Street FL2] <br> (Spell out all words in the address. For example, use Northeast, Avenue, and Boulevard instead of NE, Ave., and Blvd.) |
| Street Address: | Boston, Massachusetts <br> City and State will be automatically selected based on your ZIP Code. (We use the standard USPS database.) |
| ZIP (5 or 9 digits): | ● [02110] - [2190] |
| E-Mail: | [ ] |
| | [ Submit information ]   [ Clear ] |

FIG. 22

NORMALIZED DATA
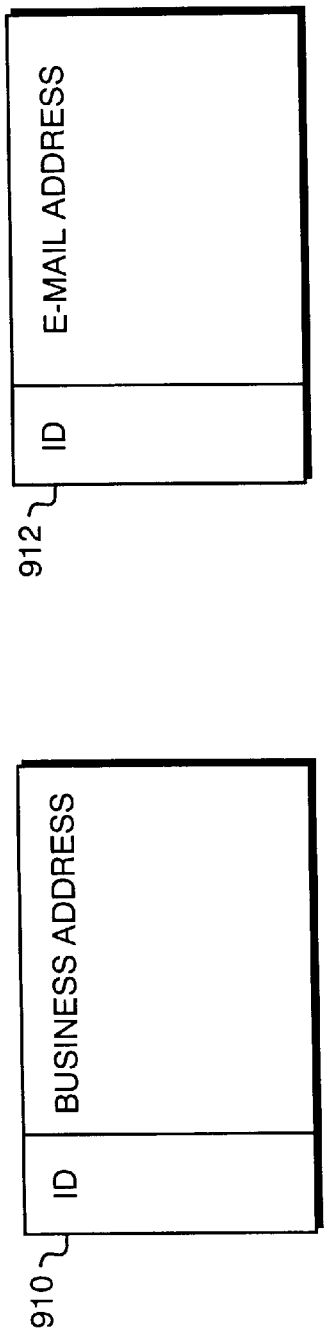
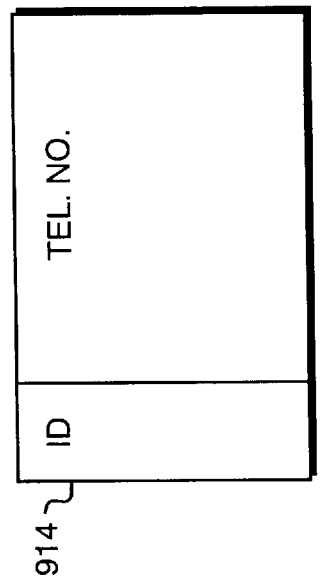
FIG. 26

DENORMALIZED DATA

| ID | BUSINESS ADDRESS | E-MAIL | TEL. NO. |
|----|------------------|--------|----------|

GTE SuperPages™ INTERNET SERVICES

| Shop Online | Consumer Guide® | Yellow Pages | Web Site Search | Classified Ads | City Link |

Click here to advertise.

Parking is limited at our shopping center.

Home → Categories

| MATCHING CATEGORIES | 261 listings in 8 categories  Help |

View businesses related to "art supplies":
Art Goods (11)
Art Supplies (1)
Artists Materials & Supplies (105)
Arts & Crafts (6)
Arts & Crafts-Retail (3)
Craft Supplies (30)
Craft Supplies-Retail (103)
Handicraft Supplies (2)

Related Links:
GTE Shop Online: Purchase goods and services online
Consumer Guide®: Automobile and product reviews ↑ Jump to Top Shop Online for computers

MARCH CALENDAR FREE POSTCARDS click here to avoid the fashion police...

CONSUMER GUIDE product reviews

Search Options: Simple Search  Detailed Search  Search By Distance  Search in Canada Home | Help | About | Site Map | Privacy Policy
Add or Change Your Listing | Advertising Info | Purchase Ads Online | Link to Us
Shop Online | Consumer Guide® | Yellow Pages | Web Site Search | Classified Ads | Internet Access Copyright © 1995 - 1999 GTE New Media Services, Inc. a part of GTE Corporation. All rights reserved.

FIG. 44

NATIVE SOURCE PRECESSING

METHOD AND PRODUCT FOR PERFORMING DATA TRANSFER IN A COMPUTER SYSTEM

CROSS REFERENCE TO RELATED APPLICATIONS

The instant application is related to the following ten copending U.S. patent applications each filed on Mar. 31, 1999, each having its assignee of the entire interest in common with the assignee of the entire interest of the present application, and having titles and serial numbers as follows: TARGETED BANNER ADVERTISEMENTS, Ser. No. 09/282,764, COMMON TERM OPTIMIZATION, Ser. No. 09/282,356, GENERIC OBJECT FOR RAPID INTEGRATION OF DATA CHANGES, Ser. No. 09/283,815; ADAPTIVE PARTITIONING TECHNIQUES IN PERFORMING QUERY REQUESTS AND REQUEST ROUTING, Ser. No. 09/282,493; NEW ARCHITECTURE FOR ON-LINE QUERY TOOL, Ser. No. 09/283,83; DATA ENHANCEMENT TECHNIQUES, Ser. No. 09/282,342; DATA MERGING TECHNIQUES, Ser. No. 09/282, 295TECHNIQUES FOR PERFORMING INCREMENTAL DATA UPDATES, Ser. No. 09/283,820; WEIGHTED TERM RANKING FOR ON-LINE QUERY TOOL, Ser. No. 09/282,730; and HYBRID CATEGORY MAPPING FOR ON-LINE QUERY TOOL, Ser. No. 09/283,268.

BACKGROUND OF THE INVENTION

This application generally relates to data transfers in computer systems, and more specifically to transferring different types of data in computer systems.

In a computer system, data transmissions may be required to move data from one storage location to another. The data to be transferred may include different data types, such as text and non-text data. Generally, non-text data may include audio data, image data, and other data that may also be characterized as multi-media data. Different mechanisms may exist to facilitate the transferring of different data types. For example, one mechanism provided for data transfers between two databases includes support within databases for transferring text data. However, the mechanism for data transfer, as in databases, may not provide a mechanism for non-text or multi-media data transfers. In the latter case, an alternative technique may be used to facilitate the transfer of multi-media data, for example, in data transfers between databases.

One technique for transferring multi-media data, as between databases, uses an alternative data channel. This alternative data channel is generally external to the database and does not use database-provided mechanisms in data transfers. Using this technique, both text and multi-media data may be transferred using the alternative data channel.

A problem with this technique is that it is generally not an efficient mechanism for transferring both text and multi-media data. Generally, the external mechanism may not be the most efficient mechanism by which to transfer text data, as existing database-provided routines may be more efficient and tuned for database data transfers.

Thus, there is required an efficient and flexible technique which facilitates the transfer of different data types, as in a computer system.

SUMMARY OF THE INVENTION

In accordance with principles of the invention is a method of performing a data transfer in a computer system. Data is selected to be transferred from a first location to a second location in which the data includes a text portion and a non-text portion. The text portion is transferred using a first data channel from the first location to the second location storing the text portion in a temporary location. The non-text portion is transferred using a second data channel from the first location to the second location. The steps of transferring the text portion and non-text portion are performed asynchronously, and initially the text and non-text portions are copied to a temporary location, and then merged with other data from another data transfer.

In accordance with another aspect of the invention is a method executed in a computer system for performing a data transfer. An advertising page is selected to be transferred from a first location to a second location, advertising data of the advertising page being represented by a relational mapping table describing the relationship between data entities associated with the advertising data, and a data table including the advertising data represented by the relational mapping table, the relational mapping table including only text data and the data table including text and multimedia data. The text data of the relational mapping table is transferred using a first communication channel to a temporary relational mapping table located at the second location. The text data of said data table is transferred to a temporary data table located at the second location. The multimedia data is transferred to a repository at the second location, the repository being a location which includes other multimedia data from other data transfer operations associated with other advertising pages. The temporary data table is merged into another data table by copying the text data from the temporary data table to the other data table at the second location. For each entry of the temporary data table, a matching entry in said repository is identified in which the global identifier of the temporary data table matches a global identifier of the repository. A repository identifier of said matching entry is copied from the repository to the entry in the other data table, the repository identifier being a pointer to the multimedia data located in the repository and being a link between an associated entry in the other data table describing the matching entry in the repository.

Thus, there is provided an efficient and flexible technique which facilitates the transfer of different data types, as in a computer system.

BRIEF DESCRIPTION OF DRAWINGS

The above-mentioned and other features of the invention will now become apparent by reference to the following description taken in connection with the accompanying drawings, in which:

FIG. 6 is an example of an embodiment of a table representing data stored in the generic object dictionary;

FIGS. 9 and 10 are an example of a user interface displayed in response to a user request with an online query tool;

FIG. 11 is an example of an embodiment of a user interface displayed with user query information;

FIG. 12 is an example of the query results displayed in response to performing a user query of FIG. 11;

FIG. 13 is an example of a user interface which includes user-specified query information;

FIG. 14 is an example of a resulting display page in response to the query performed with information specified in FIG. 13;

FIG. 15 is a more detailed display in response to choosing a particular category of FIG. 14;

FIGS. 16 and 17 are an example of a user interface displayed in response to selecting an option from the menu of FIG. 3 to add or change a listing;

FIGS. 18 is an example of a display screen in response to updating the business listing specified in FIGS. 16 and 17;

FIGS. 19 and 20 are an example of a user interface screen display results in response to a user request with regard to FIG. 18;

FIG. 21 is an example of a screen display to a user with more information with regard to the business listing selected from screen 20;

FIG. 22 is the business information displayed with regard to the business in FIG. 21;

FIG. 26 is an example of normalized data as may be included in an embodiment of the invention;

FIG. 27 is an example of denormalized data form as may be included in an embodiment of the invention;

FIGS. 37 and 38 are flowcharts for a method in one embodiment for performing total-city and multi-city cache searches;

FIG. 43 depicts an example of a user interface for an on-line query tool, including a screen for initiating a user query;

FIG. 44 depicts an example of a user interface for an on-line query tool, including categories that may be retrieved in response to initiation of a user query;

DETAILED DESCRIPTION OF THE PREFERRED EMBODIMENT(S)

Figure 1:
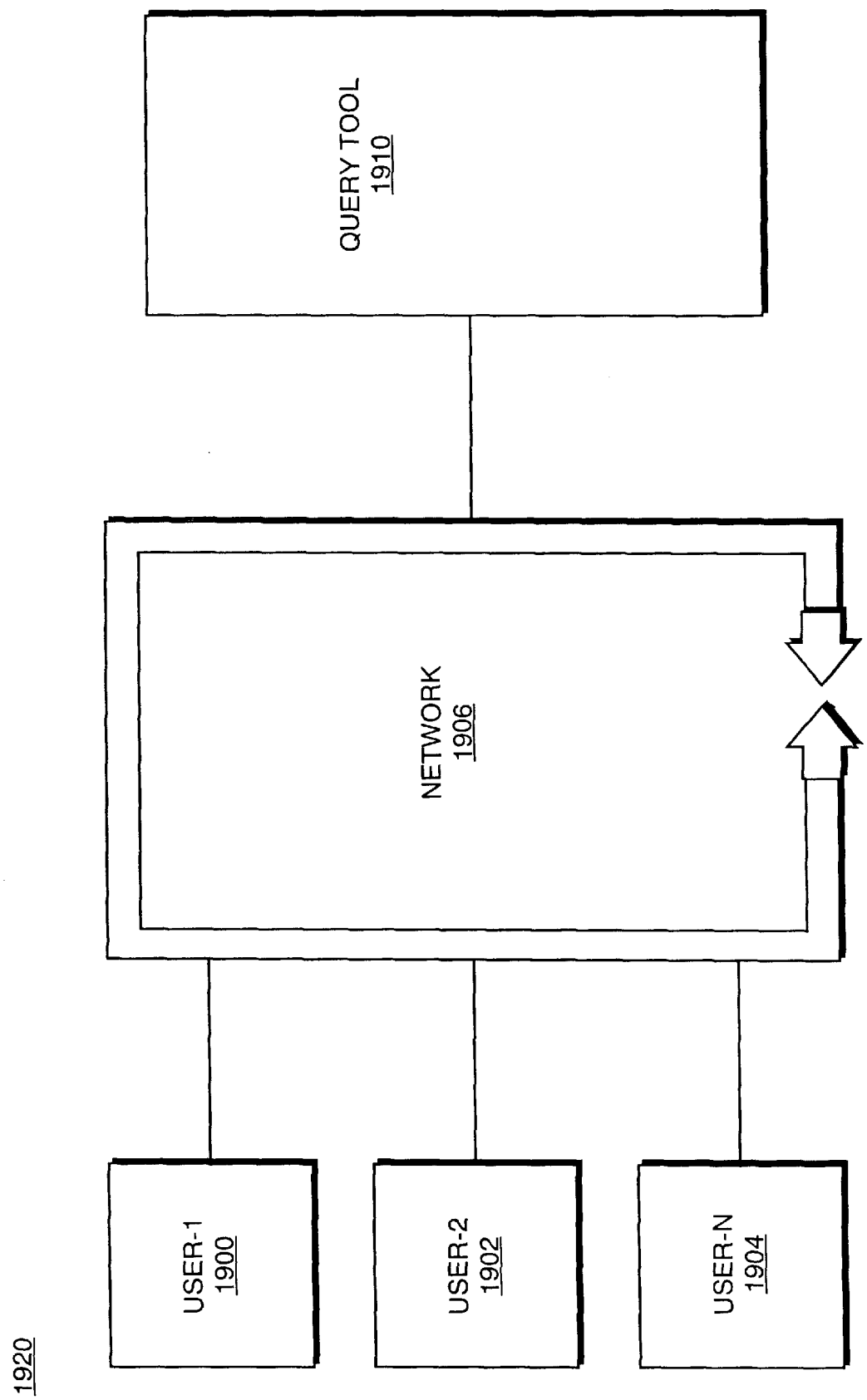
FIG. 1 is an example of an embodiment of a system that includes an on-line query tool.

Referring now to FIG. 1, shown is an embodiment of an on-line query tool 1910. In an embodiment, one or more users 1900–1904 may connect to the on-line query tool 1910 via a network 1906. Users may interact with the query tool using conventional hardware and software, such as, in an embodiment, a web browser through the Internet.

Figure 2:
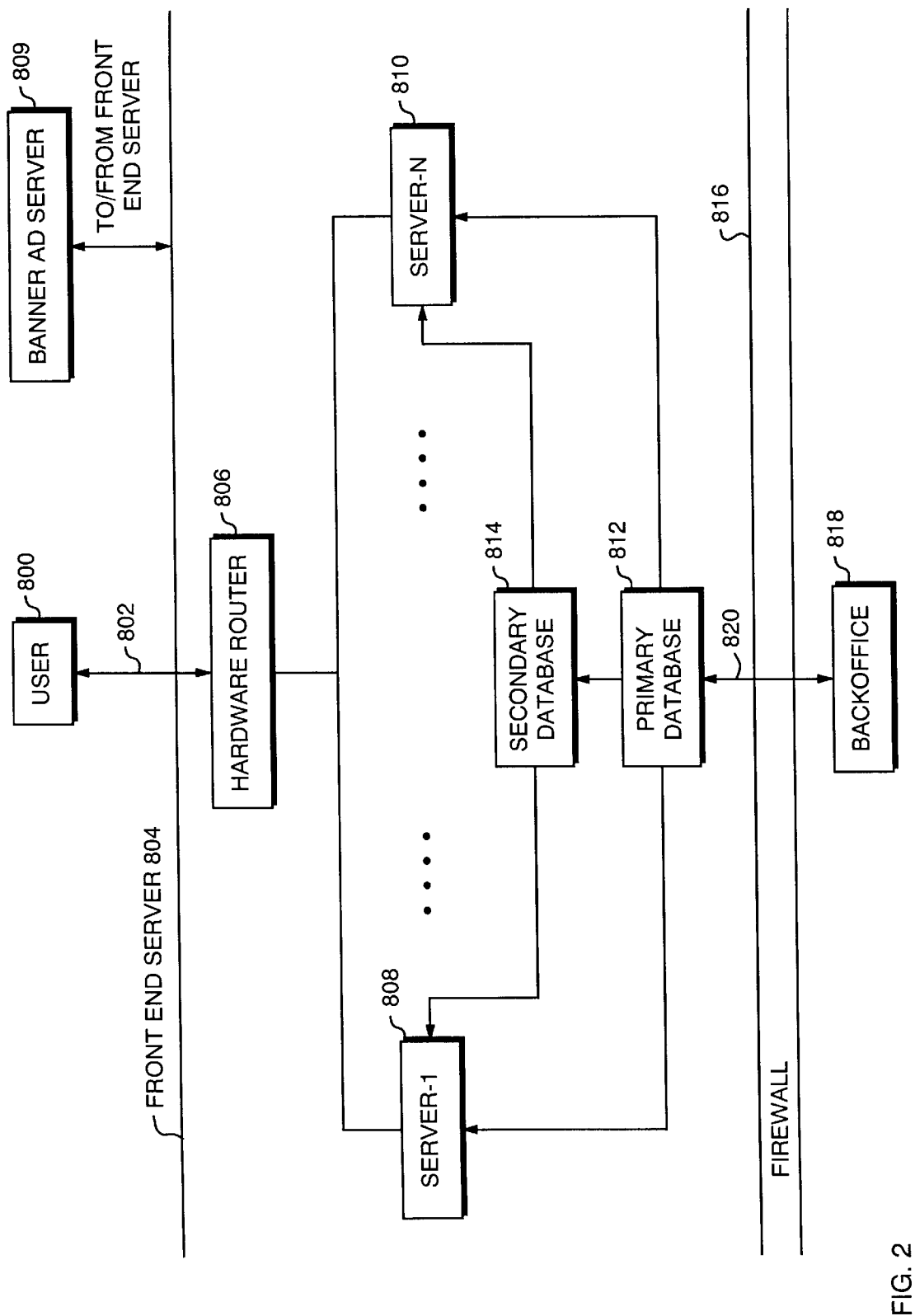
FIG. 2 is an example of a block diagram of a hardware view of an embodiment of an on-line query tool.

Referring now to FIG. 2, shown is an embodiment of a hardware view of an on-line query tool. In one embodiment, this on-line query tool may be the GTE Superpages$^{SM}$ query tool. FIG. 2 shows a hardware view of the components that may be included in one embodiment of the query tool in typical operation as being accessed by a user through a network. The user 800 enters a query request which is sent via a network 802, such as the Internet, to the GTE Superpages Front End Server 804. The GTE Superpages Front End Server 804 includes a hardware router 806 for receiving incoming query requests. The hardware router routes the request, using a simple hardware-based technique, to one of the server nodes 808–810 which may be designated to service the request by performing the requested query. The servers 808 through 810, server 1 through server n, respectively, interact with the Primary Database 812 and Secondary Database 814 to perform a data query. The Primary Database 812 interacts with the Backoffice component 818 at times, as will be described in paragraphs elsewhere herein, to obtain data used in performing the queries. The Backoffice component 818 performs data filtering and other processing, for example, to combine information that may be obtained from various data sets producing a resultant data set. The resultant data set is subsequently transferred to the Primary Database for use by the various server nodes 808 through 810.

The process of data integration and updating the data, for example, from the Backoffice to the Front End Server, may be performed at a time other than peak demand time. These processes and data transfer techniques, as will be described in following paragraphs, are generally performed "off-line" and not in response to user query requests. Rather, these techniques may be performed as part of a data maintenance and update process performed in accordance with the system load and the number and type of update transactions.

FIG. 2 depicts a Superpages Front End Server 804 which includes a varying number of server nodes 808–810 to respond to the various query requests as made by a user 800. The techniques and concepts which are described in paragraphs that follow may be used in a variety of different systems which include one or more server systems. Additionally, a single database or other datastore may be used. The techniques described herein may generally be applied to a large distributed system. Additionally, these same concepts and techniques may be applied in a single user system performing data queries and searches upon a local database.

Figure 3:
FIG. 3 is an example of an embodiment of a user interface displayed with an on-line query tool.

Referring now to FIG. 3, shown is an example of a user interface screen as included in one embodiment of the system of FIG. 2. Generally, FIG. 3 is the initial screen 1800 that may be displayed to a user entering a URL corresponding to the GTE Superpages Internet site. FIG. 3 includes fields for query information 1802–1808, hyperlinks to other tools 1810, such as on-line shopping or placing advertisements, and other links 1812, for performing other tasks such as modifying an existing business listing.

The GTE Superpages Internet site is related to on-line yellow pages, similar to those included in a paper phone book. With these on-line yellow pages, various business services and user services may be provided. For example, a user may query the on-line yellow page information for various businesses in the United States based on particular search criteria. On-line shopping information regarding products and business services may be provided to a user performing a data query. Advertisers, such as the business providers of the various products and services, may also purchase advertisements similar to those that may be purchased in the paper copy of a phone book that includes yellow page listings of businesses.

The interface 1800 may include links to various services and functions. For example, one service provided permits businesses to advertise in the on-line yellow pages. Functions associated with this service may include, for example, purchasing advertisements and adding or changing a business listing that an advertiser or business includes in the yellow pages. In FIG. 3, some of these functions are included in the interface portion. 1812, with links to other tools in the screen portion 1810. A user may connect with any of these tools or functions to perform tasks related to the yellow pages advertising by selecting an option from the user interface 1800, such as by left-clicking with a mouse.

Other interfaces with varying functions may be directed to a user. Other types of network connections in addition to the Internet may also be included in other embodiments and may vary with each application and embodiment.

Figure 4:
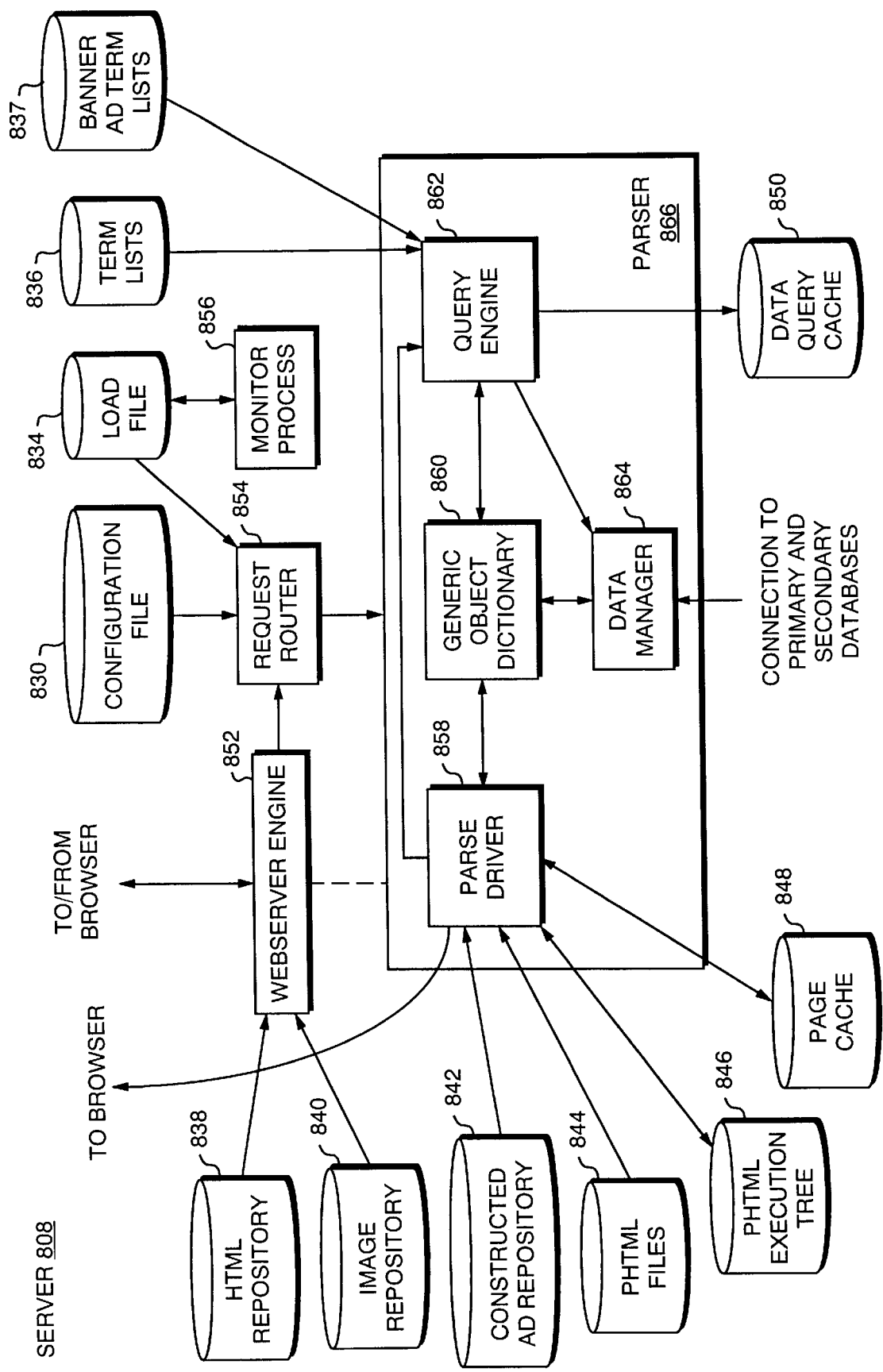
FIG. 4 is an example of a block diagram of a software view of an online query tool of FIG. 2.

Referring now to FIG. 4, shown is an embodiment of the various software components for an on-line query system. One embodiment may be the on-line query tool of the GTE Superpages system. FIG. 4 depicts a software view of the typical operation of the system as being accessed by a user 800 through a network 802 using the hardware as described in conjunction with FIG. 2. As previously described, the user may enter a request, as through a browser. This request is communicated through the GTE Superpages Front End Server 804 over the network 802. As shown in FIG. 4, the Front End Server 804 includes server node 808 that includes a web server engine 852. In one embodiment, the web server engine 852 is a Netscape™ engine which serves as a central coordinating task for accessing files and displaying information to the user on the browser 824. The server node 808 also includes a request router 854, a monitor process 856 and a parser 866. The parser 866 generally includes a parse driver 858, a generic object dictionary 860, a query engine 862, and a data manager 864. The parse driver 858 operates upon data from a constructed ad repository 842 and the PHTML files 844. Additionally, the parse driver 858 stores and retrieves data from the PHTML execution tree 846 and the page cache 848. The data manager 864 included in the parser 866 is responsible for interacting with the database, which in the FIG. 4 is the Primary Database 812. It should also be noted that the data manager 864 may also obtain data from a Secondary Database as previously shown in FIG. 4. If there are multiple databases other than a Primary and Secondary Database, the data manager may also interact with these to obtain the necessary data upon which data queries are performed. The query engine 862 operates upon data from, and writes data to, the data query cache 850. Additionally, the query engine uses data from the term lists 836 to obtain identifiers and possibly other retrievable data in accordance with various key terms upon which a data query is being performed. The request router 854 generally interacts with the parser and reads data from the configuration file 830 and load file 834. The monitor process 856 also reads and writes data to and from respectively the load file 834. The web server engine 852, in this embodiment the Netscape engine 852, obtains data from the HTML repository 838 and the image repository 840 in accordance with various requests from the browser for different types of files. Each of the foregoing components will be described in more detail in terms of function and operation in paragraphs that follow. The monitor process 856 is generally responsible for indicating the availability of server nodes 808–810 in performing data queries. The monitor is also generally responsible for receiving incoming messages from other server nodes as to their availability for servicing requests.

The load file 834, upon which the monitor process 856 reads and writes data, is a dynamic file in that its contents are updated in response to incoming messages indicating machine availability and the current load of the corresponding machine. The load file also includes static information components, such as the maximum load of each system. Generally, the actual executing load (current load) of a system is less than or equal to the maximum load (max load) as indicated in accordance with the load file. Each server has its own unique copy of the load file which is updated in accordance with messages which it receives from the other nodes. Below is an example of an entry that may be included in the load file representing the information described above:

SERVER, MAX LOAD, CURRENT LOAD

The configuration file 830 may be a static file physically located on one of the server nodes 808–810 with a copy replicated on each other server node. Generally, this file is created prior to use of the system. It may specify which servers may service requests based on weighted parameters of a particular search domain associated with a particular server. Below is an example of an entry in a configuration file:

DOMAIN/PARTITION, SERVER, DOMAIN WEIGHT, SERVER WEIGHT

The domain weight may be a normalized value representing costs (e.g., time) associated with processing a request for this associated search domain or partition. This domain weight is based on the median time to service a request in that domain based on the analysis of past data logs, for example, as normalized by the number of listings in the domain. Similarly, server weights may represent the cost associated with processing a request on a particular server. The domain/partition indicates a portion of the search domain upon which a user query may be performed that is associated with a particular server.

Other particular embodiments of the load and configuration files may include additional or different information in accordance with the particular policies and data required to implement the policies, such as request routing.

In this particular embodiment, an incoming request may be processed by one of a plurality of parsers 858 on each of the server nodes. The parser 858 generally transforms the user input query into a form used by other components, such as the request router. The request router generally receives an incoming request as forwarded by the hardware router 806 of FIG. 2. The request router subsequently uses the load file and the configuration file to decide which server node 808–810 a request is routed to based on the load and the availability of the server node, and the designated server for each partition or domain. Once a request is routed to one of the server nodes 808–810, the query is performed producing data query information that may be cached, for example, in the memory of a data query cache 850.

One use of the data query cache 850, as will be described in paragraphs that follow, is its use in improving the performance in response to a user request in a subsequent query that may use a subset or superset of the data stored in the data query cache 850. A superset or composition query is one which is a boolean composite of several querying terms. A composition query may be determined by the parser 866, and the request router 854 may decide to which server node 808–810 the composition query or other query is sent for processing in accordance with domain weights as indicated in the configuration file. Reallocation of requests when a server is unavailable may be performed generally with a bias toward the initial allocation scheme as indicated also by the configuration file. There is an assumption that reallocation of a request is on a transient basis, and that the initial allocation scheme is the one to be maintained. This concept will be described in paragraphs that follow in accordance with request routing and data query caching.

Also shown in FIG. 4 are the PHTML execution tree 846, the page cache 848, and the PHTML file store 844. Generally, the PHTML execution tree 846 includes an expanded version of a PHTML file requested from the PHTML file 844 as the result, for example, of a user query.

PHTML generally is a modified version of the HTML language, which is a markup language according to the Standardized General Markup Language (SGML) standard, capable of interpretation by browsers, such as a Netscape browser. PHTML generally is a scripted version of HTML with conditional statements that provide for alternate inclusion of blocks of HTML code in a resulting HTML page transmitted to a browser in accordance with certain run time query conditions. The expanded version of a PHTML file may be described as a parse tree representing parsed and expanded PHTML files. For example, if a PHTML file conditionally includes accesses to other PHTML files or various portions of HTML commands, the parse tree structure reflects this in its representation of the parse tree which is cached in the PHTML execution tree 846. Upon a subsequent request for the same PHTML file, the cached, expanded version is retrieved from the PHTML execution tree 846 to increase system efficiency, thereby decreasing user response time for the subsequent query.

The first time a user makes a request via the browser 824, a request is received by the webserver engine 852 which interacts with the parser 866. For a particular user request, a PHTML file is obtained and executed from the PHTML file store 844. The expanded version of the PHTML file is cached in the PHTML execution tree 846. In response to a user's request, an HTML page is generally constructed and cached in the page cache 848. Generally, constructed HTML pages are stored in the page cache 848 if the amount of time taken to produce the resulting HTML page is greater than a predetermined threshold. Implementations of the page cache may implement different replacement schemes. In one preferred embodiment, the page cache implements an LRU replacement scheme. Additionally, the threshold, the amount of time used to determine which pages are stored in the page cache, may vary with system and response time requirements.

When processing an incoming user request which results in returning an HTML page to a user, a particular search order of the previously described caches and file systems may be performed. Initially, it is determined whether the HTML page to be displayed to the user is located in the page cache 848. If not, search results are obtained from the query cache and the resulting HTML page is constructed and itself may be placed in the page cache 848. If a PHTML file is required to be executed in constructing the resulting HTML file, the PHTML execution tree 846 may be accessed to determine if there is a parsed version of the required PHTML file already expanded in the PHTML execution tree. If no such file is located in the PHTML execution tree 846, the PHTML file 844 is accessed to obtain the required PHTML file. The order in which these caches and file systems are searched is generally in accordance with a graduated processing state of producing the resulting HTML file. Caches associated with a later state of processing are generally searched prior to ones associated with an earlier processing state in producing the resulting HTML file.

Also accessed by the parse driver 858 is a constructed ad repository 842. As will be described in paragraphs that follow, the constructed ad repository generally includes constructed advertisement pages which may include, for example, text and non-text data, such as audio and graphic images to be displayed in response to a user query which represent, for example, a yellow pages ad. The webserver engine 852 accesses information from the image repository 840 and HTML repository 838. Generally, the image repository 840 includes various graphic images and other non-text data which may also be directly accessed by the webserver engine 852 in response to a user request, as by a user request for a specific URL. Similarly, the HTML repository 838 includes various HTML files which may be provided to the user, for example, in response to a user request with a specific URL which indicates a file.

Included in each of the server nodes 808–810 are one or more parsers 866 which perform, for example, parsing of the text of a user data query request. FIG. 4 includes some of the software components as included in the parser 866. The components of the parser 866, which are described in more detail in the following paragraphs, generally communicate using a generic object dictionary 860. The parser may include a parse driver 858 which performs the actual parsing of a user query. The parse driver 858 interacts with the query engine 862 once a request has been parsed to formulate a data query which is further passed to the data manager 864. As previously described, the data manager 864 generally interacts with a database to actually retrieve the data to be included in the resultant data query as displayed to the user.

The parse driver 858 generally uses a data schema description to interpret various data fields of the generic data objects. Generally, abstraction of the data interpretation into the data schema description enables different components of the parser 866 to operate upon and use generic data objects without requiring these components require code changes or recompilation in cases of the introduction of new data presentation types. Components which need to know the details of the generic data object, such as the parse driver 858, to perform certain functions, do this on a per-component basis using data schema descriptions to interpret a generic data object. This technique insulates code as included in the parser 866 from the introduction of new presentation types which may be represented as generic data objects.

One common use of the GTE Superpages Internet site is to perform a data query. In performing a data query, a user enters data query information, as in fields 1802–1808 of FIG. 3, or may select other detailed search options, such as searching by distance, as included in field 1808. In this embodiment, data field 1802 is a category query field by which queries may be performed in accordance with specified search categories that may be associated with business listings included in the yellow pages database. Additionally, field 1802 also includes predetermined top categories, as may be determined by examining log files in accordance with user query selections and search criteria. In this embodiment, selection of the "top categories" of the field 1802, as by left-clicking with a mouse button, causes the interface 1820 of FIG. 9 to be displayed in a user's browser.

Figure 9:

Referring now to FIGS. 9 and 10, shown is one embodiment of a user interface for displaying a first page of the top query categories 1820. Generally, these categories are associated with the various business listings and are tags by which a user may perform queries. In this embodiment, for example, the user may select the "top categories" from the initial interface as included in the field 1802.

Figure 11:
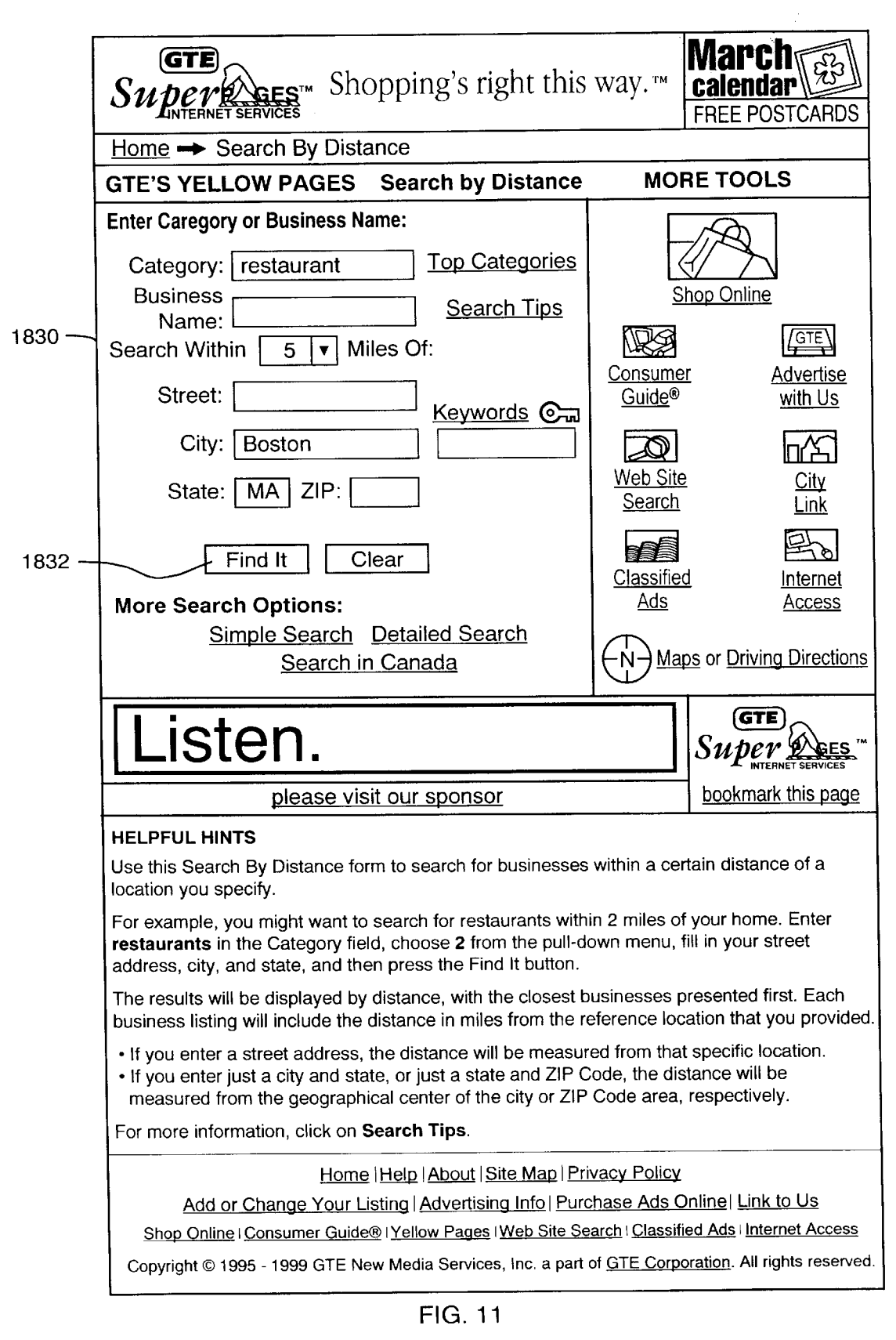

Referring now to FIG. 11, shown is one embodiment of a user interface for displaying a "search by distance" option. In this embodiment, this user interface screen may be displayed by selecting "detailed search" from the field 1808 from the initial user interface 1800. For example, the user interface 1830 may be displayed if the user wants to perform a data query for specified categories and certain distance criteria. As shown in the example of user interface 1830, a data query may be performed for restaurants within five (5) miles of Boston, Mass. This query is performed when the user selects the "Find It" button 1832 as included in the user interface 1830. In this embodiment, a first screen 1840 of the data query results is shown in FIG. 12.

Figure 13:
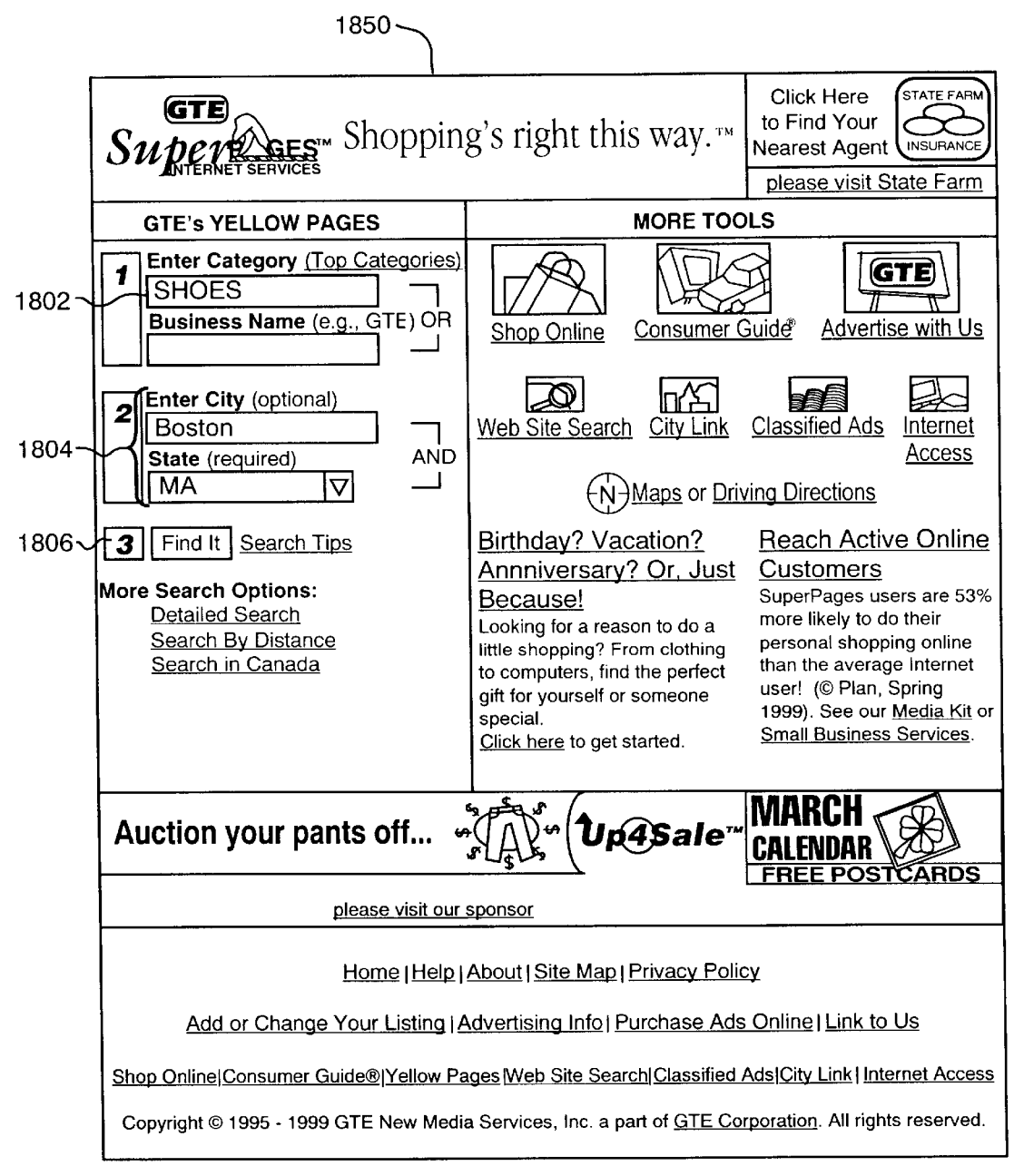

Referring now to FIG. 13, shown is an example of one embodiment of a user interface display 1850 for performing a user query in accordance with user-specified search criteria. User interface 1850 of FIG. 13 is the interface 1800 of FIG. 3, but with user-specified data query information included in various data fields. In FIG. 13, a data query is performed for "shoes" as the category 1802 for "Boston, Mass." in field 1804. The query is performed by selecting the "Find It" button of field 1806. The resulting screen displayed in response to selection of the "Find It" button is included in FIG. 14.

Figure 14:
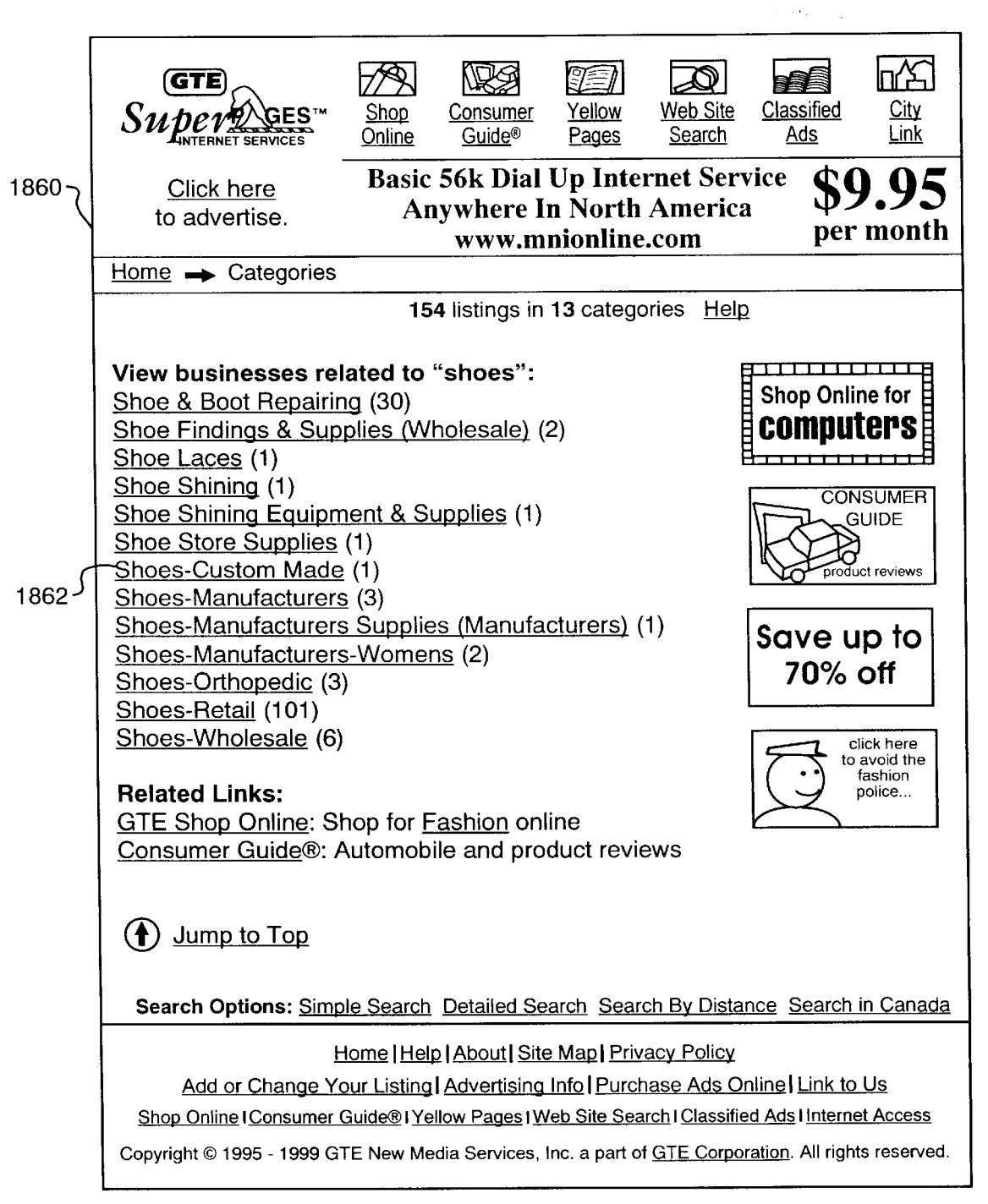

Referring to FIG. 14, shown is one example of a screen display in response to a performing a user query. The screen results 1860 may include displayed summarized business listing information in accordance with the search criteria previously specified in FIG. 14. Various business listings may be grouped together in categories. In this example, relating to "shoes", are 154 business listings included in thirteen (13) categories. From this listing of thirteen (13) categories, the user may select one of these relating to shoes. For example, selection, as by using a mouse, of "custom made shoes" 1862 results in the screen display of FIG. 15.

Figure 15:
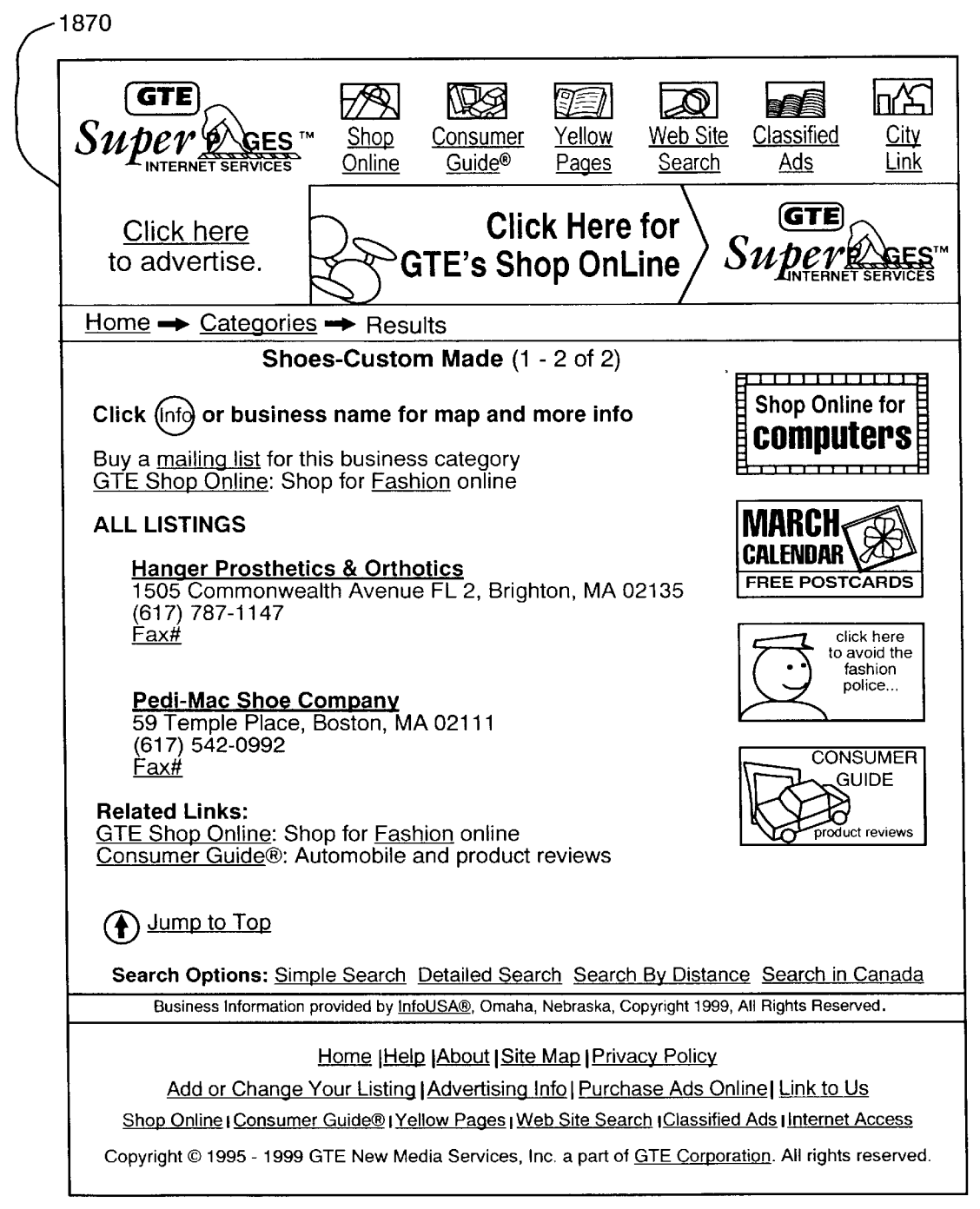

Referring now to FIG. 15, shown are the business listings relating to the user-specified search criteria selection relating to "custom made shoes". From this screen 1870, the user may further select one of the businesses for more information pertaining to the business, such as directions and business-provided advertisements.

Figure 16:

Referring now to FIGS. 16 and 17, shown is one embodiment of a user interface that may be displayed when a business or advertiser updates a business listing. This screen may be displayed, for example, by selection of the "add or change your listing" option 1812 of FIG. 3 of the initial user interface. A user interface 1880 provides data fields which allow a user to enter in information, such as a telephone number corresponding to a business listing. Corresponding business listing information is then updated. In this example, a phone number 617-832-5000 is entered into field 1882 to retrieve business listing information corresponding to this phone number. By selecting the phone number field that is filled in with this phone number, the resulting screen of FIG. 18 is subsequently displayed to the user in this embodiment. The phone number corresponds to a business as displayed in FIG. 18. If this is the correct business, a user may select a displayed business, for example, by clicking on the "matching business" information of FIG. 18. In response to selecting the "matching business" information, the screen display of FIGS. 19 and 20 may be displayed to a user. To update the basic listing information associated with the business, selection of field 1890 of FIG. 20 results in display of the screen of FIG. 21 where the user has the option to either update the business information or change categories. If business information is selected, FIG. 22 may be displayed. FIG. 22 includes the business listing information that may be updated, such as a street address or e-mail address associated with this business listing.

Referring back to FIG. 16, a section of the displayed interface 1883 indicates options for creating a website linked to a particular business listing. Note also that in some embodiments, it is possible to enhance a business listing and/or link a listing to a pre-existing website or to one that is created.

The foregoing user interfaces and display results may vary with embodiments and user-specified search criteria. Various other user interfaces and other techniques known to those of ordinary skill in the art for specifying user search criteria may be used in other embodiments of the invention.

Figure 23:
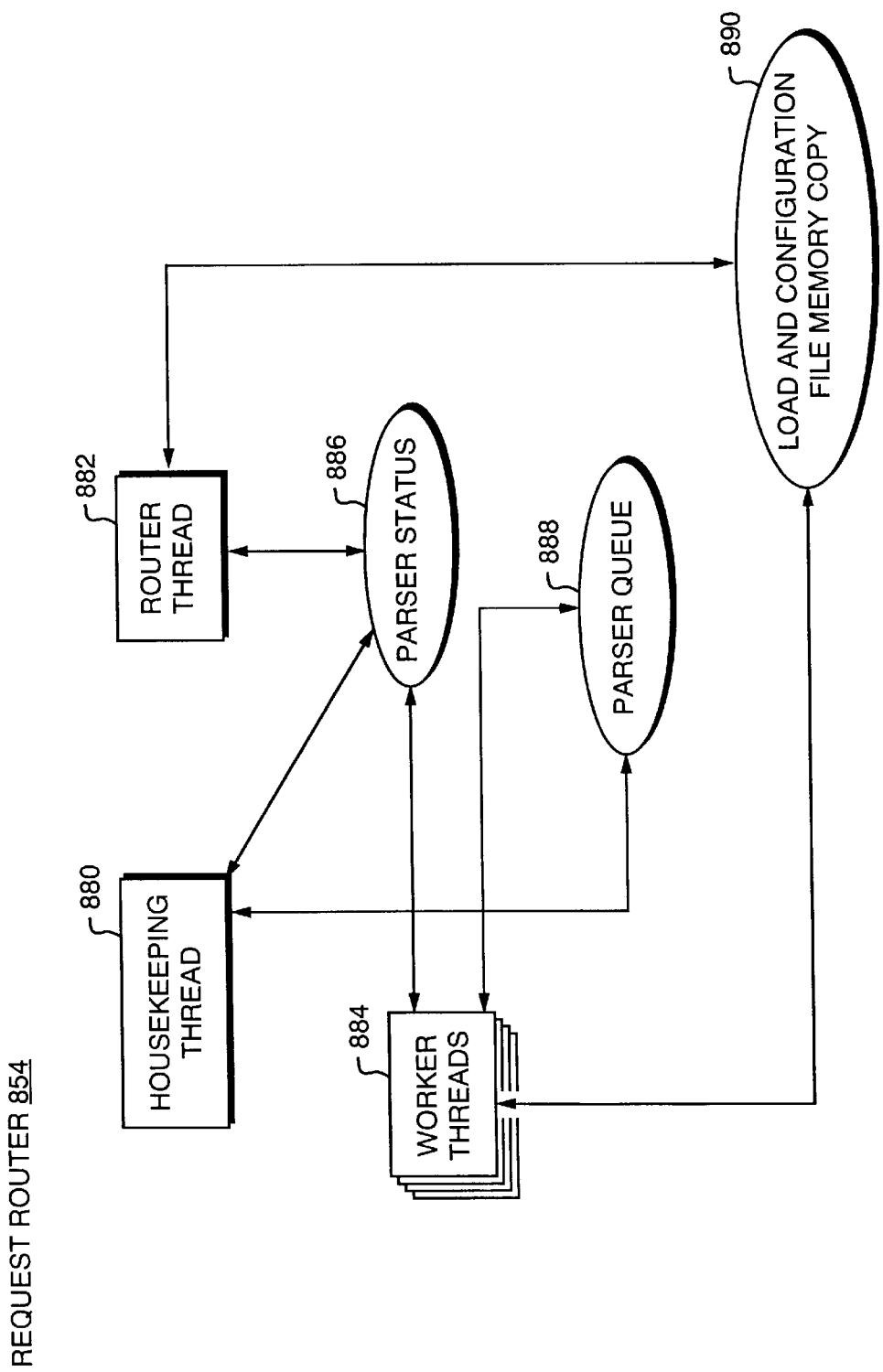
FIG. 23 is an example of an embodiment of the processes included in the request router of FIG. 22.

Referring to FIG. 23, shown is an embodiment of the request router 854. In this particular embodiment, the request router 854 may be executed within a Netscape server process space and may be invoked when a user, via a browser, makes a request which results in a PHTML file being executed. The PHTML files, as generally included in the PHTML file store 844, are in the form of a script activated when a server node 808–810 is forwarded a user request.

The request router 854 is generally responsible for routing a request to the proper server node in accordance with data stored in the configuration and load files. The request is also forwarded to one of the plurality of parsers for processing once the proper server node has been located. In this embodiment, the request router 854 may include several threads of execution as shown in FIG. 23, which operate under the control of, and in the same process space as, the Netscape browser. As shown in FIG. 23, the request router 854 generally includes a housekeeping thread 880, a router thread 882, and one or more worker threads 884. Generally, the housekeeping thread 880 is responsible for maintaining a parser status table 886 and a parser queue 888, both of which are further described below.

The router thread 882 generally responds to the monitor process changes as recorded in the various data files with regard to server node availability. The router thread 882 reads data from the configuration and load files, and maintains an in-memory copy for use by the various threads of the request router 854. The router thread 882 updates the in-memory copy of the configuration and load files in accordance with predetermined node fail-over and reallocation-of-request policies. For example, if in reading the configuration and load files, the router thread 882 determines that a first server node is at maximum utilization, the router thread updates its in-memory, server-node, local version of the files. The router thread determines not to forward requests to the first server. When the first server node's actual utilization decreases and is now available for processing additional requests, the router thread accordingly updates its in-memory copy.

Each of the worker threads 884 is initially forwarded a request which arrives at a server node. The worker thread 884 makes the decision whether the request should be routed to another node. The worker thread 884 makes this decision generally in accordance with the contents of the configuration and load files as previously described. If a request is determined to be routed to another server, the worker thread forwards the request to another worker thread on another server node. If the worker thread does not forward the request to another server, the worker thread determines which parser to send the request to for further processing. The list of available parsers is stored in the parser queue 888, which in this particular embodiment is implemented as an AT&T System 5™ with a system message queue. The parser queue is generally maintained by the housekeeping thread 880.

It should be noted that the Netscape™ or other HTTP server provides as a service the dispatching of requests to the various worker threads. Other implementations may provide this function using other techniques such as callback mechanisms which dispatch the user requests to one of the plurality of available worker threads 884. Generally, the parser status table 886 includes information about use, availability and location of each of the plurality of parsers on each server node. The parser status information may be used in determining where to route requests for example, as performed by the worker thread 884. The parser status information as included in the parser status table 886 may be used to route requests based on an adaptive technique similar to the adaptive caching technique which will be described in paragraphs that follow. This may be particularly useful in systems with multiple processors, for example, those in which certain CPUs are dedicated processors associated with predetermined parsers. For example, as particular requests are processed by particular parsers, each associated with a particular CPU, the parsing results may be stored in the PHTML execution tree accessed by the particular processor. Subsequent requests which are also processed by the same parser may access the cache parsing results stored in the PHTML execution tree.

In this particular embodiment, the request processing model includes a plurality of parsers and a plurality of worker threads. Using this request processing model, an incoming request is associated with a particular worker thread which then forwards the request to a parser for processing. Once this request has been associated or forwarded to a particular parser, the worker thread is disassociated with the request, and is then available for use in the pool of worker threads. The number of parsers and worker threads may be tuned in accordance with the number of user requests. One point to note using this model is that the worker thread and the parser are disassociated and thought of as distinct processing units rather than as a unit in which a worker thread is associated with a particular parser for processing an entire life of a request.

Figure 24:
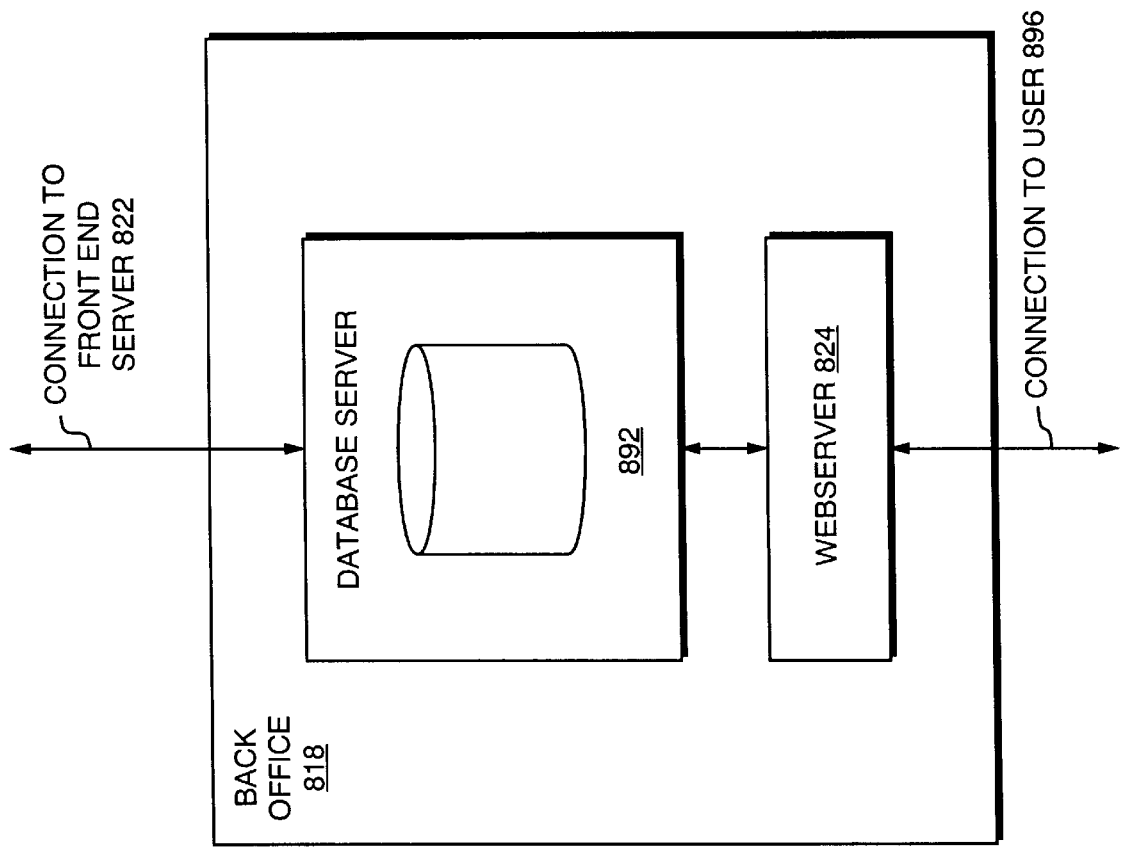
FIG. 24 is an example of a block diagram of an embodiment of the Backoffice component.

Referring now to FIG. 24, shown is a block diagram of an embodiment of the Backoffice component 818. Generally, the Backoffice component includes a database 892 which provides data, for example, to the Front End Server 804 through connection 822. The database 892, as stored in the Backoffice component, may be updated, as through a web-server via a connection to a user. Such a connection as 896 may be used, for example, when a modification is made to an entry to correct typographical error. A user may connect, such as via a browser, using connection 896, to the webserver 894 included in the Backoffice component. The database 892 is then accessed and updated in accordance with requests or updates made by the user.

Other embodiments of the Backoffice component may include other software components than those displayed in FIG. 24. Additionally, a user may update entries included in database 892 using techniques other than by a connection 896 via a webserver to the database 892. As described in other sections of this description, different types of updates to database 892 may be performed in different embodiments of the invention. For example, the database 892 may be updated on a per-entry basis by a variety of users connecting via multiple webserver connections. Additionally, periodic updates, for example, for particular data set may be provided from a particular vendor, and accordingly integrated into database 892 through a database integration technique rather than having a user manually enter these updates such as via a connection to the webserver 894.

The connection to the Front End Server 822 may be used, for example, to load a new copy of the database 892 into the Front End Server Primary and Secondary Databases 812, 814 as shown in FIG. 2. The way in which these updates may be sent across the connection 822 to the Front End Server may be as previously described in terms of database operational commands which perform updates from the computer system which include database 892. For example, in one embodiment, the database 892 included in the Backoffice component and both the Primary and Secondary Databases, as included in FIG. 24, are Oracle™ databases. Oracle provides remote database update and access commands which allow for remote database access and updating, such as update requests from the database server node 892 to update the Primary Database 812 as stored in the Front End Server 804. In this embodiment, updates as made to the database 892 are "pushed" to the Front End Server 804 via the connection 822. These modifications are pushed via database-provided update techniques such as those included when sending the operational table commands to the Front End Server 804.

In this particular embodiment when information is sent via connection 822 to the Front End Server 804 from the Backoffice component 818, error messages and other status codes may be sent back to the Backoffice component 818 in accordance with an indication as to whether a data transfer, for example, has been successfully completed.

Figure 25:
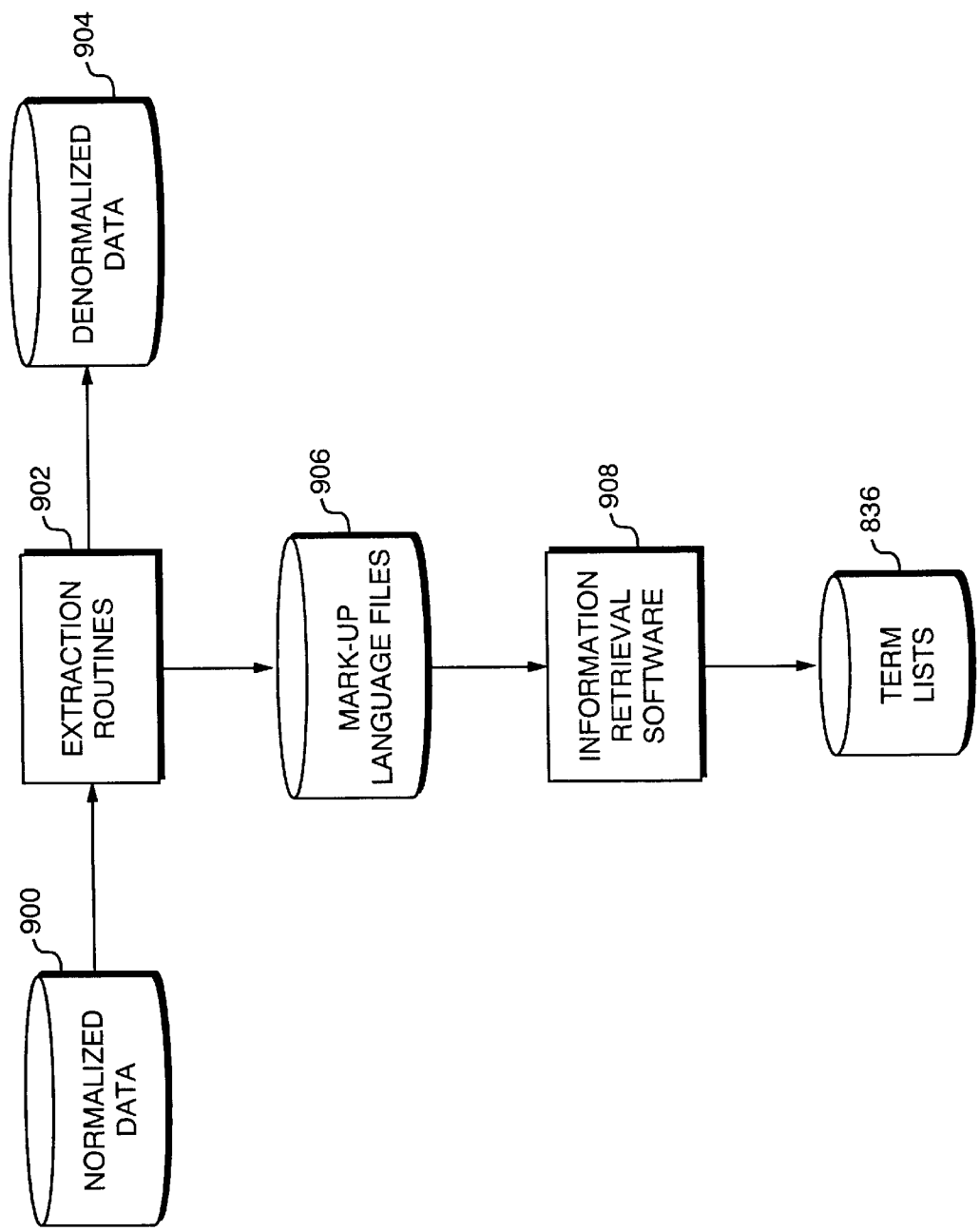
FIG. 25 is an example of the flow process representing the processing of normalized data to the various data forms included in the Front End Server.

Referring now to FIG. 25, shown is an embodiment of a general process by which data that is transferred from the Backoffice 818 to the Front End Server 804 is further integrated into other data stores within the Front End Server 804. Data is stored in the Backoffice component in this particular embodiment in a normalized dataform, as will be further described in paragraphs that follow. These normalized data changes are transfered to the Front End Server 804 from the Backoffice component in one of several forms. For example, the entire database may be transferred to the Front End Server 804. Additionally, changes or updates to particular entries may also be transmitted to the Front End Server 804 from the Backoffice component rather than updating or overwriting the entire copy of the database as stored in the Front End Server 804. Each of these types of database updates from the Backoffice component to the Front End Server 804 may be done in accordance with the number of transactions or updates to be performed. This is further described in other sections of this description.

Data which is stored in the Front End Server 804 may be stored in a normalized data format 900. Extraction routines 902 operate upon this normalized data to produce denormalized data 904 and markup language files 906. The markup language files 906 serve as input to information retrieval software 908 which outputs term lists 836. As known to those skilled in the art, a markup language file generally includes tags which represent commands or text identifiers for processing the contents of the file. For example, Structured Generalized Markup Language, SGML, is a standard based markup language known to those skilled in the art.

The process depicted in FIG. 25 is performed once data has been received in the Primary Database 812, and is first stored in the Primary Database 812 in normalized data form, as in the normalized data store 900. Extraction routines 902 examine the normalized data store 900 and rearrange the information to place it in the denormalized data form, also included in the Primary Database 812 of this embodiment. These changes or updates for the normalized data which are transformed into the denormalized data form are integrated into the denormalized data store 904. Additionally, the extraction routines 902 produce markup language files 906 which are primarily used by the information retrieval software to produce identifiers and corresponding words or terms upon which a query may be performed. These lists of key words or terms which may be searchable or retrievable and the corresponding record identifiers as included in the denormalized data store 904 may be stored in a list structure as included in the term list data store 836.

Generally, the markup language files include one file or document per business for which there is an advertisement, for example, in this particular embodiment. Each of the markup language files 906 includes markup language statements, such as SGML-like statements, with tags identifying key data items in the document for each business. In this particular embodiment, the information retrieval software is Verity software which uses as input markup language files 906. Additionally, Verity uses its own schema file by which a user indicates what key words or terms as indicated in the markup language files are searchable and which of the data fields contain retrievable information. "Searchable" as used herein means fields or key words and terms upon which searches may be performed, like index searching keys. "Retrievable" as used herein generally means fields or categories with associated data that may be retrieved. All searchable fields have a tag, such as a business name or city. Identifiers are generally produced by the information retrieval software 908. Verity™, in this particular embodiment, produces term lists 836 in which there exists a list for each particular key word, term or category followed by a chain of identifiers that indicate the record number in the denormalized data store 904. Additionally, associated with each element in the term list which indicates a record in the denormalized data, retrievable data associated with that record may also be included. For example, if the field "zip code" includes a tag as included in the mark-up language file 906 which indicates that this particular field is searchable, it may be desired that whenever a user wishes to do a search for "zip code" what is actually retrieved or displayed to the user is the city and the state. Accordingly, in this instance, the term list and the term list data store 836 contain a list corresponding to the key word "zip code". There is a term list for each particular value of a zip code. Attached to each key word "zip code" and the particular value may be a list or a chain of identifiers. Associated with each identifier on the chain may be associated data, such as the city and state, which may be retrieved when a particular zip code is searched.

Other types of data may also be included in other preferred embodiments of the term lists. For example, the data included in the term lists may be data that is also needed in performing search optimizations, weighted searches, or different types of searches, such as proximity searches. This data may further be stored in the various data files and caches of the Front End Server as needed in accordance with each implementation, for example in accordance with the types of searches and data upon which queries may be performed or otherwise operated upon by the Front End Server.

Referring now to FIG. 26, shown is a detailed description of one embodiment of an example of normalized data, as may be stored in the Backoffice component and one copy in the Primary Database 812. Generally, in the Primary and Secondary Databases 812 and 814, respectively, of FIG. 2, the Primary Database 812 includes both normalized and denormalized data form, and the Secondary Database 814 includes only denormalized data form. Normalized data is that representation of the data in which each data relation is represented independent of other relations. Generally, denormalized data is the antithesis of a normalized data in which one data relation represents all relations. Different databases may be of different degrees of normalized and denormalized data. The Backoffice component 818 generally stores the data in normalized data form of a certain degree. Similarly, the databases used in this server store the data in a form of a normalized form also of a certain degree and additionally in a denormalized form for search performance optimizations on performing data queries. In one embodiment, for example, the data is stored in third degree normal form. Additionally, in the denormalized form, sets of data may be stored together within a single field, such as multiple mailing addresses. Other embodiments may have one field per address. This may prove to be advantageous, for example, for high performance and better flexibility in systems subject to multiple and diverse data sources, and a high rate of modifications.

As shown in FIG. 26, for example, each particular business entry may have a unique identifier, (ID). Additionally, three pieces of information may be stored for each particular business. The normalized data form may look as in FIG. 26. In this particular example, there may be a separate table for each ID corresponding to a business and its business address 910. Additionally, there may be two other data tables of information also indexed by each particular business ID, such as email address 912 and telephone number 914. Generally, as indicated in FIG. 26, the normalized data representation for each business associated with a particular ID is represented as a separate data relation independent of the other relations.

The conceptual opposite of normalized data is denormalized data, as depicted in FIG. 27. Referring now to FIG. 27, shown is an example of denormalized data stored in table 916. In this example of denormalized data, for each ID associated with a business, the business address, email and telephone number, may be stored in a single record. In other words, one data relation, which is a single record in the table 916, represents all relations for one particular data set, such as the ID corresponding to a business. Various degrees of denormalized and normalized data as known to those skill in the art, may be used. The optimal degree of normalized and denormalized data forms may vary with each particular implementation and embodiment.

Referring back to FIG. 20, it may generally be noted that the Backoffice component 818 may include one or more database servers 892. A user may directly interact with the web server 894 included in the Backoffice component via connection 896 which, for example, may be a network connection of a user accessing the web server through the Internet. The user may also interact directly with the Backoffice component through the Front End Server Connection 822.

In this embodiment, the particular type and number of data fields may vary with embodiment. Additional structure may also be imparted to data fields, such as a telephone number may include an area code and exchange component. Additionally, interactions between the Primary Database 812 of the Front End Server 822 and the Backoffice component may be driven or controlled by the Backoffice component. For example, when there is an update to be performed to the Primary Database server 820, an automatic transfer of the new information may be transmitted to the Primary Database 812 by the Backoffice component. Data may be transmitted to the Primary Database 812 using connection 822. Additionally, connection 822 may be used to provide feedback or status information to the back office component 818, for example, regarding success or failure of a data transfer using connection 822.

As generally described, the PHTML files 844 of FIG. 4 are generally HTML instructions as interpreted generally by a browser with additional embedded processing instructions. Generally, the PHTML execution tree 846 may be implemented as a C++ applet class with various execute methods which are conditionally performed based upon the evaluation of certain conditions as indicated in the PHTML scripting language statements. Each of the PHTML files 844 may be expanded and evaluated in accordance with the particular conditions of the user request. The first time a PHTML file is accessed, it is expanded and the expanded version is placed in the PHTML execution tree 846 of FIG. 4. Subsequent accesses to the same PHTML file result in the conditional evaluation of the stored and expanded PHTML file in accordance with the run time performance and evaluation of a user request, as from browser 824.

An HTML page is generally formed and displayed to the user. For example, the HTML page may be formed by the parser after interaction with the data manager and query engine to select a specific number of items to be displayed to the user. The HTML page may be stored in the page cache 848. The page cache generally includes a naming convention such as a file system in which the name of the file corresponds to the arguments and parameters of the query. The technique for forming the name is described in other paragraphs of this application.

The query engine 862 is generally responsible for performing any required sorting of the query information or subsetting and supersetting of information. Generally, the query engine 862 retrieves various identifiers which act as keys into the Primary Database 812 or Secondary Database 814 for accessing particular pieces of information in response to a user query. After the query engine 862 formulates and retrieves various identifiers, for example as from the term lists, which correspond to a particular user query, this query information in the form of term list and retrieved information may be stored in the data query cache 850. A technique similar to the page cache query-to-filename mapping technique may be used to map a particular query request to a naming scheme by which data is accessed in the data query cache. The technique for forming this name is described in other sections of this application.

Additionally, data which is stored in the data query cache 850 may be compressed or stored in a particular format which facilitates easy retrieval as well as attempting to optimize storage of the various data queries which are cached, as discussed in other portions of this application.

Figure 28:
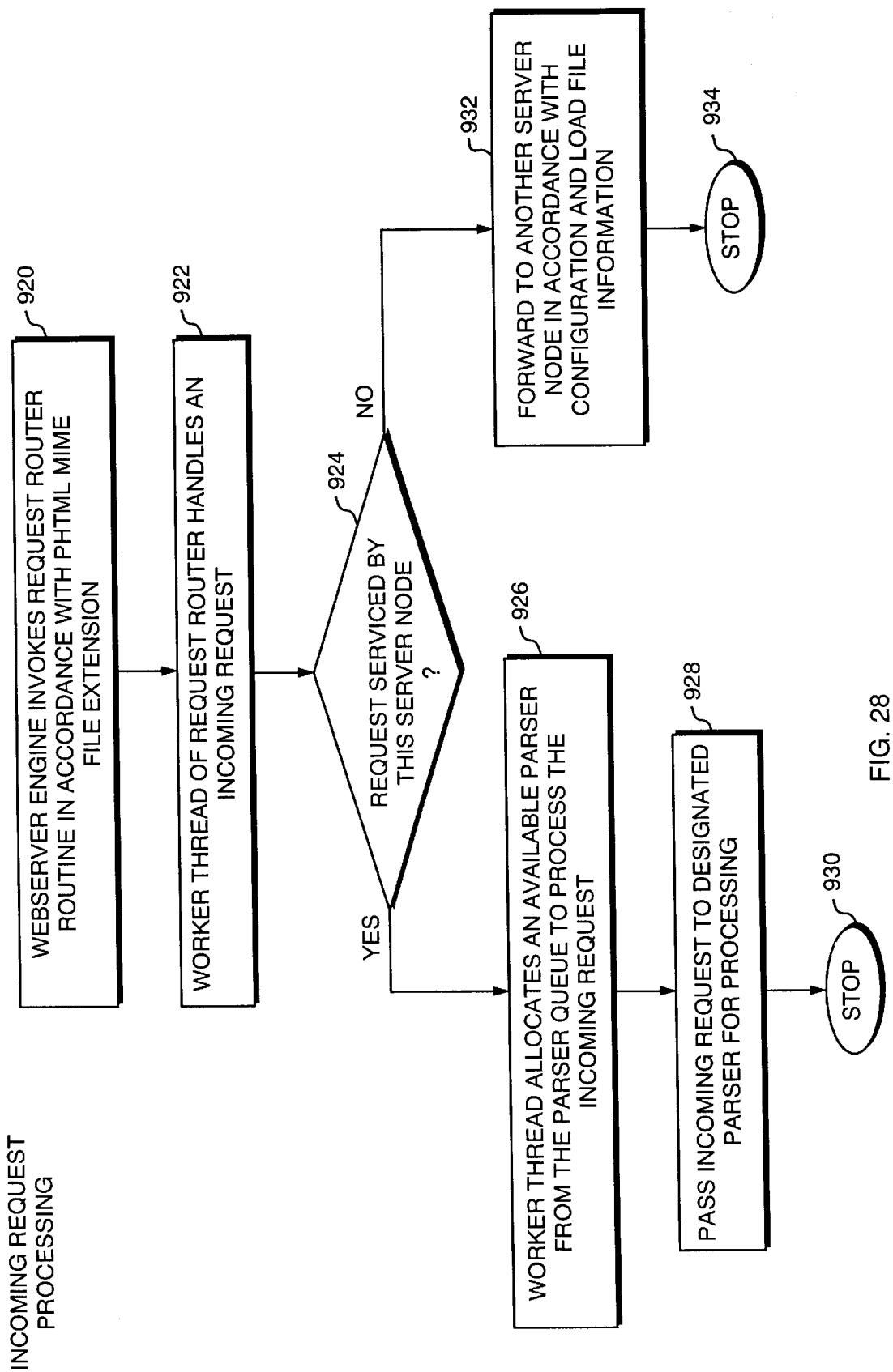
FIG. 28 is a flowchart of an example of an embodiment of a method for performing request processing in the system of FIGS. 2 and 4.
Figure 29:
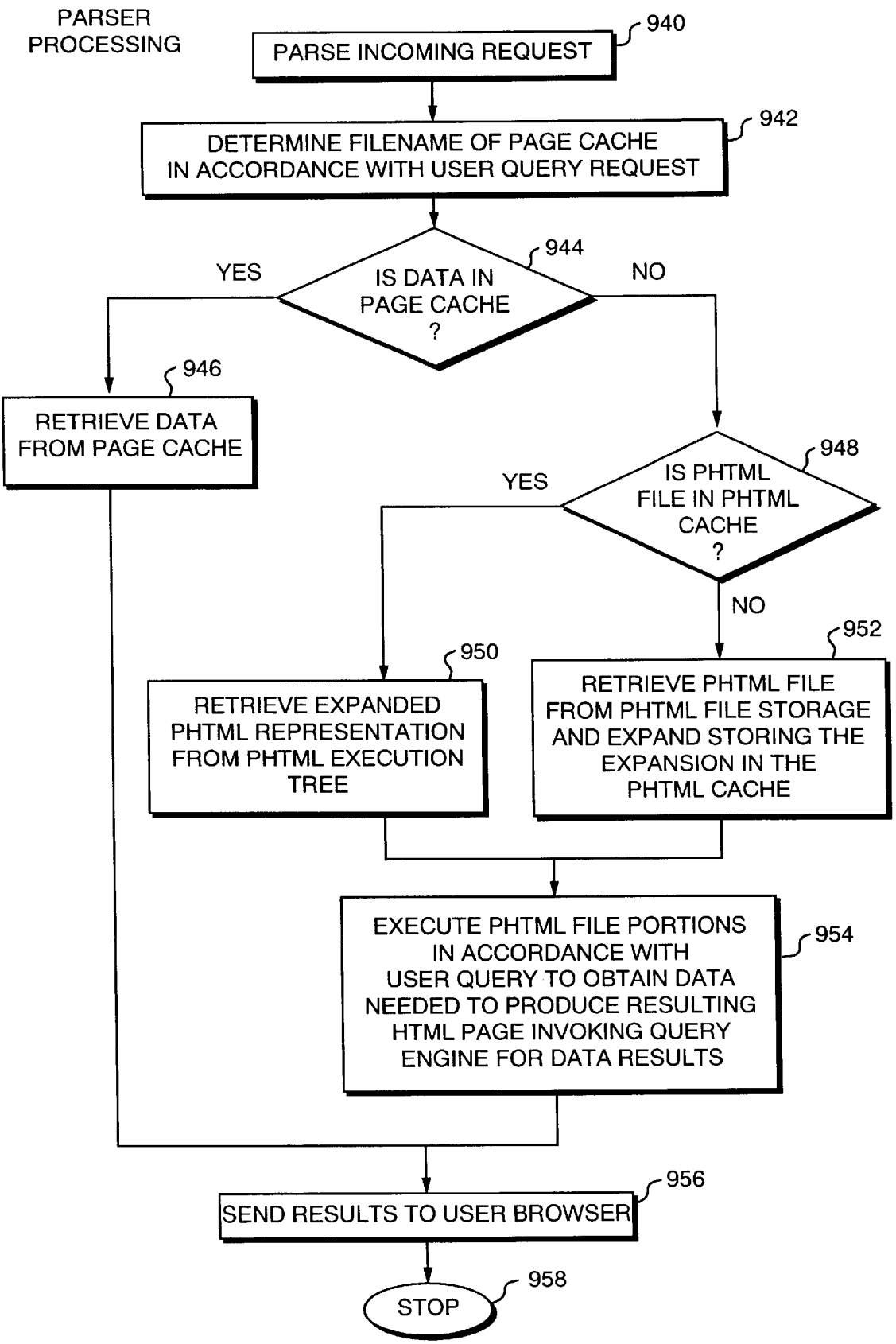
FIG. 29 is a flowchart of an example of an embodiment of the method steps for performing parser processing in the system of FIGS. 2 and 4.
Figure 30:
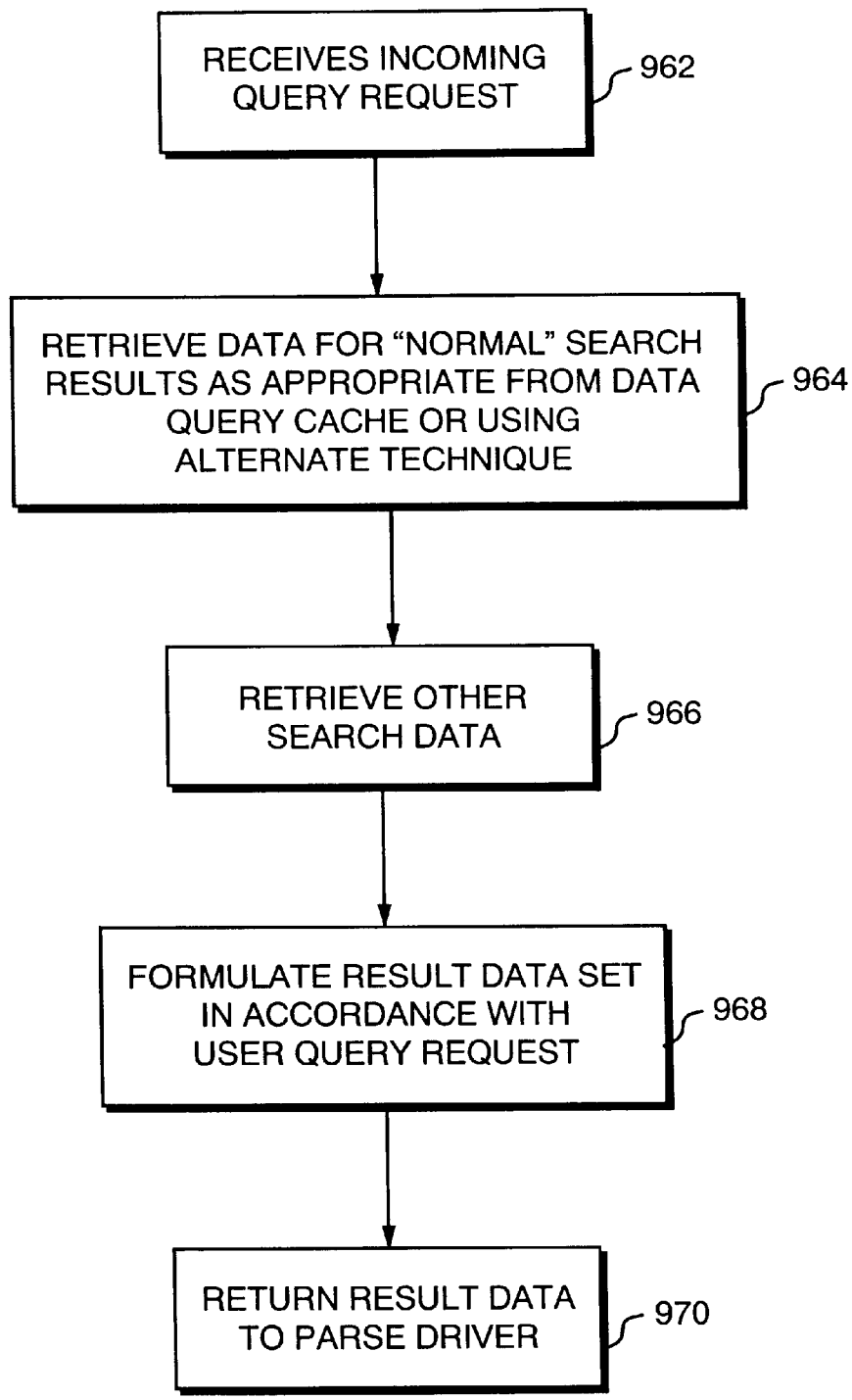
FIG. 30 is a flowchart of an example of a method with steps for performing query engine processing in the system of FIGS. 2 and 4.

In the following FIGS. 28–30, shown are flowcharts of method steps of embodiments for performing processing in various components of the previously described system of FIGS. 2 and 4.

Referring now to FIG. 28, shown are steps of one embodiment of a method of processing a request in the system of FIGS. 2 and 4. At step 920, the Webserver engine invokes the Request Router in accordance with the PHTML MIME (Multipurpose Internet Mail Extension). At step 922, the Worker thread as included in the Request Router is initially forwarded the request for processing. At step 924, a determination is made as to whether or not this request is serviced by this node in accordance with the information included in the configuration and load files. If, at step 924, a determination is made that the request is not to be serviced by this node, the request is forwarded to another server node in accordance with the load and configuration file information. If, at step 924, a determination is made that this request is to be serviced by this node, control proceeds to step 926 where the Worker thread allocates an available parser from the parser queue to process the incoming request. At step 928, the incoming request is passed to the designated parser for processing.

Referring now to FIG. 29, shown is a flowchart of one embodiment of method steps as may be performed by the parser. At step 940, the parse driver of the parser parses the incoming request. In this embodiment, the query request that is parsed is included as a URL parameter that is processed by the parse driver. For example, if the query includes syntax errors, the parse driver will detect and report out such errors. At step 942, a unique file name is determined in accordance with the query request. This filename corresponds to the display results that may be included in the page cache. It should be noted that this filename is unique for a particular user query and in accordance with "look and feel" parameters of the display results. For example, "look and feel" refers to parameters that describe the displayed results, such as number of business listings displayed in an HTML page, the particular starting point of the displayed results with regard to the resulting data set. For a given resulting data set corresponding to a user query, on a particular type of user display window, 15 items may be displayed. The same query performed by a second user from a different display window may display 17 items. Thus, the resulting HTML page in both cases is different even though the resulting data set used in forming each of the HMTL pages is different. The page cache may include a different HTML page for each of the 15 and 17 item displays.

A determination is made at step 944 as to whether the page cache includes the data in the filename determined at step 942. If a determination is made that the data is included in the page cache by the existence of the file, control proceeds to step 946 where the data in the filename is retrieved from the page cache. Control proceeds to step 956 where the resulting HTML including the data in display format is delivered to the user's browser.

If a determination is made at step 944 that the data is not in the page cache, control proceeds to step 948 where a determination is made as to whether or not there is a PHTML file in the PHTML execution tree. If a determination is made that the expanded PHTML representation for this request is included in the PHTML execution tree, control proceeds to step 950 where the expanded PHTML representation is retrieved. Control proceeds to step 954 where portions of the PHTML file are executed in accordance with the user query to obtain data to produce the resulting HTML page by invoking the Query engine for data results. The data results are returned to the parse driver that creates a resulting HTML file returned to the user's browser at step 956. Additionally, it should be noted that the resulting HTML file may be cached in the Page cache in accordance with predetermined criteria, as previously described. The resulting HTML file is communicated directly to the user's browser. If a determination is made at step 948 that the PHTML file is not in the PHTML cache, control proceeds to step 952 where the PHTML file is retrieved from the PHTML file storage and subsequently expanded. The expanded PHTML file is stored in the PHTML cache. Control proceeds to step 954, which is described above.

Referring now to FIG. 30, shown is a flowchart of the method steps of one embodiment for performing query engine processing. At step 962, the query engine receives an incoming request, as forwarded by the parse driver in step 954. At step 964, the data is retrieved for the "normal" search results as appropriate from the data query cache, or using an alternate technique. Details of this step are described in more detail in following paragraphs describing the use of the data query cache. Generally, "normal" search results refers to the resulting data set formed by business listing data associated with a well-defined geographic area. In addition to "normal" search result data are other search result data that may not be associated with a single well-defined geographic area, such as virtual businesses in the Internet. These other search results that may not be associated with a single well-defined geographic area are described in more detail in paragraphs relating to the data query cache and its use. At step 966, other search data in addition to the "normal" search data may be retrieved and integrated into the resulting data set. At step 968, the result data set is formulated in accordance with the user query request, such as displaying results in a particular order or beginning at a particular point. At step 970, the resulting data set is returned to the parse driver for formatting in a display format in an HTML file.

In this particular embodiment, the Standard Industry Classification (SIC) may be used to indicate various name categories and synonyms. These various name categories and synonyms are produced, for example, by the extraction routines which produce the markup files, as used in this particular embodiment by the information retrieval software. Other techniques may be used to facilitate name categories, and equivalents thereof, for searching in other preferred embodiments.

It should generally be noted that in the various descriptions included herein, certain portions of the data storage, such as the image repository 840, are updated on an incremental change or delta basis. Other preferred embodiments may have different thresholds or techniques to update various data stores included in the Front End Server 804. These techniques may vary with implementation.

The architecture described in FIGS. 2 and 4 is a highly optimized, distributed, fault tolerant, collaborative architecture. The primary purpose of this architecture is to support a high volume of searches, which may be performed for example, through the Internet. In this particular embodiment, the databases may include business information, such as for specific businesses or classifications of businesses. Additionally, data queries may be performed based on characteristics of the various businesses, such as location, name, or category. Furthermore, the architecture described herein supports a flexible presentation of these businesses, based on business agreements and service offerings. The architecture described herein uses various techniques and combinations to achieve high performance while maintaining flexibility and scaleability.

The architecture as depicted in FIGS. 2 and 4 includes a set of fully redundant server nodes in which each node is capable of responding to any search request. Each server node communicates with all the other nodes, as previously described, establishing the health and availability of each server node. Incoming requests are classified by each node, as routed by the hardware router, using a classification scheme held in common and by consensus. The nodes agree to a disjoint partitioning of requests to each of the server nodes in which one server node will service a set of classes of requests that no other node will generally service. A number of complimentary techniques, including Subsumption and Highly Redundant Caching, may be then used to adapt a particular node to a particular class of requests. Thus, the latency for request servicing by that node decreases as additional user queries are performed for each particular class of requests.

Adaptive techniques, as those performed by the Front End Server 804, may be most effective when dealing with repeated requests or queries similar to those previously performed. Based on the adaptive techniques used herein, an initial search request may be the most costly in terms of system resources and search time. Therefore, other techniques are used in conjunction with the adaptive techniques to further facilitate performing an optimal query in response to a user request. For example, common term optimization (CTO) is one technique which is used that generally takes advantage of a statistical bias in both submitted queries and result sets towards particular words or combinations of words. By anticipating particular word combinations or precalculated result lists that match, the CTO matches the initiating search problem.

In the embodiment described herein, the Front End Server 804 has a data set domain which includes electronic yellow pages and advertising requiring a high degree of flexibility in the presentation of data. Data is generally presented using the look and feel of business partners in each business listing which may have distinct requirements for presentation. Additionally, new modes of data presentation may be defined on a monthly basis requiring updates to large numbers of data stored in the back office component in the primary and secondary database. To support flexibility, the architecture described uses several techniques that also support performance requirements of the particular data domain in this embodiment and application. Generally, techniques such as the generic object and the generic presentation language may be used to facilitate rapid introduction of new services and additional presentation data in a variety of forms to a user.

Additionally, in the embodiment described in FIGS. 2 and 4, each server may be fully redundant, and there are two additional servers that are designated database servers which have additional supporting software and hardware for facilitating database access. Other embodiments of the invention may include additional configurations of servers and databases in their particular implementation.

While including concepts and techniques described herein, for example, the different databases and packages commercially available which may be used, as known to those skilled in the art, vary with the type of data access using searches to be performed. In this particular embodiment, a relational database structure is used to store and retrieve information in the Front End Server 804. Other embodiments may include additional types of database storage using other commercially available packages or specialized software which facilitate each particular application.

[Generic Objects]

The PHTML files 844 that are provided to the parse driver 858 are scripts that direct the parse driver 858 to perform queries, view the results of queries, and provide information to the browser 824. In a preferred embodiment, the PHTML files 844 are expanded into the PHTML execution trees 846 the first time the parser 866 accesses the PHTML files 844. The parse driver 858 accesses the PHTML execution trees 846 during operation in a manner described in more detail below.

The scripts that are stored in the PHTML files 844 may include commands that are interpreted by the parse driver 858, C++ objects that are executed, blocks of HTML code that are provided by the parse driver 858 to the browser 824, and any other appropriate data and/or executable statements. The PHTML scripts perform operations of objects in a way that is somewhat independent of specific attributes of the objects and thus, as described in more detail below, provide a generic mechanism for displaying and presenting many types of objects. The PHTML scripts include conventional commands to include other files (such as other PHTML files), conditional files/text inclusion commands, switch statements, loop statements, variable assignments, random number generation, string operations, commands to sort and iterate on attributes/fields of an object according to aspects thereof, such as the name, and logging values to files. The specific syntax used for the PHTML scripting commands is implementation-dependant but includes conventional key words (such as "if" and "then") and conventional arrangements of parts of the various types of statements. As described in more detail below, the scripts provided in the PHTML files 844 are used to construct the PHTML execution trees 846 that control the operation of the parse driver 858.

Each business listing may be represented as a document stored in the primary and secondary databases 812, 814. The documents may be manipulated as generic objects. As discussed in more detail below, representing each business listing as a generic object facilitates subsequent handling of the business listings.

Figure 5:
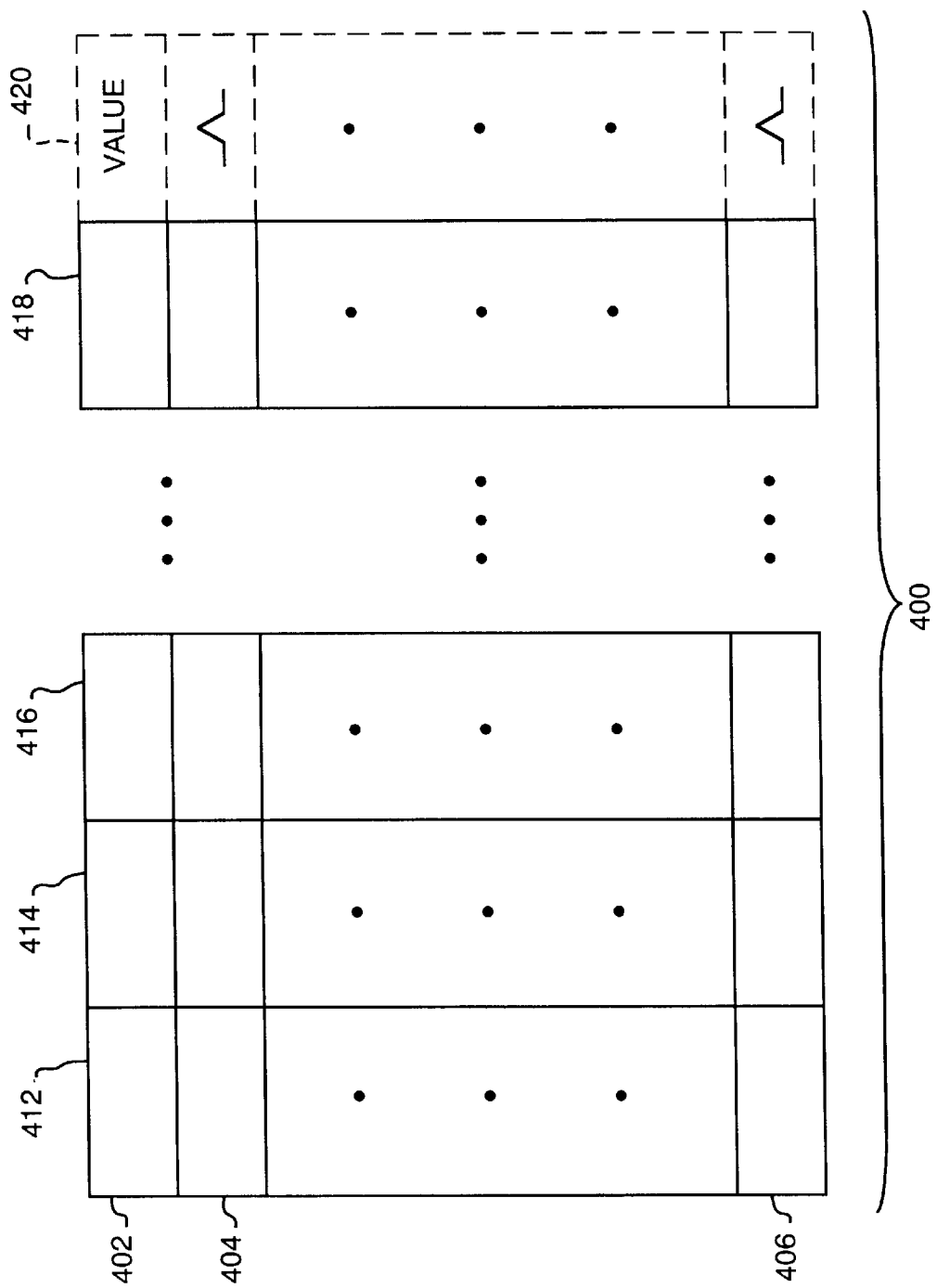
FIG. 5 is an example of an embodiment of a table illustrating data storage for denormalized objects in the databases.

Referring to FIG. 5, a table 400 illustrates data storage for a plurality of denormalized objects in the databases 812, 814. The differences between normalized and denormalized data is discussed in more detail elsewhere herein. The denormalized data format is optimized for fast performance while, perhaps, foregoing some storage compaction.

A plurality of rows 402, 404, 406 represent a plurality of denormalized generic objects, each of which corresponds to a business listing. A plurality of columns 412, 414, 416, 418 represent various attributes of the denormalized objects. In a preferred embodiment, the first attribute 412, corresponds to an identifier for the objects 402, 404, 406 and thus identifies a particular listing. Each of the attributes contains a number of fields and contains descriptor information identifying the type, size, and number of fields.

Attributes may be added to the normalized objects, or only to a specific subset thereof. A denormalized representation of any one of the objects 402, 404, 406 contains the same number of attributes as any of the other one of the objects 402, 404, 406. This allows the denormalized objects to be transferred from the primary or secondary databases to the data manager 864 in a string format wherein each object can be identified. Accordingly, if values for a new attribute are added to only a subset of the objects, then the other objects, outside the subset, will contain a null value or some other conventional marker indicating that the particular attribute is not defined (or contains no data) for the objects in question. For example, assume that a new attribute 420 is added. Further assume that the new attribute 420 only contains values for the object 402, but is not defined for the objects 404, 406. In that case, data space for the attribute 420 is still added to the denormalized version of the objects 404, 406, but no value is provided in the attribute 420 for the objects 404, 406.

Referring to FIG. 6, a table 430 represents data stored in the generic object dictionary 860 corresponding to results of a search query provided by the query engine 862 or from the data query cache 850 in the case of a previous search having been performed. In the table 430, it is assumed that a search returns a plurality of objects corresponding to n categories and up to m listings for each of the categories. The annotation $o_{jk}$ means the object corresponding to the jth category and the kth listing. In the case of the table 430 (and thus the generic object dictionary 860), the objects may be object identifiers. For example, the field 412 may correspond to an object identifier of each of the objects 402, 404, 406. As discussed in more detail below, the parse driver 858 uses the table 430 provided by the generic object dictionary 860 along with the PHTML execution trees 846, to provide specific HTML code from the parse driver 858 to the browser 824 of the user 802.

Figure 7:
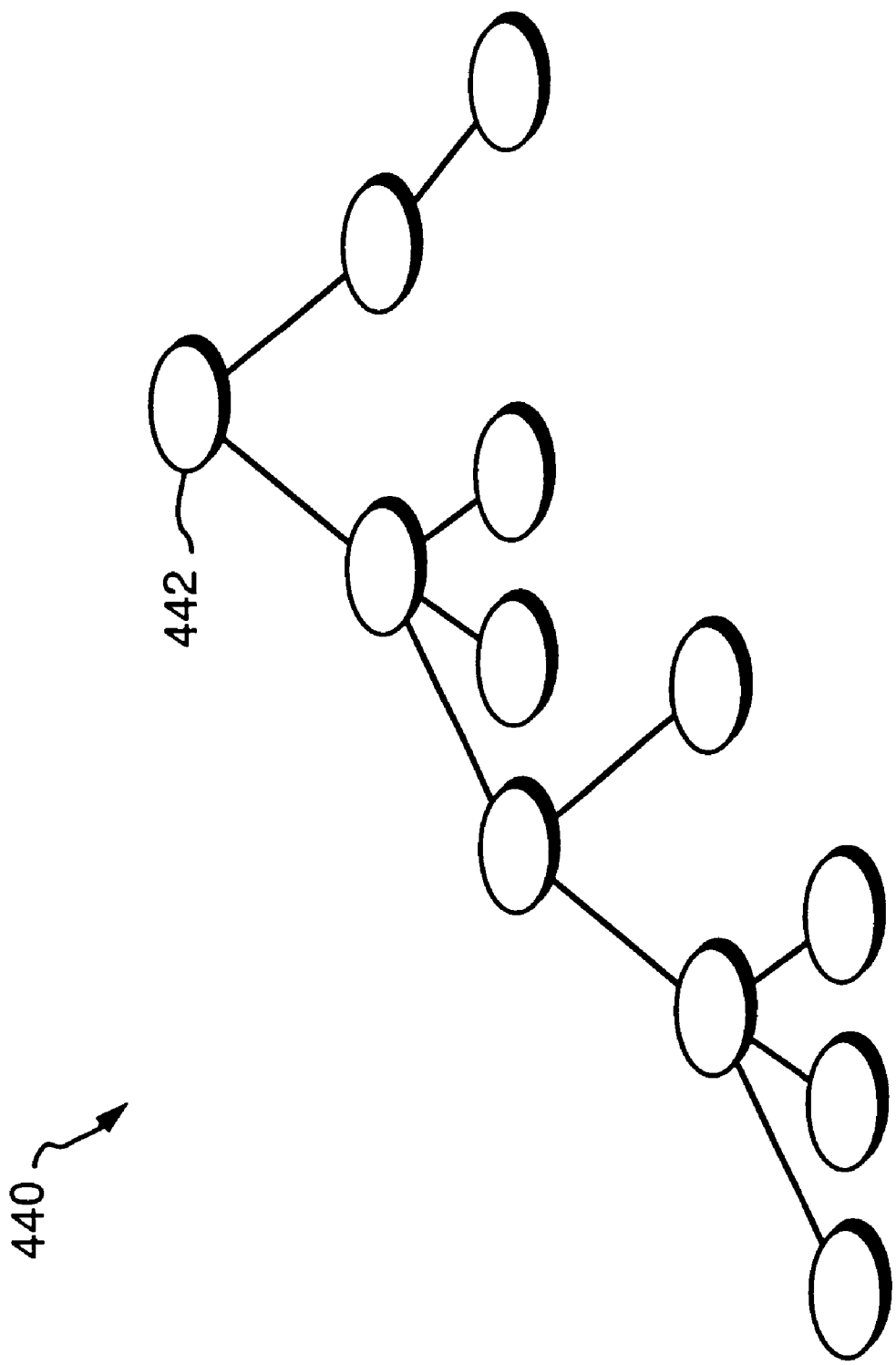
FIG. 7 is an example of an embodiment of a portion 440 of a PHTML execution tree.

Referring to FIG. 7, a diagram illustrates a portion 440 of the PHTML execution trees 846. The portion 440 is constructed using the scripts in the PHTML files 844 and consists of a plurality of nodes corresponding to the decision points set forth in the PHTML scripts and a plurality of C++ objects and HTML pages that are executed and/or passed to the browser in response to reaching a node corresponding thereto. Thus, for example, a node 442 can correspond to a PHTML if-then-else statement having two possible outcomes wherein one branch from the node 442 corresponds to one outcome (i.e., the conditional statement evaluates to true) and another branch from the node 442 corresponds to another outcome (i.e., the conditional statement evaluates to false). Such a structure may be implemented in a conventional manner given a scripting language such as that described above in connection with the PHTML language. That is, implementing such a tree structure using a scripting language is straightforward to one of ordinary skill in the art using conventional techniques in a straightforward manner.

Representing the documents (business listings) of the databases 812, 814 as generic objects facilitates modifying the documents, or a subset thereof, without modifying the parser 866. For example, if an attribute is added to some of the objects, then it is only necessary to modify the objects (schema and data) that will contain that attribute and to also modify the PHTML files 844 to include new scripting to handle that new attribute. The scripting may include statements to determine if the particular attribute exists for each object. For example, suppose the business listings were in black and white and then color was added to some of the listings. The color attribute could be added to some, but not all, of the objects only in normalized form. Once the new color attribute has been added, the denormalized versions of all of the objects would contain a data space for the attribute, but the objects that do not possess a color attribute will have a null marker. The PHTML files 844 can be modified to test if the color attribute is available in a particular object (e.g., to test for a null value) and to perform particular operations (such as displaying the color) if the attribute exists or, if the attribute does not exist for a particular object, displaying the object in black and white. In this way, the color attribute is added to some of the objects without modifying the parser 866 and without modifying existing objects that do not contain the attribute.

For each query that is presented to the query engine 862, the query engine 862 determines whether the query is found in the data query cache 850 or whether it is necessary to perform a query operation using the Verity software (discussed elsewhere herein) and the term list 836. In either instance, the results of the query are provided by the query engine 862 to the generic object dictionary 860 in a form set forth above in connection with the description of FIG. 6. The parse driver 858 and PHTML execution trees 846 then operate on the generic object dictionary 860 to determine what data is displayed to the user by the browser 824. In some instances, the PHTML execution trees 846 may require the parse driver 858 to obtain additional data from the databases 812, 814 through the data manager 864. For example, in instances where the categories corresponding to the retrieved documents (business listings) are displayed, the PHTML execution trees 846 may cause the parse driver 858 to obtain information from the generic object dictionary 860 that identifies each category and the number of listing corresponding to each category. Then, the portion of the PHTML execution trees 846 may cause the parse driver 858 to use the data manager 864 to access additional information from the databases 812, 814, such as the names of the categories corresponding to the category identifiers provided in the generic object dictionary 860.

Figure 8:
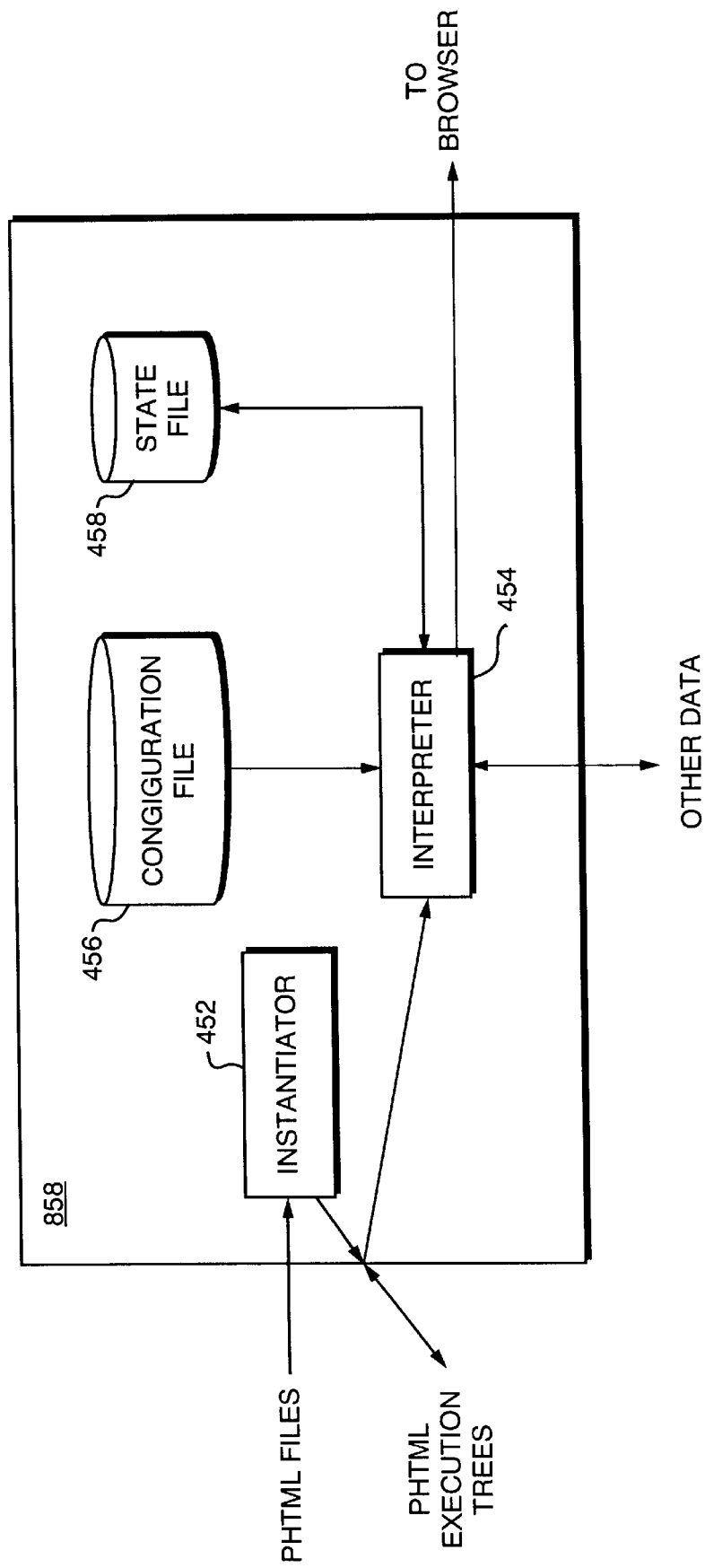
FIG. 8 is an example of an embodiment showing more detail of the parse driver.

Referring to FIG. 8, the parse driver 858 is shown in more detail. An instantiator 452 creates the PHTML files 844 and constructs the PHTML execution trees 846 from the PHTML scripts the first time the PHTML is invoked by the parse driver 858. Instantiation includes reading the PHTML files and constructing trees, such as that shown in FIG. 7, based on the PHTML scripts provided in the PHTML files 844. As discussed above, constructing such trees from a scripting language is generally known in the art.

An interpreter 454 accesses the PHTML execution trees 846 and, based on the information provided therein, provides HTML data to the browser 824 and/or executes a C++ object. The interpreter 454 also accesses a configuration file 456 and a state file 458 which keeps track of the state of various values during traversal of the PHTML execution trees 846. The interpreter 454 also receives other data that is used to traverse the PHTML execution trees 846 and to provide information to the browser 824. The other data may include, for example, data from the data manager 864 and data from the generic object dictionary 860. The state data 854 includes information such as the number of iterations (in the case of an iterative loop), the values of various environment and other variables from the PHTML execution trees 846, and the values of other variables and data necessary for performing the operations set forth in the PHTML execution trees 846.

The technique disclosed herein relates to a new data type which abstracts the data interpretation from the data typing by using data schemas. A novel approach is the use of this data typing for rapid service deployment in search engines for advertising services on the Internet. For example, new presentation types may be introduced by an advertiser due to the large number of possible ways to present data to a user. An advertiser may wish to change the information displayed when a user performs a query that results in displaying information regarding the advertiser's business. If there are tens of thousands of advertisers which perform this task on a monthly basis, this implies a very high rate of new presentation types which an online advertising service must be able to accommodate. Use of this generic data type in GTE Superpages™ provides a flexible and efficient approach to incorporate these additional and new presentation types for large numbers of advertisers.

Generally, this technique provides for rapid integration of new data types without requiring recompilation or code changes in source code which uses instances of data that include the additional data types. This provides for the flexible and efficient introduction of data changes.

The generic data typing is optimized for performing multiple data operations by providing a small subset of possible operations or accesses upon any data of the generic data type. Therefore, these small subset of operations which are known may be optimized wherever there is a data access, for example, within the parser. This is in contrast to a non-generic data typing scheme which requires the introduction of a new data type and additional associated access patterns. In a non-generic data typing scheme there is an unlimited and unknown number of access patterns for which optimizations must be performed on an ad-hoc basis as new data types are introduced. Thus, when a new data type is introduced, the possible accesses need to be analyzed and optimized. In addition, the technique described herein provides for denormalized, flat, representations of the objects that facilitate rapid and efficient handling thereof.

The parse driver 858 uses a data schema description to interpret the various data attributes and fields of the generic data objects. Generally, the abstraction of the data interpretation into the data schema description enables different components of the parse driver to operate upon and use generic data objects without having these components require code changes or recompilation due to the introduction of new presentation types. Components which need to know the details of the generic data object, such as the parse driver 858, to perform certain functions, do this on a per component basis by using the data schema description to interpret a generic data object. This insulates code from the introduction of new presentation types which are represented as the generic data objects.

[Query Cache and Request Allocation]

When performing the routing of particular requests, such as data queries, existing systems may perform request routing to a particular server in a distributed computer system without reference to certain available factors, such as an initial partitioning of the entire domain, or an assumption that data queries will be cached in a data query cache and subsequently reused for additional searches. Generally, using the concepts which will be described in paragraphs that follow, the larger the number of queries that are performed when routed to a particular node in accordance with an initial allocation scheme, the quicker subsequent searches on this same particular node may be performed due to the use of the data query cache.

This embodiment relates to concepts that may be included in a variety of applications. One embodiment that includes these is the GTE Super Pages on-line Internet tool that may be used to perform data queries. As an example, consider using this tool to perform an on-line query of all French restaurants within thirty (30) miles of Boston. Generally, GTE Super Pages performs this query returning search results to an on-line user. Concepts which will be described in paragraphs that follow may be generally used and adapted for use in querying any search domain.

A worker thread classifies a request and performs query partitioning in accordance with the URL information. For example, this may include data from the query request such as a specified state, zip code, or area code. The request router 854 receives an incoming request as forwarded by the hardware router. Within the request router 854, FIG. 4 is generally machine-executable code which embodies the concepts of an adaptive and partitioning scheme with regard to routing requests. Use of this technique allows for high performance search optimizations that leverage and ensure server node adaption to a particular class of requests. The technique of adaptive query partitioning generally increases the performance in terms of high throughput and low latency where queries include Boolean search terms. This search optimization technique may include three components: query partitioning, highly redundant caching, and subsumption.

Query partitioning is the strict classification and routing of a particular query based on its input term characteristics to a node or a particular set of nodes. This information is stored in the various configuration and load files, as described in other sections of this application. Query partitioning ensures that any adaption a node undergoes based on the characteristics of queries that it processes is maintained. Specific nodes may serve specific query partitions. Caching and result set manipulation techniques may then be used on each particular node to bias each particular node to the query partition to which it has been assigned.

Highly redundant caching is generally a technique that trades storage space against time by storing result sets along with subsets of these result sets. The highly redundant caching technique generally relies on the fact that the search time to locate an existing result is generally less than that amount of time which would result in creating the query result from a much larger search space.

One highly effective set manipulation technique, referred to as subsumption, is especially important in the adaption of a particular node. Subsumption is generally the derivation of query results from previous results, which can be either a superset of the requested result or subsets of the requested result. Subsumption is also the recognition of the relationship between queries and the determination of the shorted derivation path to a result set. That derivation may be the composition of several subsets resulting in a superset, or the extraction of a subset from a recognized result set. In subsumption, the presence of an additional conjunctive ("and") search term corresponds to the formation of a subset from the superset described without the additional term. The presence of an additional disjunctive ("or") search term corresponds to the identification and composition of existing subsets each described by one of the disjunctive clauses.

Consider the following example of the use of the data query cache and subsequent searches which use a subset of the data stored in the cache. For example, suppose the first request results in a query of all of the restaurants within thirty (30) miles of Boston. This query data is placed in the data query cache. A second request results in a query of all the seafood restaurants within thirty (30) miles of Boston. The second request is routed to the same node as the first request in accordance with loading configuration files, for example, as shown on FIG. 4. The second query is performed quickly by using the data query cache information and searching for a subset of the cached data indicating restaurants within thirty (30) miles of Boston for a subset of this first search data which indicates seafood restaurants. Subsequently, this second request query data which indicated all the seafood restaurants within thirty (30) miles of Boston is also stored as a separate data set within the data query cache.

It should generally be noted that the data included in the data query cache is placed in nonvolatile storage such that if the node were to become unavailable, data from the data cache may be fully restored once the node resumes service.

The composition query also uses the data in the data query cache. A composition query may generally be referred to as one which is a composition of several queries, for example, when using several conjunctive search terms. For example, a request of all the French restaurants in Massachusetts, Texas and California is a composition query that may reuse any existing cached data from previous queries stored individually regarding restaurants in Massachusetts, Texas and California. A composition query is generally determined by the Parse Driver, and the request router decides to which server node 808–810 within the Front End Server the composition query is sent for processing in accordance with domain weights of the configuration file.

Consider the following Configuration File information based upon the previous composition query:

| DOMAIN | SERVER | DOMAIN WEIGHT |
|--------|--------|---------------|
| MA     | 1      | 1000          |
| TX     | 1      | 2000          |
| CA     | 2      | 4000          |

The Request Router may route the composition request to either server 1 or 2. If the request is routed to server 1, data may be cached regarding MA and TX for reuse and a new query may be performed for the CA information. If the request is routed to server 2, data may be cached for reuse regarding CA and new queries performed for the MA and TX information. The Request Router, based on the weights, sends the request to server 2 since the cost associated with performing the MA and TX queries is less than the cost of performing the CA query.

In the above caching scheme, a particular domain is associated with a particular server node upon which data query caching is performed for designated domains. The domain and server weights reflect the cost associated with processing a request on each node using the data query cache. Accordingly, routing a request in accordance with these weights results in faster subsequent query times for those requests.

Reallocation of the requests when a server is unavailable is performed with a bias toward the initial allocation scheme as indicated by the Configuration File. There is an assumption that reallocation is on a transient basis and that the initial allocation scheme is the one to be maintained. Consider the following server nodes (M1–M4) and the domains initially allocated to each node as indicated below:

Domains D1 and D2 allocated to node M1.

Domains D3 and D4 allocated to node M2.

Domains D5 and D6 allocated to node M3.

Domains D7 and D8 allocated to node M4.

At a first time, node M1 becomes unavailable and the routers reallocate Domain D1 to node M2 and D2 to node M3. At a second time, node M2 also becomes unavailable. Domains D1 and D3 are reallocated to node M3 in addition to domains D5 and D6. Domain D4 is reallocated to node M4 in addition to domains D7 and D8. At a third time, node M1 is restored and node M2 is still unavailable. Domains D1 and D2 are reallocated to M1 in addition to Domain D3. Domains D5, D6 and D4 are allocated to node M3. Domains D7 and D8 are allocated to node M4. There is a bias toward restoring the initial allocation scheme when a node becomes available. This bias contributes to faster subsequent query times upon re-entry of a server node due to the use of the data query cache, and routing of subsequent requests to the particular nodes in accordance with this bias.

In paragraphs that follow, described are data query caching techniques as may be used in conjunction with the foregoing described request routing techniques.

Figure 33:
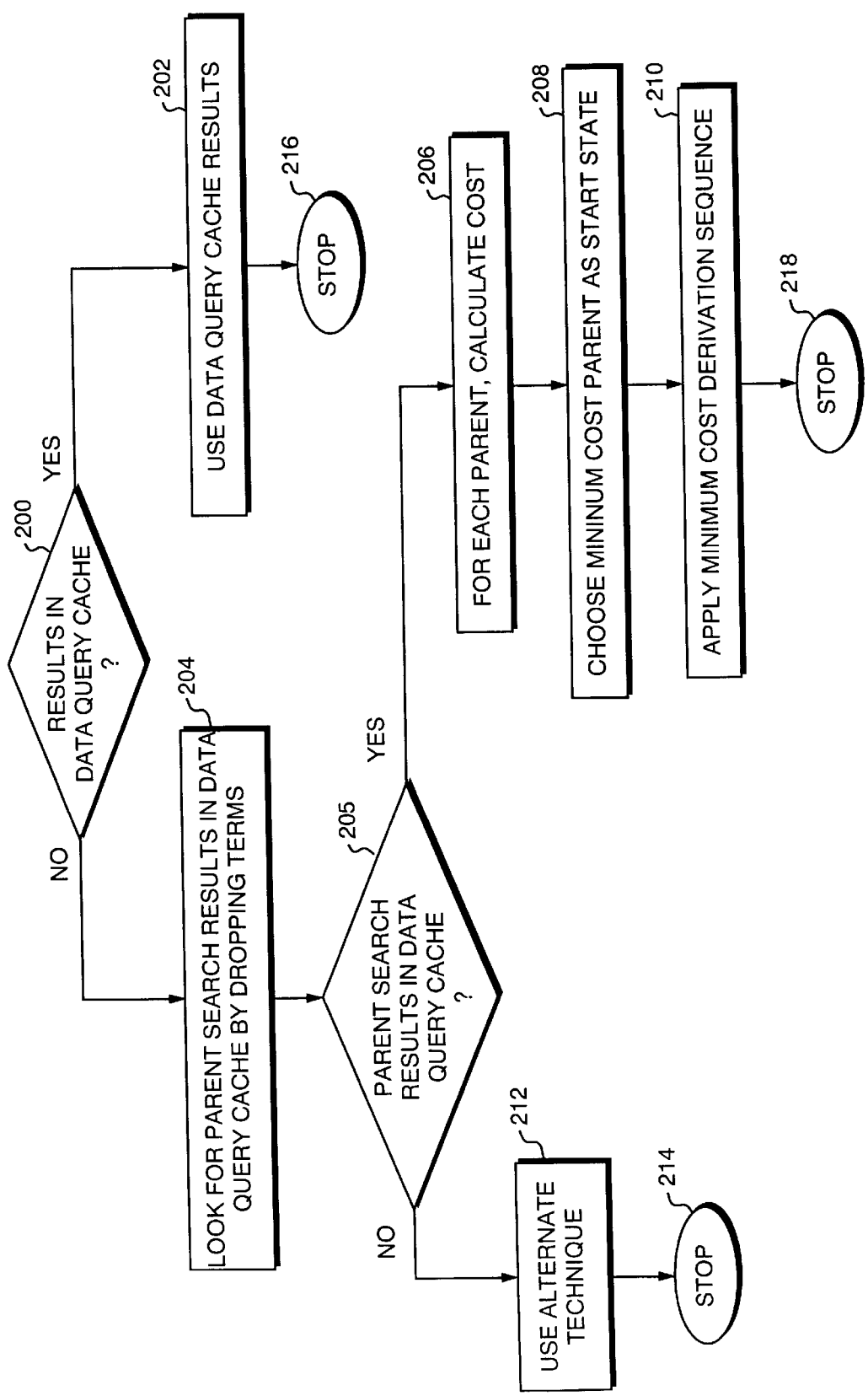
FIG. 33 is a flowchart of an example of method steps of one embodiment for performing data query cache lookup as used in performing a data query.

Referring now to FIG. 33, shown is an example embodiment of a flowchart of method steps for performing a data query. At step 200, a determination is made as to whether a data set in the data query cache corresponds to the current query being made. If so, control proceeds to step 202 where this data is retrieved and used by the query engine in formulating the query results that are displayed to the user. At this point, the processing stops at step 216.

If a determination is made at step 200 that no data set in the data query cache corresponds to the current query being made, control proceeds to step 204 where parents of the data query are determined. In this embodiment, parents of the current query are determined by dropping one of the terms. For example, if the query being made is for "MA AND RESTAURANTS AND FLOWERSHOPS", each of the three terms is sequentially dropped to form all combinations of two possible terms. In this instance, the set of parents is the following:

MA AND RESTAURANTS

MA AND FLOWERSHOPS

RESTAURANTS AND FLOWERSHOPS

It should be generally noted that in this embodiment, a search is made for only the parent terms. Similarly, other embodiments may go further in searching for results in the data query cache by also forming grandparent terms, as by dropping two terms. This process can be repeated for any number of terms being dropped and subsequently determining if any data sets in the data query cache correspond to the resulting terms.

At step 205, a determination is made as to whether data results in the data query cache correspond to any of the parent terms. If not, control proceeds to step 212 where a closest ancestor may be used as a basis for starting to form the resulting data set. In one embodiment, preprocessing insures that ancestor-based geography exists. In one implementation, that ancestor is a Verity term list associated with a particular state. This implementation uses API calls to retrieve the data identifiers corresponding to the resulting data to be included in the query results.

If, at step 205, it is determined that there are one or more data sets in the data query cache that correspond to one or more of the parent terms, control proceeds to step 206 where a cost is associated with each parent. One embodiment associates a cost with each parent term in accordance with the number of listings of each parent term. This may also be normalized and used in a percentage form by dividing the number of listings in the parent domain by the total number of listings in the query domain. This percentage represents the probability of a business listing belonging to the parent data set appearing in the database. Control proceeds to step 208 where the parent with the minimum cost is chosen as the starting data set for formulating the data results. At step 210, the minimum cost derivation sequence is applied to produce the resulting data query. Generally, the minimum cost derivation sequence is obtained by operating upon the least probability terms first.

It should generally be noted that in other embodiments in which other extended parentage thresholds are used, such as grandparents, the determination of the start data set in step

208 may be the data set with is closest in terms of parentage and with the least number of listings in the data set. The proximity in parentage is the primary ranking basis and the number of listings being secondary in determining ranking.

Figure 34:
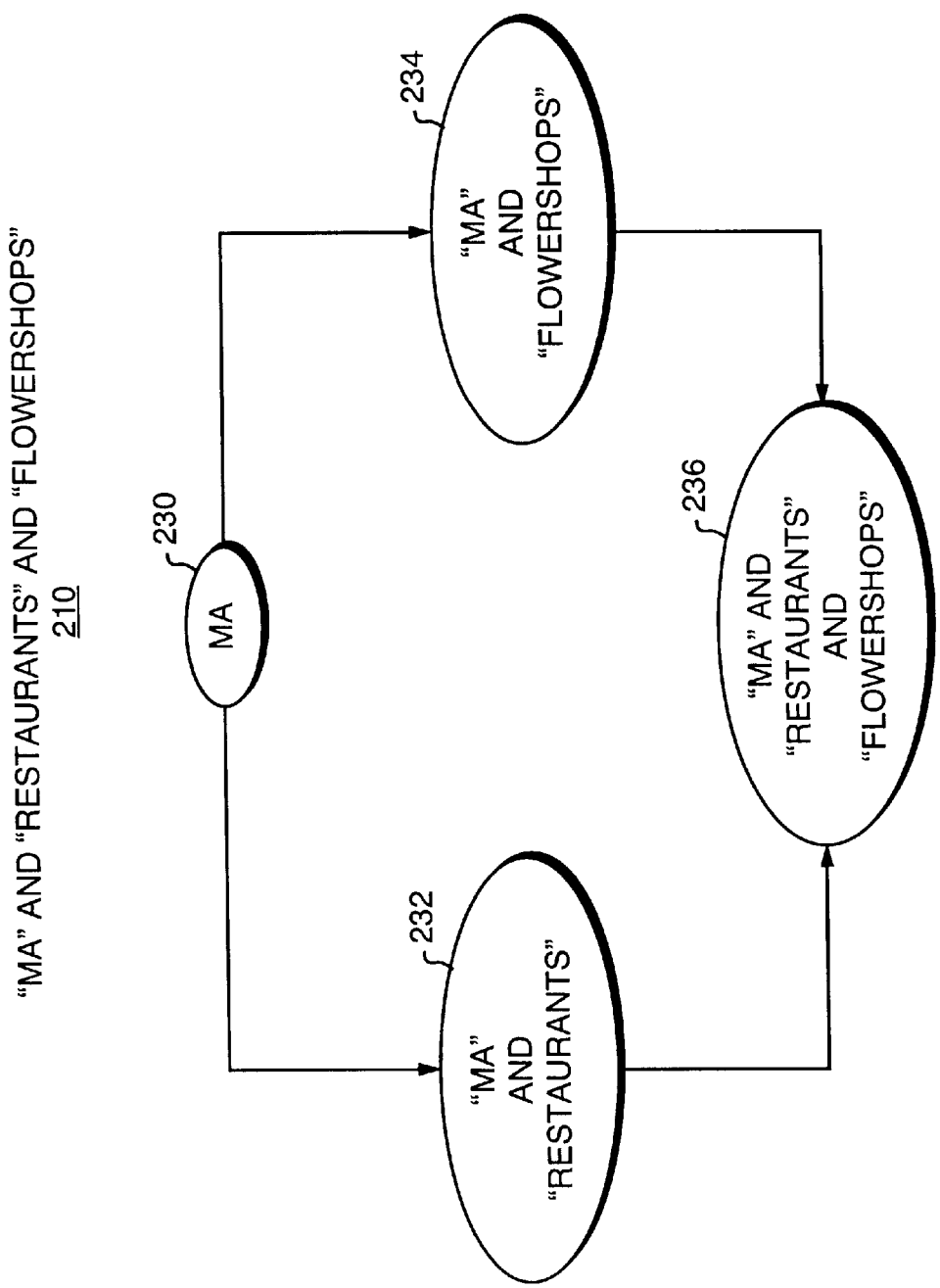
FIG. 34 represents an example of applying the minimum cost derivation sequence as applied in the step of FIG. 33.

Referring now to FIG. 34, shown is a diagram of one example used in step 210 for determining and applying the best derivation sequence. In this example, the query is for MA AND RESTAURANTS AND FLOWERSHOPS. As represented in state 230, it has been determined that MA is the starting data set which is located in the data query cache. In this example, the parentage has been extended to grandparents, and MA has been determined to be the first ranking data set in terms of parentage and number of listings in the data set. At this point, control proceeds to one of two states, 232 representing "MA AND RESTAURANTS", or 234 representing "MA AND FLOWERSHOPS". The state to which control is advanced depends generally on choosing the path with the minimum associated cost at each step. In this instance, the number of elements in the data sets "FLOWERSHOPS" (state 234) and "RESTAURANTS" (state 232) may be considered in determining cost. If the number of elements in FLOWERSHOPS is less than the number of elements in the data set RESTAURANTS, control proceeds to state 234 where each business listing in the data set FLOWERSHOP is examined to determine if it is also in MA. The resulting data set forms the set of all business listings in MA AND FLOWERSHOPS. In contrast, if the number of elements in the data set RESTAURANTS is less than FLOWERSHOPS, state 232 is entered and similar searching of the data set is performed. From either state 232 or 234, control proceeds to state 236 where searching of the data set elements is performed to produce the final resulting data set representing "MA AND RESTAURANTS AND FLOWERSHOPS". Generally, the approach just described is to advance to the next state which has the minimum cost associated until the final resulting data set is determined.

It should also be noted that some of the determination of data sets as used in performing queries may be done as preprocessing to partition the data sets. For example, in one embodiment, the data is partitioned by states. The adaptive techniques as described with regard to the GTE Superpages application described herein include partitioning the data sets based on geography, particularly within each state. In this instance, particular server nodes are designated as primary query servers based on geographic location by state. Additionally, as part of this partitioning of requests, the data query caches and term lists of identifiers are also partitioned according to state. In this embodiment, this partitioning is done as a preprocessing step prior to servicing a request in that the identifiers are formed and placed on each dedicated server node. Similarly, other data partitioning may also be performed as part of a preprocessing step. Generally, this partitioning may be determined based on expected data queries and data sets formed accordingly, for example, by examining log files with recorded data query search histories to determine frequently searched categories or combinations of categories.

A query request, as made by a user, is generally the combination of boolean operators and search terms. In this embodiment, the general form of a term in a query request is:

key=value in which the "key" represents some category or search term, such as STATE. "Value" represents the value which this key has in this particular query. With regard to the previous example, "S=MA" may represent the query term STATE=MA. Key-value pairs or terms may be joined by the logical boolean AND operation, represented, for example, as "&". The logical boolean OR operation may also be represented, for example, by another symbolic operator such as a",". For example, when looking for either cities of ACTON or BOSTON, this may be represented as:

T=ACTON,BOSTON

The number and types of "keys" varies with embodiment. For example, in this embodiment, keys include: (T) City, (B) Business Listing, (S) State, (R) Sort Order, (LT) Latitude, (LO) Longitude, and (A) Area Code. In this application, for example, LT and LO may be used to calculate data sets relating to proximity searches, such as restaurants within thirty (30) miles of Boston.

The Data Query Cache 850, in this embodiment, generally includes a "hot" and "cold" cache. In this embodiment, the caching technique implemented is the LRU (Least Recently Used) policy by which elements of the cache are selected for replacement in accordance with time from last use. These and other policies are generally known to those skilled in the art. Generally, the "hot" cache may include the most recently used items and the cold cache the remaining items. In this embodiment, each of the data query caches and other caching elements as depicted in FIG. 2, may be fast memory access devices, as known to those skilled in the art, used generally for caching.

It should generally be noted that in this particular embodiment, the "hot" cache is implemented as storing the data in random access memory. This may be distinguished from the storage medium associated with the "cold" cache representing those items which are determined, in accordance with caching policies such as the LRU, to be least likely to be accessed when compared with the items in the hot cache which are determined to be more likely to be accessed.

In this embodiment, a double ended queue structure is used to store cached objects, but other data structures known to those skilled in the art may be used in accordance with each implementation.

Data sets that are stored in the data query cache and page cache each correspond to a particular search query. In other words, a mapping technique may be used to map a particular query to corresponding data as stored in the data query cache and the page cache. Generally, this mapping uniquely maps a data query to a name referring to the data set of the data query. In this embodiment, this allows quick access of the data set associated with a particular query and quick determination if such a data set exists, for example, in the data query cache.

Figure 35:
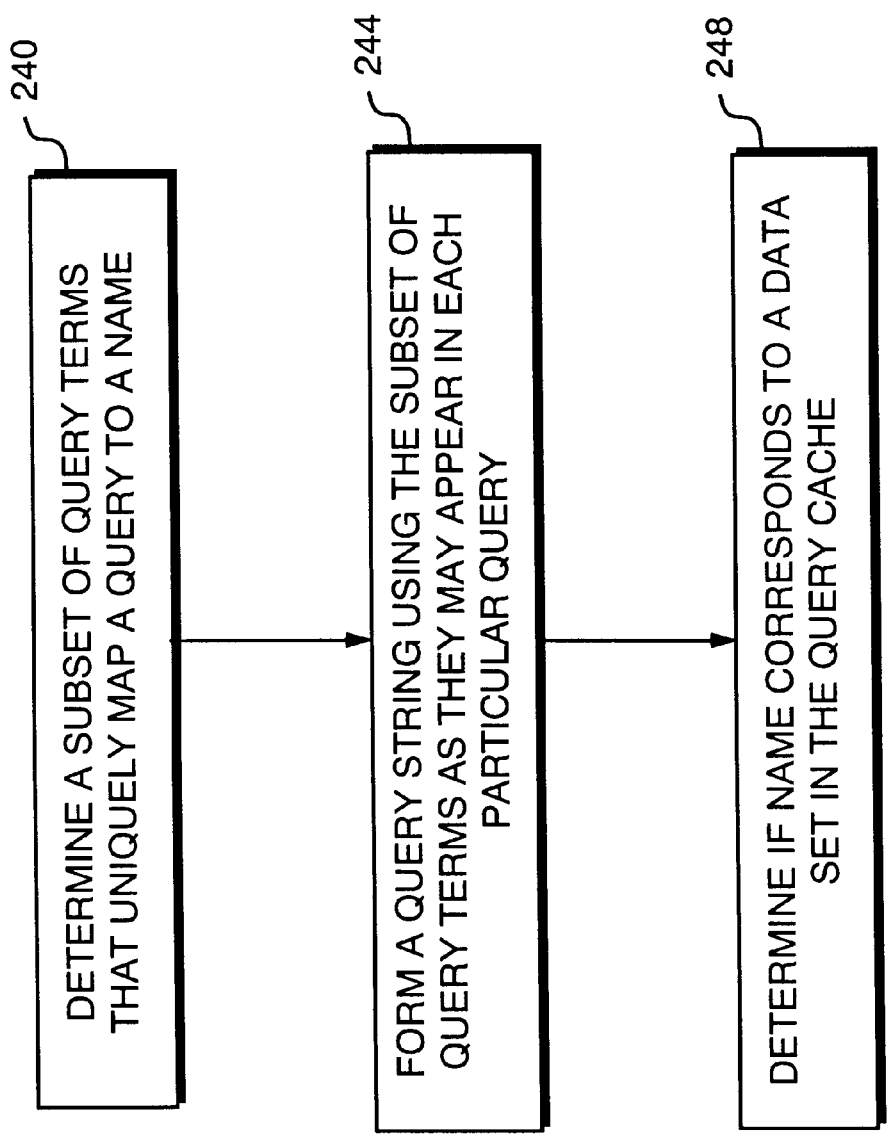
FIG. 35 is a flowchart of an embodiment of method with steps for forming a name and determining if the corresponding data set is located in the query cache.

Referring now to FIG. 35, shown is a flowchart of an embodiment of the steps for forming a name associated with a data set, as may be stored in the data query cache or page cache. At step 240, a subset of query terms is determined such that a string representing a particular query is uniquely mapped to a name corresponding to a data set. In this embodiment, the subset of keys that are used in mapping a string corresponding to a query to a name of a data set include:

Proximity, City, State, Street, Zip, Category, Category Identifier, Business name, Area code, Phone number, Keywords, and National Account.

Generally, "Proximity" represents the proximity in physical distance to/from a geographic entity, such as a city. "City", "State. Street", "Zip", "Area Code", "Phone Number", and "Business Name" represent what the keys semantically describe as pertaining to a business listing. "Category" represents a classification as associated with each business, such as representing a type of business service. "Category Identifier" is an integer identifier representing a category id. "Keywords" indicate an ordering priority for the resulting data set. "National Account" represents a business or service level parent-child relationship where the national account indicates the parent. An example is a parent-child relationship between a parent corporation and its franchises.

At step 244, a query string corresponding to a particular user query is formed using the original string as formed, for example, by the Parser of FIG. 2. The query string includes only those terms which are included in the subset as identified in step 240. If the original string does not include an item that is in the subset, for example, since the user query does not include the item as a search term, that item is omitted in forming the query string corresponding to the data set. At step 248, this query string is used to determine if a data set is located in the data query cache that corresponds to the current user query request. In this embodiment, the data sets each correspond to a filename. Thus, a lookup as to whether a data set corresponding to a particular user query exists may be determined by performing a directory lookup, for example, using file system services as may be included in an operating system upon a device which serves as a fast memory access or other caching device.

It should be noted that this technique may be used generally within the Superpages Front End Server and Backoffice to form unique names that correspond to particular search terms. For example, one embodiment may include services for operating upon the original query string as formed by the Parser to produce parents and grandparents of the terms included in a query when performing the method steps of FIG. 33 and 34 if there is no exact data set match in the data query cache. This may provide the advantage of insulating other code, such as in data encapsulation, from knowing the internal structure of the query string. Generally, as known to those skilled in the art, this is a common programming technique to minimize code portions from changes in data types and structures to minimize, for example, the amount of recompilation when a new data type is introduced or existing data type modified. Other techniques, such as hashing, may be used to generate a unique identifier for the input string, as known to those skilled in the art.

It should be generally noted that a similar mapping technique is used in forming a Page Cache name. The technique used is as described for forming the Query Cache filename with additional qualifying terms in accordance with the "look and feel", such as display features, used to produce the Page Cache name. For example, if the displayed resulting HTML page includes 15 listings/page, the Page Cache name includes a parameter in forming the name uniquely identifying the filename including the result set for a query in this particular display format.

Figure 36:
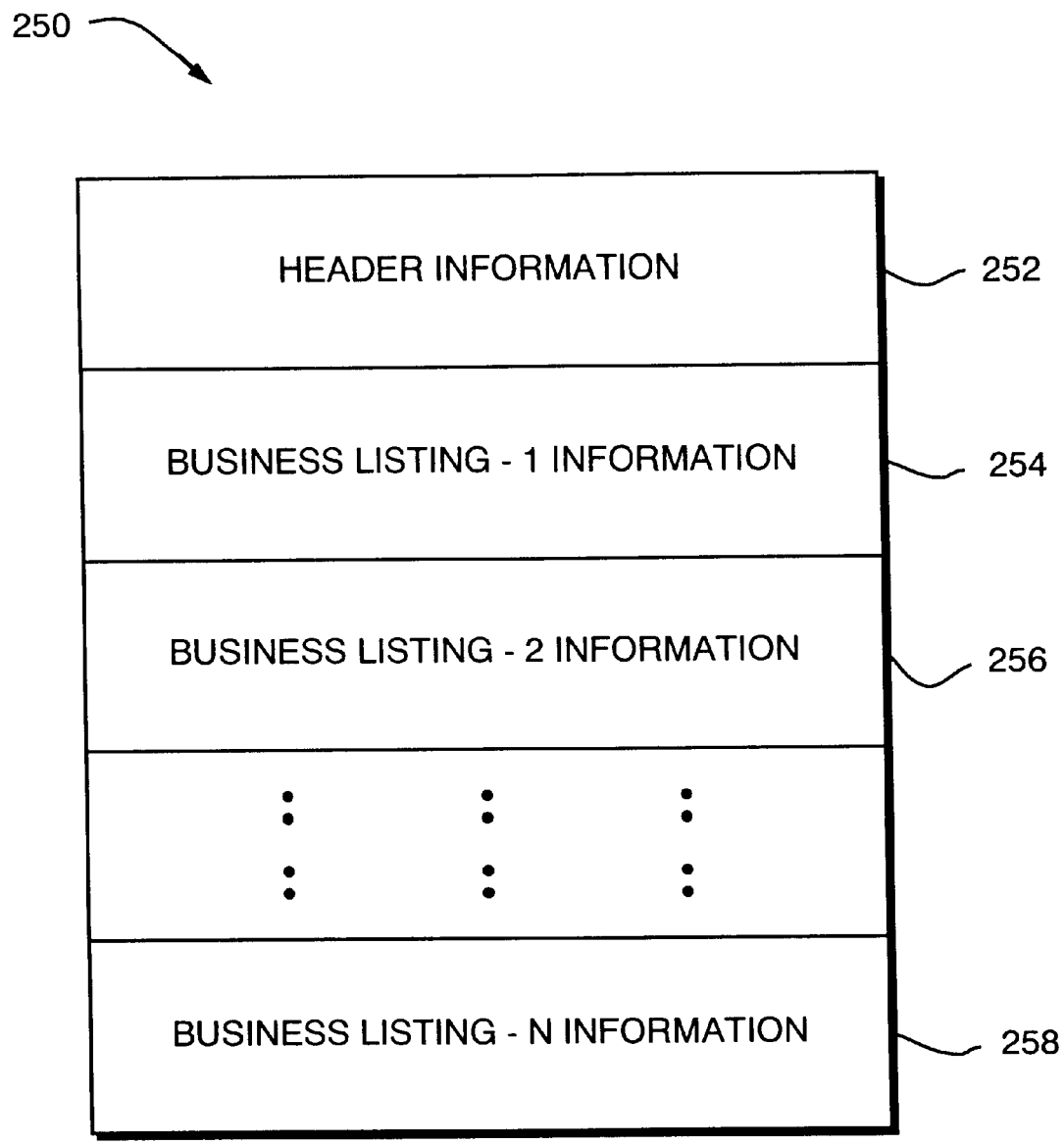
FIG. 36 is an example of an entity as stored in the data query cache.

Generally, in this embodiment, the data query cache includes cache objects in which each cache object corresponds to a particular cached query resulting data set. Referring now to FIG. 36, shown is a block diagram of one embodiment of a data set as stored in the data query cache. Generally, each data set 250 includes header information 252 and information corresponding to one or more business listings. Generally, header information may include information describing the data query set, such as the number of business listings in the data set. Other types of information may be included in accordance with each particular application and implementation.

Each business listing 254 generally includes information that describes the business listing. More particularly, this information includes data that is cached as needed by other components in the Front End Server, for example, in performing various searches, data retrieval, and other operations upon data in accordance with functionality provided by the embodiment. In this instance, the following types of fields of information are stored for each business listing 254:

1) number of categories associated with this business listing
2) latitude
3) longitude
4) business name
5) city
6) state
7) list of categories associated with this business listing
8) database key or identifier used as an index into the databases
9) relevance information
10) advertiser priority In the above fields, relevance information is Verity-specific information as it relates to the query. For example, this generally represents the frequency of words or terms in a document. The advertiser priority indicates a service level that may be used in presenting business listings, for example, in a particular order to a user. For example, if a first advertiser purchases "gold" level advertising services, and a second advertiser purchases "silver" level advertising services, when a user requests only 15 listings to be displayed, the "gold" level advertisements may be displayed prior to the other advertisements by other advertisers, such as the "silver" level service purchaser. Thus, a higher level of service may guarantee an advertisement be placed earlier in the displayed results.

The technique used to store the data in the data cache from memory includes object serialization and deserialization techniques, as known to those of ordinary skill in the art. These techniques transform an internal storage format, as may be stored in random access memory, to a format suitable for persistent storage in a file system, as in the data query cache. The complementary operation is also performed from persistent storage to the in-memory copy. For each of the above-named fields, object serialization, i.e., from memory to persistent storage device in cache, is performed by storing the data type, its length, and the data itself. It should be noted that the length may not be needed for each data field, for example, in fixed length data types. The complementary operation of object deserialization is generally performed by reading the fields in the same order as written to the cache.

In this embodiment, other caches may have other storage techniques. For example, the Page Cache may be implemented as HTML files in a file structure located on a disk or other storage device. The PHTML execution tree may be implemented as an in-memory linked list or other abstract data structure representation of the C++ objects.

It should be noted that in this particular embodiment, the data query cache may include different types of cached geographical data as may be used in performing different data queries. For example, the type of data cached described in the prior paragraphs is the "normal" business listing data as associated with a well-defined geographic area. Other businesses, for example, such as a florist or an airline, may not be associated with a single well-defined geographic location. A business may not have any geographic bounds, such as if it is an Internet business with a virtual storefront accessible on the Internet. Also, other businesses may be located in a particular well-defined geographic area, such as an airline with a physical presence in a particular city, but the service area which corresponds to the service offered does not correspond to the location of the business itself. To include businesses with these particularities, in addition to the "normal" business listing just described in which the geographic business location and service areas correspond, the concepts of multi-city and total-city placements have been included in this embodiment.

Generally, multi-city placement may be described as representing a business' service area in multiple cities when data queries are performed. An example may be a plumbing service located in three (3) cities with service areas in ten (10) cities. The total-city placement may generally be described as representing a business' service area in all cities when searches are performed. An airline is generally an example of this which services all major U.S. cities. Generally, in this embodiment, the total city and multi-city search results are cached separately from the "normal" query results, but are composited with the normal search results prior to retrieving the data from the database.

It should generally be noted that in this embodiment, the total and multi-city query results are retrievable independent of the "normal" search results. However, the storage format for this information, in this embodiment, may be as described for "normal" query results. Generally, other embodiments may use a different format for storage than the "normal" search results, for example, if other information is deemed to be important in accordance with each implementation.

The technique of performing the total and multi-city query search optimization in conjunction with the normal query caching will be described in paragraphs relating to FIGS. 37 and 38 that follow.

Figure 37:
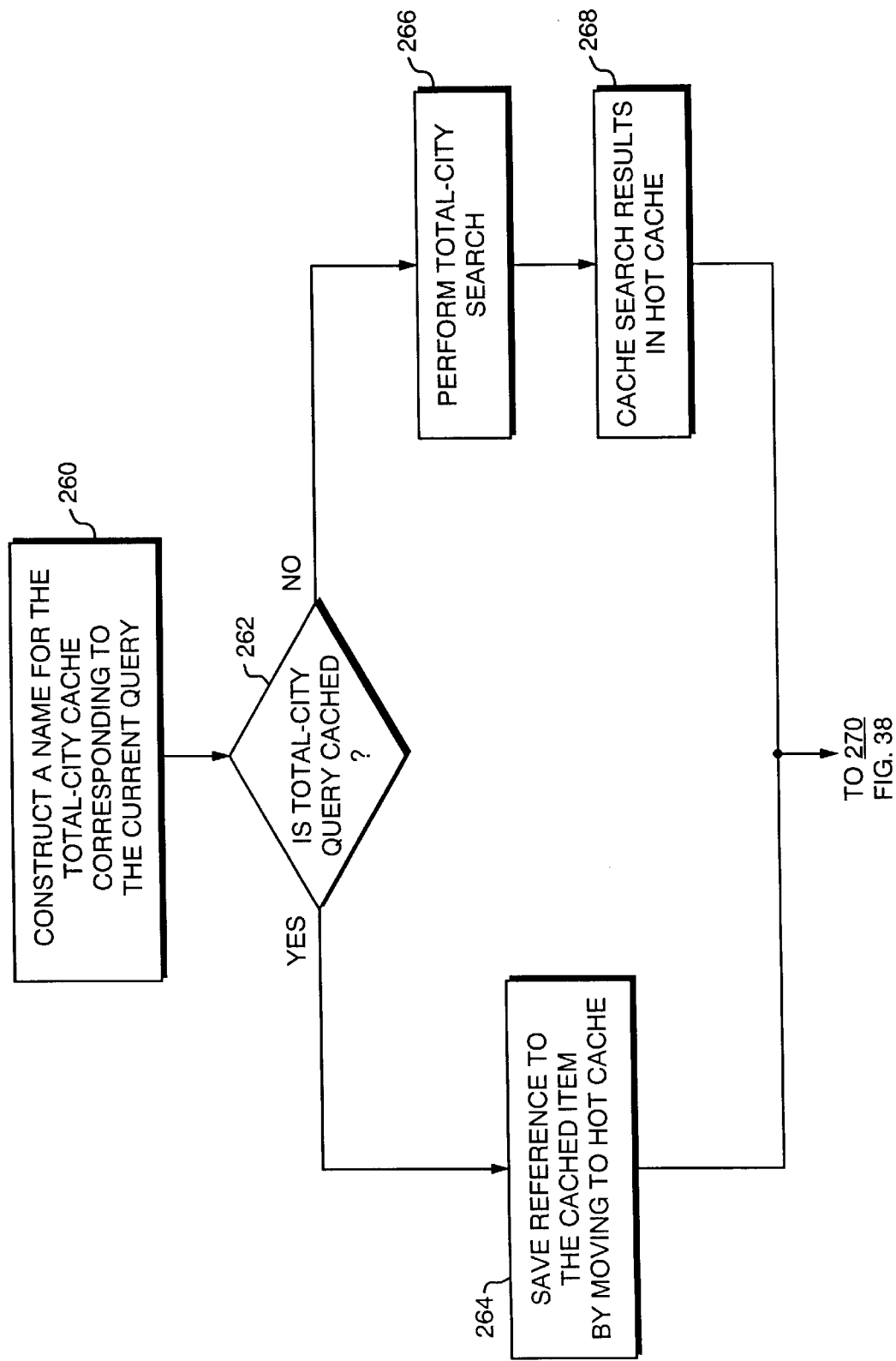
FIG. 37 is a flowchart of an embodiment of a method including steps for performing an additional total-city cache lookup.
Figure 38:
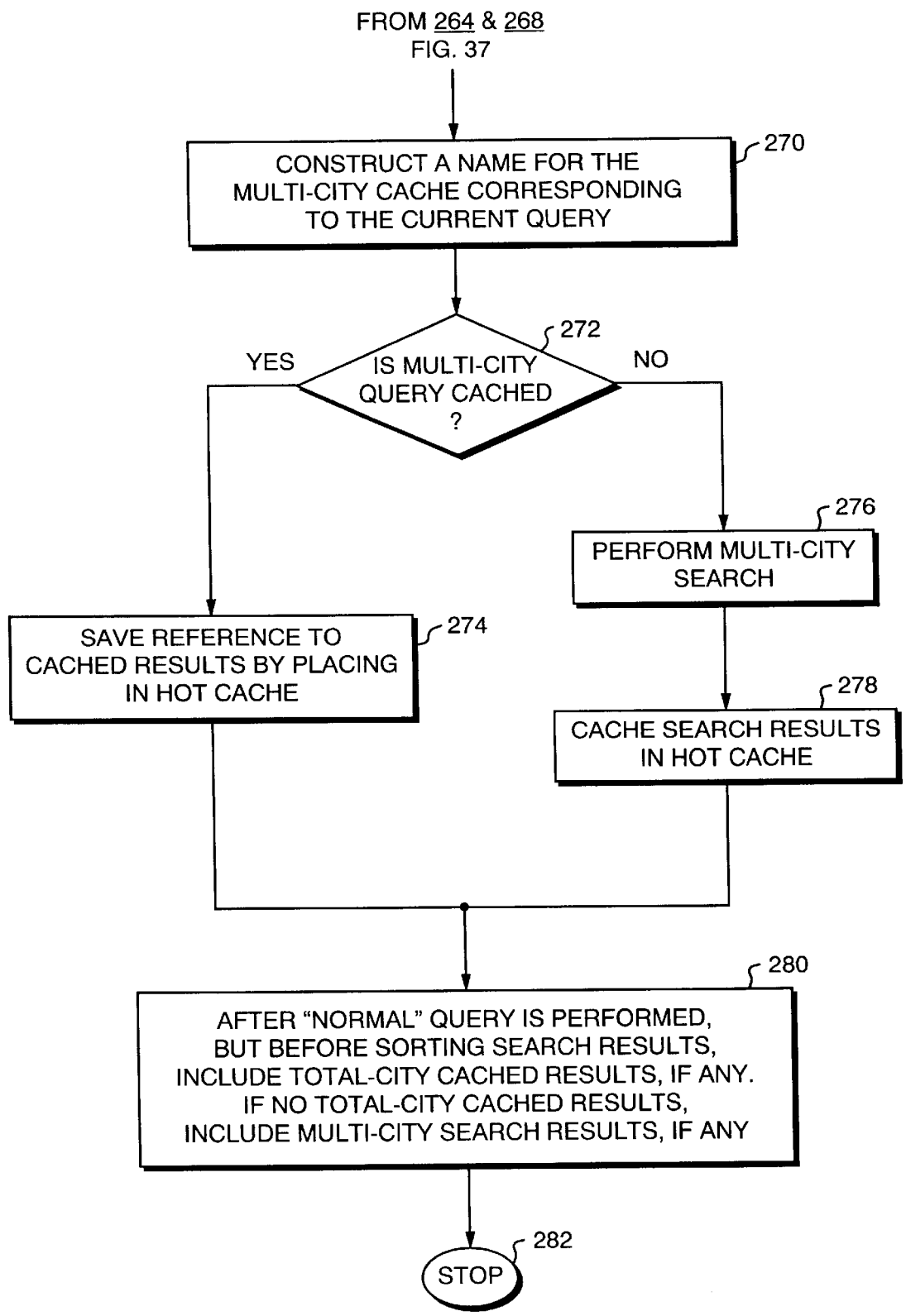

Referring now to FIGS. 37 and 38, shown is a flowchart of an embodiment of a method for integrating total-city and multi-city cache results into "normal" cached search results. At step 260, a total-city cache name corresponding to the data query is formed. In one embodiment, the total city cache name is formed by starting with the string "SCOPE=T" to identify a total-city name. Additionally, the following information is extracted from the original query string, as formed by the parser:

category, category id, business name, street address, keywords, longitude, latitude These key-value pairs are extracted from the original query string and appended to the "SCOPE=T" to form the total-city cache name. In one embodiment, these functions of extracting the information from the original query string and forming the total-city cache name may be performed by the same software as forming the name for the data query cache "normal" query name, such as by API calls to the same routines with parameters, as known to those of ordinary skill in the art of programming.

At step 262, it is determined if the total-city query data set corresponding to the total-city cache name for the current query exists. If it does, control proceeds to step 264 where the total-city data set cached item is moved to the hot cache, if not all ready in the hot cache. A reference to this data set is saved for later retrieval in other processing steps. If at step 262, a determination is made that the total-city query cached data set corresponding to the total-city cache name does not exist, control proceeds to step 266 where a search is performed for the total-city query. At step 268, the search results are cached, as in the "hot" cache. A reference to these search results are stored for use in later processing steps. Generally, an empty or null search results stored in cache may be just as important for performance as a non-null search results that is cached.

Control proceeds to step 270 of FIG. 38 where a multi-city cache name is constructed representing the multi-city cache corresponding to the current data query. In one embodiment, this multi-city cache name may be constructed by forming a string using the same fields extracted from the original data query string as formed by the parser in conjunction with forming the total-city name. Similar to forming the data query name for the "normal" cached search results, the string corresponding to the cached data set for a given query uniquely identifies the data set. In forming the multi-city cache name, appended to the concatenated key-value pairs is a string of "SCOPE=M" rather than the string "SCOPE=T", as with the total-city cache name.

At step 272, a determination is made as to whether there is multi-city cached data corresponding to the current multi-city cache name. If, at step 272, a determination is made that such a data set exists in the multi-city cache, control proceeds to step 274 where the data is moved to the "hot" cache, if not all ready located there. Additionally, a reference to this location in the "hot" cache is saved for use in later processing steps. If, at step 272, a determination is made that such a data set does not exist in the multi-city cache, control proceeds to step 276 where a search of the database is performed. The query results, if any, are cached in the "hot" cache with a reference to the results saved for use in later processing steps.

At step 280, the total-city and multi-city data cache results are integrated with the "normal" query results. After the "normal" query is performed, but before sorting the search results, the total-city-cached results, if any, may be combined with the "normal" query results. If there are no total-city cached results, the multi-city results may be included, if any.

The combined search results are then sorted such that any redundant listings are removed. Any additional processing is performed, as in accordance with the user query, for example, as producing the listings which begin with "B", or only listing the top ranked fifteen (15) listings as ranked in accordance with other user specified criteria.

In all the caches, a garbage collection technique may be included to remove or delete cached objects that have been determined to be "old" in accordance with predetermined criteria. For example, in one embodiment using the LRU caching scheme, whenever the amount of free cache space falls below a threshold level, the garbage collection routine is invoked. The threshold level includes parameters relating to a predetermined number of cache objects and the accumulated size of the objects in the cache. In this embodiment, although there may be multiple conceptual caches, such as the "normal" data query cache, the multi-city cache, and the total-city cache, the cached results may physically reside in the same "hot" and "cold" caching devices. However, in this embodiment, the different types of caching results may be accessed independent of the other caching results. Other embodiments may have other organizations of the caches in accordance with other implementation and associated data requirements.

[Information Retrieval]

Figure 39:
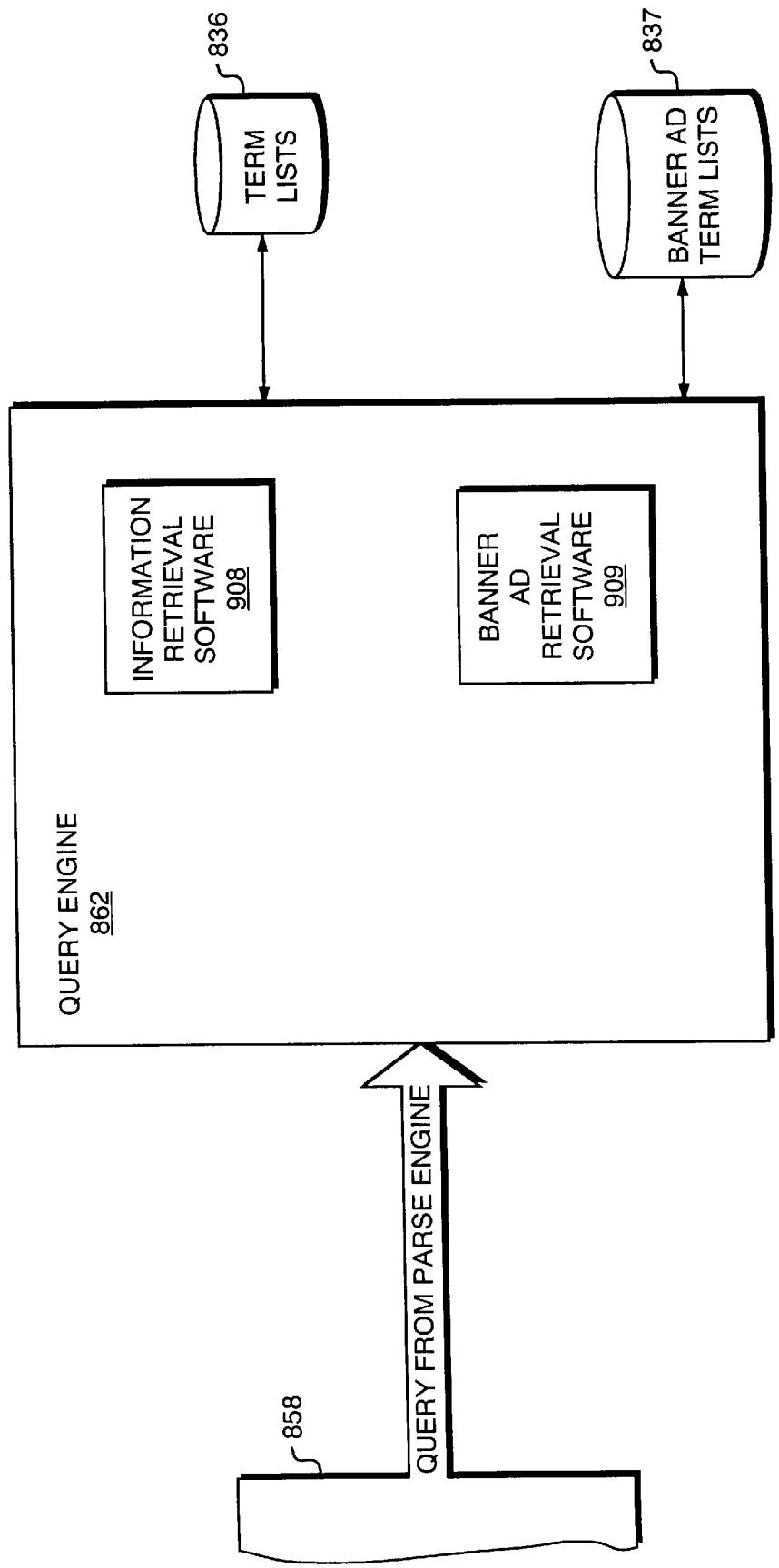
FIG. 39 is an example of more details that may be included in a embodiment of the query engine.

A variety of information retrieval techniques may be used to retrieve records stored in the Primary Database 812. Further details of the query engine 862 are presented in schematic format in FIG. 39. When the parse driver 858 of the parser 866 of one of the servers 808 delivers a parsed instruction to the query engine 862, the query engine 862 may, in an embodiment of the invention, include information retrieval software 908 to retrieve records from the Primary Database 812 that correspond to the user's query. The query engine 862 may include more than one form of information retrieval software. For example, the query engine, in addition including the information retrieval software 908 that is to be used to obtain listings in response to user queries, may further include banner ad retrieval software 909 for retrieving advertisements that relate to the user's query.

In an embodiment of the invention, the information retrieval software 908 may include functionality of software such as the Information Server Version 3.6 software commercially available from a company known as Verity. Other commercial packages of information retrieval software are available, and the techniques described herein could also be employed using proprietary software coded by the user. In an embodiment, the information retrieval software 908 includes the Information Server Version 3.6 software and additional extensions provided by the host of the GTE Superpages system.

Figure 40:
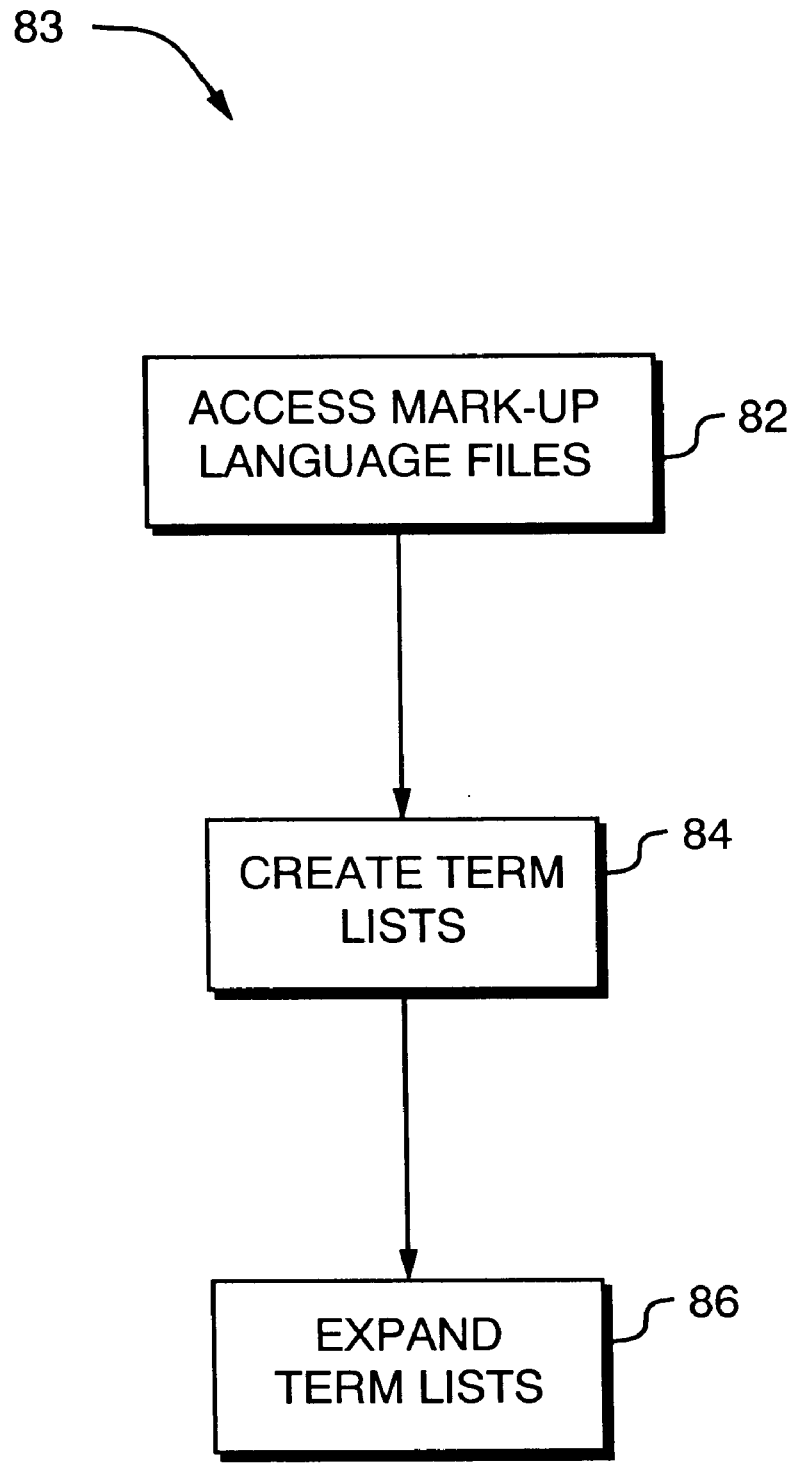
FIG. 40 is an example of an embodiment of method steps by which the information retrieval software may obtain results.

Referring to FIG. 40, steps by which the information retrieval software 908 obtains results are set forth in a flow chart 83. The information retrieval software 908 may at a step 82 access markup language files 906, as depicted in FIG. 25, which are produced by the extraction routines 902 from the normalized data 900. In an embodiment, the markup language files consist of business listings that are stored in the Primary Database 812. The information retrieval software 908 may then, at a step 84 produce term lists 836 that are further used by the information retrieval software 908 to handle queries that are delivered to the query engine 862. The term lists 836 may consist of a linked list for each term that appears in one of the business listings, with the elements of the linked list including a document identifier for the business listing and certain statistics regarding the frequency of occurrence of the particular term in each document and in the document set as a whole. The banner ad retrieval software 909 may similarly generate and use banner ad term lists 837 that are further used by the banner ad retrieval software 909 to handle generation of appropriate banner ads. Next, at a step 90, the term lists, which in an embodiment are generated using Verity software, may be expanded at a step 86 to include synonyms for the terms appearing in the business listing. For example, if the term "diner" appears in a business listing, then the term "restaurant" might be assigned to the file for that business listing as stored in the Primary Database 812. The expansion of the listings to include synonyms of the words included in the listings may be accomplished by execution of PHTML scripts or other programming techniques. The expansion may establish a hierarchical structure; for example, the term "restaurant" may be stored in a tree that includes the sub-category of "ethnic restaurant," which may further include the sub-category "greek restaurant." PHTML scripts may be provided to establish the tree structure and to operate on the tree structure to retrieve results that will be provided to the user. The steps 82, 84 and 86 may be accomplished at initialization of the system, thus establishing and expanding the term lists 836, 837 for later use.

Figure 41:
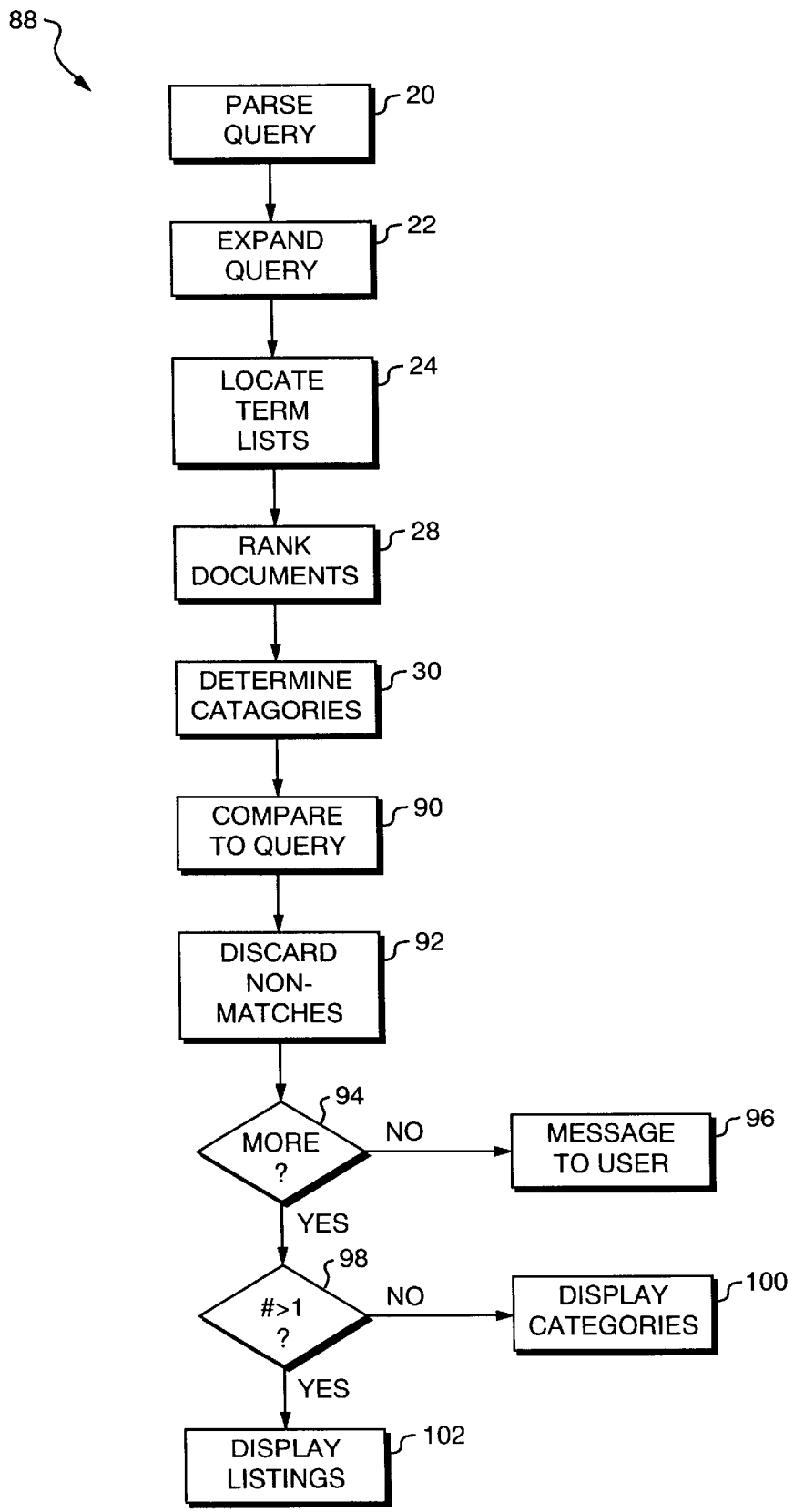
FIG. 41 is a flow chart showing an example of an embodiment of method steps for obtaining results.

Once the system is initialized, the system may operate to obtain results that are to be displayed to the user. The steps for obtaining results may be seen in a flow chart 88 displayed in FIG. 41. Referring to FIG. 41, the parse driver 858 may at a step 20 parse a user query and deliver the parsed query in suitable form for handling by the query engine 862. The query engine may include the information retrieval software 908. At a step 22, the query engine 862 may operate the information retrieval software 908 to take the parsed user request and expand the query, turning the user request into a detailed query. Next, at a step 24, the information retrieval software may operate on the expanded term lists 836 by identifying documents associated with the terms identified in the expanded query. In an embodiment, the term lists 836 are the business listings described in connection with steps 82, 84 and 86 above, expanded to include synonyms and terms that are determined to be related to the words in the business listing. Identification of documents may be accomplished by a variety of information retrieval techniques. Documents may also be associated with queries by sorted relevancy ranking, clustering (automated grouping of related documents), automated document, summarization (creation of content abstracts, not simply the first few sentences of the document) and query-by-example (turning an individual document into a query in order to retrieve "more documents like this"). These functions may be accomplished by software techniques, such as having a table of pointers having as an argument a tokenized version of each possible term from the expanded user query from the step 22. The table of pointers may point to the location of a term list 836 for each such term. The term list may be a linked list of documents that include the term. The linked list may include information about each document, such as the number of occurrences of the term in the document, the inverse frequency of the term in the entire set of documents, the association of the document with other documents, the association of the document with categories, and the like.

A variety of different techniques can be used to index documents for information retrieval. In embodiment, an indexing architecture such as that provided by Verity allows for incremental indexing, so that only new, updated or deleted documents require changes, avoiding the need for a complete re-index each time a document changes. Online identifiers may be provided, so that searches can continue while the identifiers are modified. This function is also provided by the Verity software.

At a step 28 a variety of weighting algorithms can be used to rank documents identified in the step 24 according to the information stored in the term lists 836. For example, a simple weighting algorithm might take a single term query, such as a category of information, and rank each document in a term list 836 in numerical order according to the product of the term frequency (the number of times a term appears in the document) and the inverse document frequency (the inverse of the number of times the term appears in the entire document set).

Once the documents are ranked, at a step 30 a list of the ranked documents may be further processed by the information retrieval software to provide a results page. In particular, at the step 30, the information retrieval software 908 may determine categories into which the retrieved documents fall. In an embodiment, the categories are yellow pages categories, which have been previously assigned to the documents, which are business listings, prior to entry of the business listings in the Primary Database 812. Thus, at the step 30, the information retrieval software 908 determines what categories are associated with the business listings retrieved by the ranking at the step 28. Next, at a step 98, the information retrieval software 908 may compare the categories identified at the step 30 to the terms in the user query. If categories are present that do not include any of the terms in the user query, then, at a step 92, such categories may be discarded. Thus, the user will not retrieve categories that are unrelated to the user query. Such categories might otherwise appear, for example, if the information retrieval software 908 retrieves a business listing that is associated with two unrelated categories, only one of which is relevant to the user query. For example, a query for a restaurant might retrieve a listing for "Joe's restaurant and bowling alley." The information retrieval software 908 might then retrieve the categories "restaurants" and "bowling" that would have been associated with that listing. The "bowling" category would be discarded, because the user query for a restaurant is unrelated to the "bowling" category. The term comparison may use an expanded version of the terms in the query and in the categories. Thus, a category would not be discarded if it includes a synonym of a query term, even if the category does not include an exact term match.

Once the non-matching categories are discarded at the step 92, the information retrieval software may, at a step 94, determine whether there are any remaining categories. If not, then control proceeds to a step 96, at which the user is informed that there are no matching categories. The user may then be returned to the query screen. If, at the step 94, at least one category remains, then, at a step 98, the information retrieval software determines whether there is more than one category. If not, then at a step 100 the system may display the actual business listings that appear in that one category to the user. If at the step 98 it is determined that more than one category remains, then at a step 102 the system may display a results page that consists of a list of the remaining categories. The results page may further include an indication of the number of listings that are associated with each category.

The document identifiers established for information retrieval software 908 may maintain pointers to other documents or to sources of the documents, such as URLs or file names. Thus, the identifiers may be stored apart from the documents allowing separate, non-invasive use of the identifiers, while maintaining the integrity of the data.

[Common Term Optimization (CTO)]

In an embodiment of the information retrieval system disclosed herein, common terms may be identified in order to optimize the retrieval of information in cases where user queries employ such terms.

A series of steps may be performed as pre-processing operations in order to classify and establish query result sets for common queries. Referring to a flow chart 31 in FIG. 42, at a step 32 common terms may be identified prior to system initialization. Designation of common terms may be performed based on a number of different factors. For example, a single word might in theory be designated a common term, if it appears with a high frequency in result sets obtained by users. It is noted that a single word common term may offer relatively little benefit in search efficiency, because the term lists 836 already permit searching based on individual terms. Alternatively, common terms might consist of multiple word combinations of any length, whether bi-grams, tri-grams, or n-grams. Thus, words that co-occur in high frequency can be designated as common terms, such as in a bi-gram format. For example, the bi-gram "Boston—restaurant" might be designated a common term.

Next, at a step 33, terms may be linked to specific contexts; that is, terms may be designated or classified as common terms in part according to their context. For example, the term "Boston," might be considered a common term if entered in the "city" field, but it might not be considered a common term if entered in a "business name" field or a "category" field. Similarly, the term "restaurant" might be a common term in the "category" field, but would not be considered a common term in the "city" field. Thus, at the step 33, the common term sets may be structured to reflect context. Thus, the bi-gram "Boston—Restaurant" might be stored as an expanded form that reflects both the term and the context in which it is to be treated as a common term, for example "City=Boston; Category=Restaurant."

Figure 42:
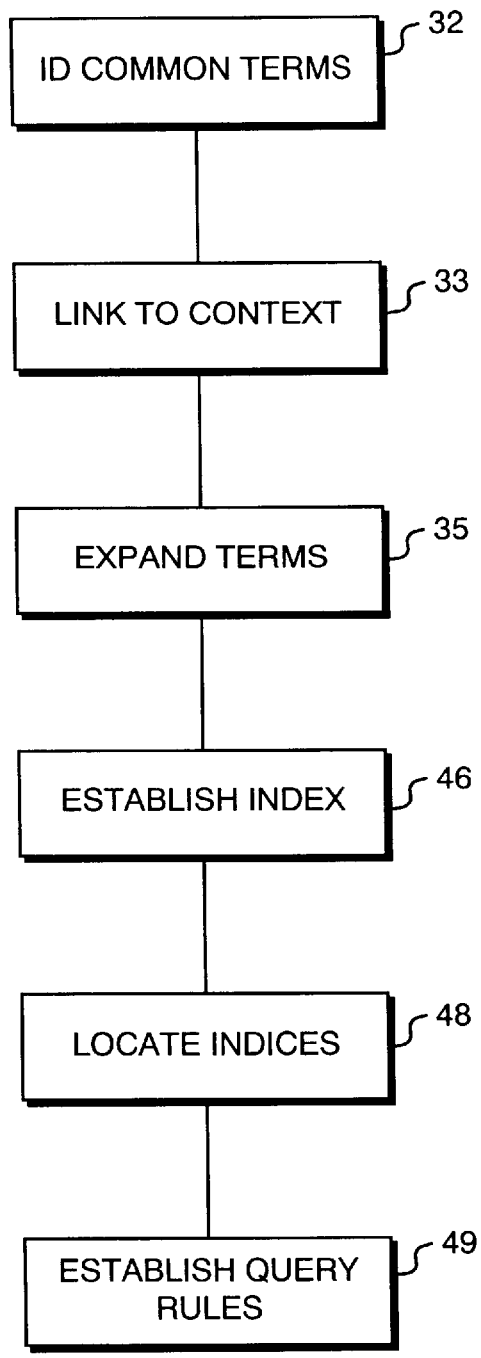
FIG. 42 is a flow chart showing an example of method steps for classifying results for queries using common terms.

Referring to FIG. 42, it may be desirable to expand, at a step 35, the terms that are to be designated as common terms. Thus, each term might be expanded to include both synonyms for the term and other terms that are semantically related to the common term in the established context for the term. For example, the common term "category=restaurant" might be expanded to cover results in which synonyms for restaurant are included in the results, such as "diner," "bar and grill," "eatery" and the like. Similarly, a city term might be expanded to include suburbs or neighborhoods; thus, the term "City=New York" would be expanded to include "City=Brooklyn," "City=Queens," and "City=Manhattan." Note that the synonyms for a given term might be different depending on the context. For example, the term "Dorchester" might be a related term for "City=Boston," but it might not be a related term for "business name=Boston."

The pre-processing steps 32, 33 and 35 might be accomplished in a different order, and other steps might be included in embodiments of the invention. Once common terms are identified, linked to contexts, and expanded at the pre-processing steps 32, 33 and 35, it is possible to establish lists or identifiers at a step 46 that include the expanded common term n-grams. One way of dealing with common term combinations would be to generate in advance term lists 836 that are predicted to be used with some frequency (e.g., restaurants, Boston, New York, etc.) and to pre-calculate the intersection of the likely combinations. This approach requires substantial processing and would have to be performed frequently, given frequent changes in the identifiers. Instead, it is possible, at the step 46 to create special identifiers, or term lists 836, that represent the expanded common terms, as linked to their contexts. Thus, a term list 836 might consist of a linked list of documents, such as business listings, that contain the terms "Boston" and "restaurant," (or synonyms thereof) in the contexts in which those terms are common. The term lists 836 may, like other term lists 836 described elsewhere herein, may further include information as to the term frequency of each term, synonym or related term, and the inverse document frequency of the term, synonym or related term in all documents in the set. In an embodiment, the synonyms and related terms may be included in the actual business listings that are used to generate term lists 836, so that those listings will be included in the generation of common term lists. In an embodiment, the listings themselves may be classified as to common terms and synonyms or related terms of those terms. Listings may be further classified as to sub-contexts, depending on the search context. Listings using identical terms should also be included in term lists, because they use identical token identifiers for such terms. For example, the term "Boston" should be understood in a nationwide search to include listing in both Boston, Massachusetts and Boston, Kentucky, because the token for the term "Boston" will be the same in each case. Result sets must be identified as tokenwise semantically related to the classifications that are possible in a search. Results are thus classified into common term groups on a listing-by-listing basis.

At a step 48, the common term lists 836 for combined terms can be stored in a designated area of the primary database 812, front end server 804, or server node 808–810 that allows a rapid search in the event common term combinations are included in the user query. The common term lists are thus assigned to a special results area for common term searches.

The steps 46 and 48 may be performed upon initialization of the system. Thus, with the pre-processing steps 32, 33 and 35 and the initialization steps 46 and 48, result sets are established for common term searches, and the result sets are stored in a special location in memory for rapid retrieval.

Figure 43:
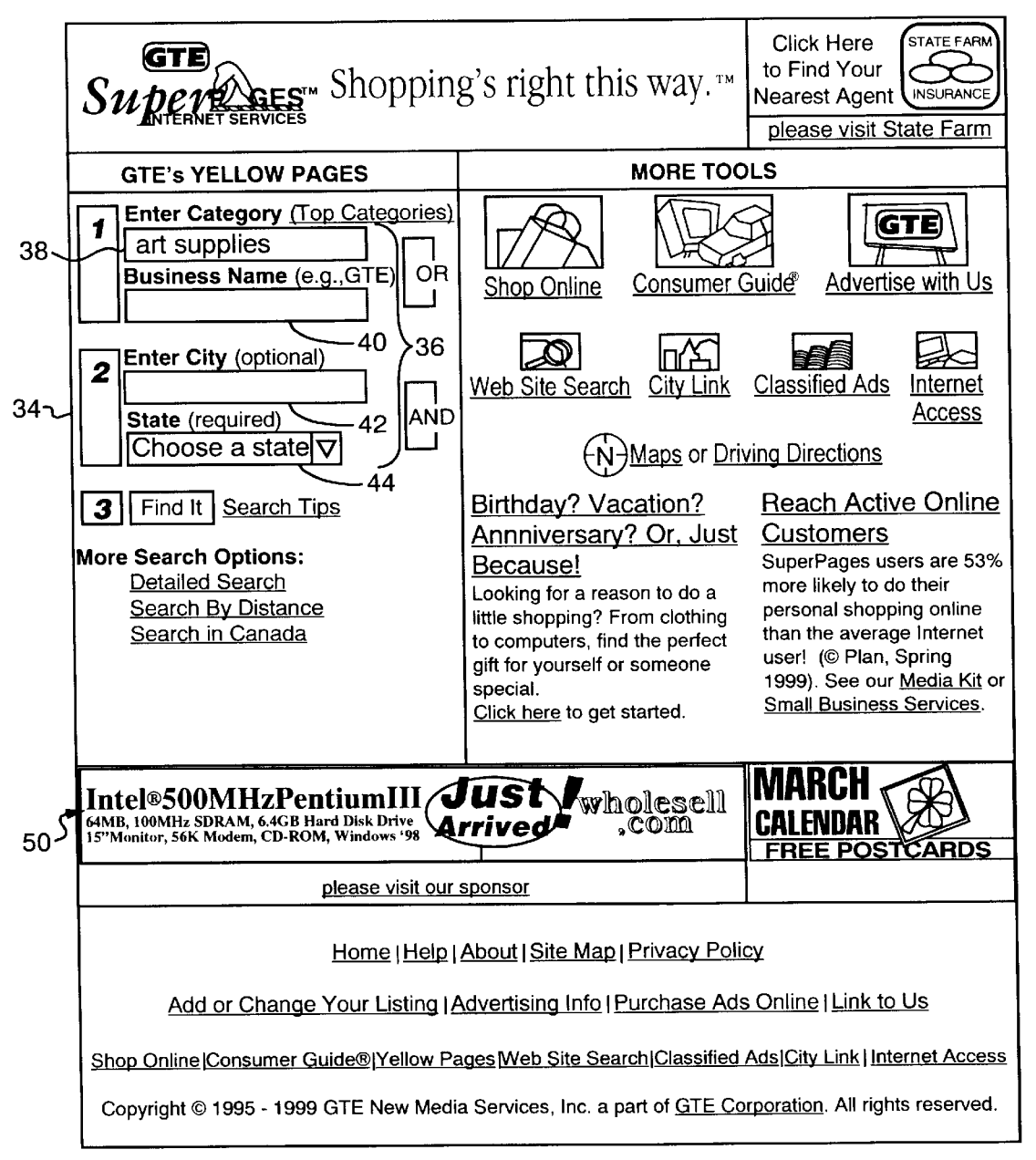

Next, at a step 49, query rules may be established that direct appropriate user queries to the special location in memory established at the step 48. Referring to FIG. 43, the user might enter a query on a template 34 that is displayed as a page, such as markup language page, on the user's browser 824. The template might include fields 36, such as a category field 38, a business name field 40, a city field 42 and a state field 44. When the user enters a term into one or more of the fields 36 and initiates a query, such as by pressing "enter" on the keyboard or clicking the appropriate screen location, the query is delivered to the parser 866 of the server 808 to which that user has been routed. The query is then used, as described above in connection with FIG. 41, to retrieve documents. In an embodiment of the invention, the documents that are retrieved at the step 28 and displayed at the step 30 of FIG. 41 are a set of matching categories for the query. For example, as depicted in FIG. 44, if the user enters the category "art supplies," the information retrieval software 908 may retrieve a set of matching categories that relate to art supplies. The retrieved categories may be ordered alphabetically, by order of significance, or grouped by sub-categories. The user then may select categories among the matching categories to receive either further sub-categories or documents, such as advertisements or other markup language pages, that correspond to the categories. In an embodiment, rather than matching categories, the information retrieval software 908 may immediately retrieve matching documents, such as specific advertisements or other markup language pages, rather than categories of documents. This direct retrieval step may be accomplished, for example, when one of the user-entered categories is an exact match to one of the categories included in the term lists 836.

A similar series of steps takes place if the user enters a query for a particular location in the city field 42 or the state field 44, or for a business name in the business name field 40. The information retrieval software 908 retrieves documents from the term lists 836 that correspond to a ranking of an expansion of the user-entered query.

When both a category and a location or a business name, or all three, are entered by the user, then the information retrieval software 908 may, in a conventional manner, retrieve term lists 836 that correspond to each of the terms of the query, such as a list corresponding to the category "restaurant" and a list corresponding to the city field "Boston." The information retrieval software 908 could then perform an intersection of the two sets and perform a ranking of the related categories (e.g., Italian restaurants in Boston, French restaurants in Boston, etc.) or related listings (for specific Boston restaurants). Because the term list 836 for documents containing the term "Boston" (including all businesses in Boston) and the term list 836 for documents containing the term "restaurant" (including all restaurants, nationwide) are both very large, the processing involved in retrieving each list and performing an intersection in order to identify matching categories or documents can be substantial. Accordingly, it is desirable to reduce the processing involved.

The information retrieval software 908 may be programmed with query rules at the step 49 to recognize when a query includes a common term n-gram, such as "City=Boston; category=restaurant." That is, whatever common terms are identified at the pre-processing steps 32, 33 and 35 should be recognized by the information retrieval software 908, so that queries that use the common terms in the appropriate contexts (or synonyms or related terms in those contexts) are designated for special processing. In particular, the information retrieval software 908 may be programmed to execute the search for the user's query in the special area of memory that was established for storage of the special common term lists 836 at the step 48 of FIG. 42.

In one embodiment of the invention, referred to as "CCC-indexing," the common terms that are selected for combined common term lists and special storage are bi-grams in the form "City=xxx; category=yyy" and in which the most common categories, such as restaurants, are found in the category field and the largest cities, such as New York, Boston, and the like, are found in the city field.

[Data Integration]

Figure 45:
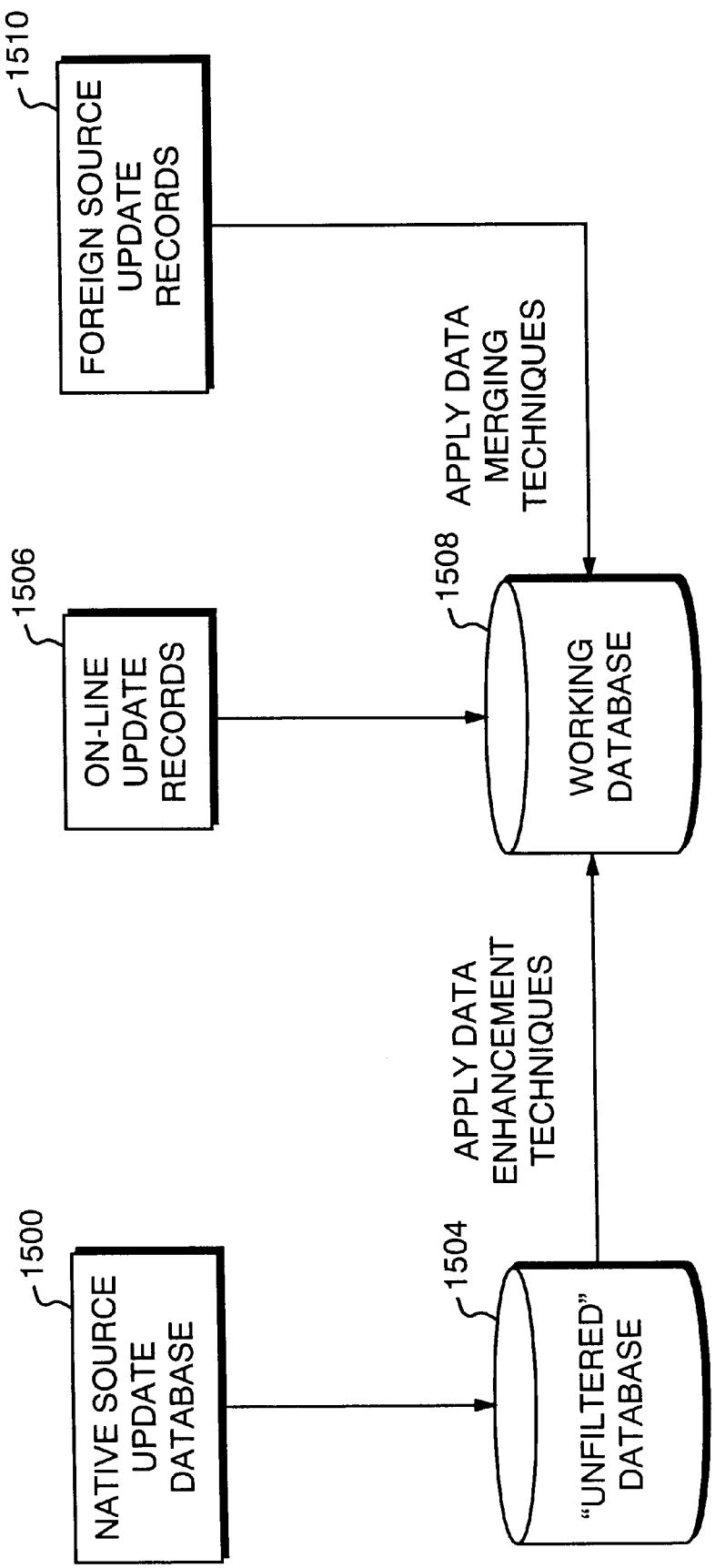
FIG. 45 is a block diagram of an embodiment of the database as may be included in the Backoffice component.

Referring now to FIG. 45, shown is one embodiment of the database included in the Backoffice component as included in FIG. 2 and 4. Generally, data updates included in the database come from three different sources in this particular embodiment. One source is on-line updates, as provided by users making updates or entering new information for business listing via network connections through the Backoffice component as through the Front End Server. A second source of data updates is based on foreign source updates. Generally, foreign source updates are those update records which come from a different data source than the original existing database. A third type of data integration or update source is referred to as a native source update. Generally, a native source update is when an updated version of the existing database having the same source as the existing database is provided. For example, a database copy may be provided as an update on a monthly basis using full sets of data where a data provider provides an updated version of the same data set. The native source data integration procedure integrates those changes in the new data set into the existing database. This is in contrast to a foreign source update, for example, where the existing database is provided by one vendor, and the update records for example, are provided by a different vendor. The update vendors being from a foreign source are called foreign source data integration or updates.

It should be noted in this particular embodiment that the native source update records are provided using full sets of data. In other words, the existing database is a complete database. The native source updates are provided in the form of a complete database as opposed to only providing update records. The foreign source update records are generally records obtained from a source different from the working database and are merged into the existing database.

Shown in FIG. 45 is a native source update database 1500 which is integrated into the unfiltered database 1504. Generally, this is done by performing comparisons of the records of the native source update database 1500 and the unfiltered database records 1504 in determining the various types of operations that need to be performed to integrate the changes from the native source update into the unfiltered database. This will be described in more detail in paragraphs that follow. Applying data enhancement techniques to the unfiltered database, these record changes are integrated into the working database 1508. Generally, the unfiltered database 1504 is a complete version equivalent to the working database. However, the records included in the unfiltered database 1504 generally include raw data which has not had the benefit of the data enhancement techniques as applied to the working database records 1508. The on-line update records 1506 and the foreign source update records 1510 are integrated directly into the working database copy 1508. It should generally be noted that the foreign source update records 1510 are integrated or merged into the working database records 1508 by applying data merging techniques that will be described in more detail in paragraphs that follow.

It should also be noted that the denormalized data, as included in the Backoffice component and the Front End Server, include in this particular embodiment, three tables or components of data. Generally, the three components of data include a category file, a fact file, and a business listing file. The business listing file has been previously described in conjunction with the architecture in other sections of this description. The fact file includes information additionally provided by various advertisers or business services which are generally static in nature. For example, the fact file may contain information such as hours of operation and extra attributes such as brand names or products produced by a business. This file generally does not change with updates. The third file is a category file may include a category identifier and a corresponding heading. Generally, the category identifier is a numeric quantity or other identifier that may be used in performing queries. The heading is a textual description of the various category identifiers which may be used either for performing data queries. In the various data integration and updates, as will be described in paragraphs that follow, it should be noted that the business listing file is generally what is updated when considering the techniques which will be described. However, the category file is also updated as part of the native source update, as will also be described in paragraphs that follow.

In paragraphs that follow describe general integration techniques for the foregoing types of data updates. Each of these techniques which will be described is associated with one type of data integration. However, in other preferred embodiments, each technique may be associated with and applied to other data types.

The foreign source update will be described in paragraphs that follow. However, the concepts and techniques included herein may also be applied to different types of data updates.

Generally, in the description that follows for data entries, there is one existing record or data entry per business listing. In this particular embodiment, a business listing is the atomic unit of granularity by which updates are performed. Any information and data such a phone number, name and address associated with a particular business entity is considered to be part of one logical piece of information or record. Thus, in the descriptions that follow, updates are made with regard to the information associated with one particular business listing or entity.

The techniques which will be described regarding the foreign source update generally assume that an existing database and update records are provided, and that each originate from different or foreign sources. It should generally be noted that since the sources are different, there is no general assumption made as to particular data fields or the structure of the foreign records as compared to the existing database. It is first determined whether there is a matching entry in the existing database for an entry in the updated version of the database. If no match is found in the existing database for an entry or business listing which appears in the updated version of the database, this new entry is added and integrated into the existing database. The techniques which will be described in paragraphs that follow may be adaptable, as known to those skilled in the art, to update situations in which an implementation uses something other than two complete sets of data when performing a system update.

In this embodiment, this process of foreign source update is performed in the Backoffice component 818 in which the existing database to be updated is generally in normalized form. The updated version of the database may be in normalized or denormalized form. Depending on the form, additional processing steps, as known to those skilled in the art, may be needed to retrieve and update the actual files that include the data, for example, associated with a particular business entity or record. In the description below, the described technique assumes that each business listing generally includes the following data items: business name, zip code, and at least one of a primary phone number or toll-free phone number. Generally, the foreign source integration technique is based on the premise that a phone number and zip code of a business are sufficiently unique to significantly reduce the matching problem to comparisons of a few listings.

In paragraphs that follow, a determination is trying to being made as to whether entries in the update and existing database match to further determine if update records are to be added, or if existing database records are to be deleted or modified.

Generally, the matching technique described for foreign source update determines a correspondence between the foreign source update records 1510 and the records in the existing working database 1508. The matching technique generally includes: 1) determining which records in the existing working database match which update records; 2) if more than one record in the existing database correspond to the same record in the existing working database, determining which record in the existing database is the closest match for the update record; and 3) if the foreign source update records include duplicate records such that multiple update records correspond to the same set of one or more existing database records, collapsing the duplicate foreign source update records into a single update record that is matched to a single record in the existing database.

After determining which records in the foreign source update correspond to which records in the existing working database, operations are determined and applied to the existing working database. Generally, as will be described, transactions with respect to the existing working database are determined. Generally, an update to an existing record is performed so as not to lose any existing information while also incorporating the new additional information or updated information. For example, an existing listing includes a business name and address, and phone number, but no e-mail address. A foreign source update record includes a business name and address, e-mail address, and phone number. The information from the foreign source update record is included in the existing database in union with the fields that are blank in the update record such that the e-mail address in the existing database is not removed when the updated information from the update record is applied. It should be noted that in this embodiment, no delete operations are performed with the foreign source update data integration due to the nature of combining data originating from different sources. However, other embodiments may include delete operations in addition to update and modify operations in foreign source data integration.

Figure 46:
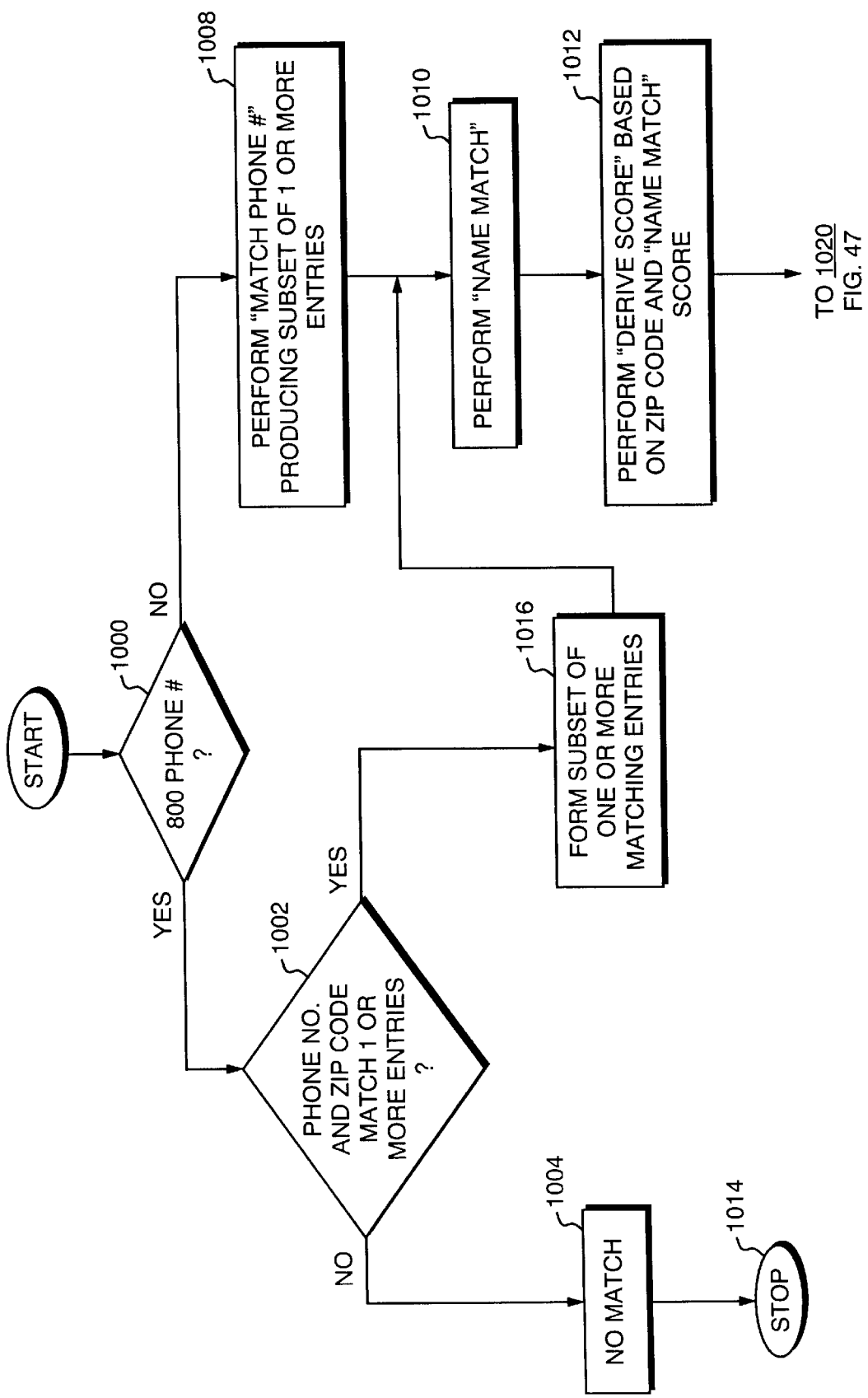
FIGS. 46 through 52 are flowcharts depicting processing steps in a method of one embodiment for performing foreign source data integration.

Referring to FIG. 46, at step 1000 a comparison is made between the phone number of an update record and the phone number field of each entry in the existing database. At step 1000, a determination is made as to whether or not the record in the latest version of the database copy is an 800 phone number. If a determination is made at step 1000 that the phone number of the current update entry is not an 800 number, control proceeds to step 1008. At step 1008, the procedure "match phone number" is performed to produce a subset of one or more entries of the existing database which match the existing phone number. Control proceeds to step 1010 where the procedure "name match" is performed. Generally, "name match" will be described in paragraphs that follow to determine whether there is a business name match for a particular entry. Control proceeds to step 1012 where "derive score" is performed based on the zip code and the name match score. Generally, the result of step 1012 produces a score representing a statistic relative to determining whether two entries in a particular database and an updated version of the database match.

Figure 47:
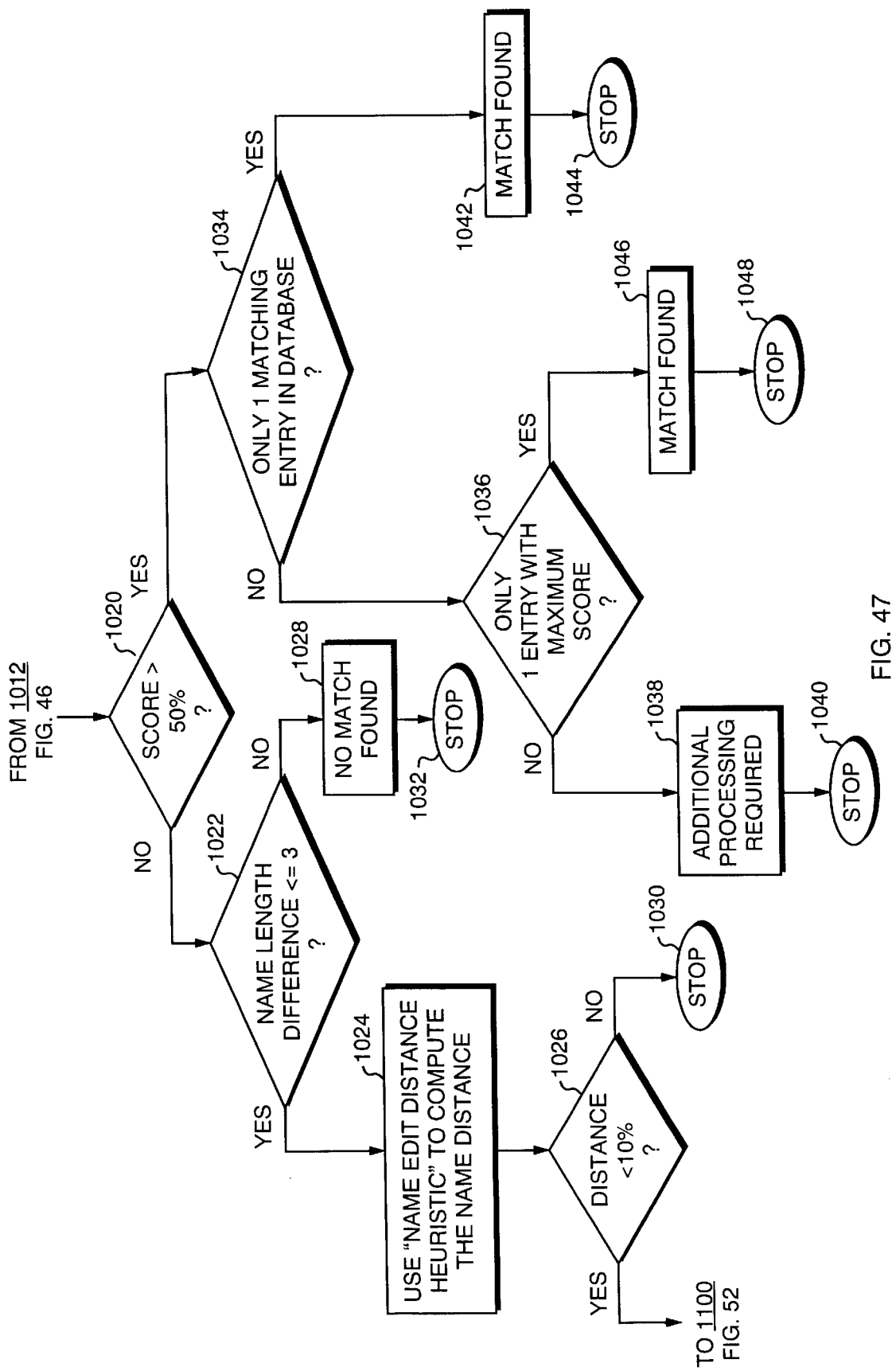

After performing step 1012, control proceeds to step 1020 of FIG. 47 where a comparison or a determination is made as to whether or not the derived score is greater than 50%. If the derived score is greater than 50%, control proceeds to step 1034 where a determination is made whether there is only one matching entry in the database for an update record. If a determination is made at step 1034 that there is only matching entry in the database, control proceeds to step 1042, where a determination is made that a match has been found. Alternatively, if at step 1034 there is more than one matching entry in the database for a record in the current updated version of the database, control proceeds to step 1036, where a determination is made whether there is only one entry with a maximum score. If there is only one entry with a maximum score, control proceeds to step 1046, where this maximum scoring entry in the existing database is determined to be the matching entry for the updated version. If at step 1036 there are multiple entries with the same maximum score, control proceeds to step 1038 where additional processing is required to determine which is the matching entry, if any.

It should generally be noted that the score threshold of 50% may be tuned and varied for each particular implementation and embodiment. This value is generally a configurable threshold value that may be defined heuristically, for example, by examining data samples.

The processing of step 1038 is generally performed off-line. It may be done manually or in an automated fashion in accordance with the types of data in the existing database. For example, at step 1038, having multiple entries with the same maximum score may indicate that there is an error or corruption in data. For example, in one embodiment, an alternate technique is used where if any record has the same zip code, that record is considered as being a matching record.

If at step 1020 a determination is made that the score is less than or equal to 50%, control proceeds to step 1022. At step 1022, a determination is made as to whether or not the difference in the name length is less than or equal to three. If the difference in the name length field is not less than or equal to three, control proceeds to step 1028 where a determination is made in that no matching entry exists in the database. It should be generally be noted that the decision process and the comparison process performed in steps 1020 and 1022 are performed for each matching entry in the subset as produced from step 1008. It should generally be noted that the threshold length of three for the name length used in step 1022 may be varied and tuned for each particular embodiment and implementation.

At step 1022, if a determination is made that there is at least one entry in the existing database with a name length difference less than or equal to three, control proceeds to step 1024, where the name edit distance heuristic may be used to compute the name distance. Generally, the name edit distance is the minium number of insertions, deletions, and substitutions at the character level to turn one name entry or string into a second name entry or string. The number of states that string A must pass through to be transformed into String B is an entry or quantity referred to herein as the name edit distance. For example, the textbook entitled "Text Algorithms", by Maxime Crochemore and Wojciech Rytter generally describe a technique for the name edit distance heuristic.

At step 1024, the name edit distance is computed, for example, using dynamic programming techniques known to those skilled in the art, such as using a finite state machine, for each matching entry as in the subset produced by step 1008. At step 1026, if a determination is made that there are one or more entries with a distance less than 10% of the length of the update name string, then control proceeds to step 1100 of FIG. 52 where a determination is made at step 1100 as to whether or not there is only one matching entry in the subset as derived from the Step 1008.

Figure 52:
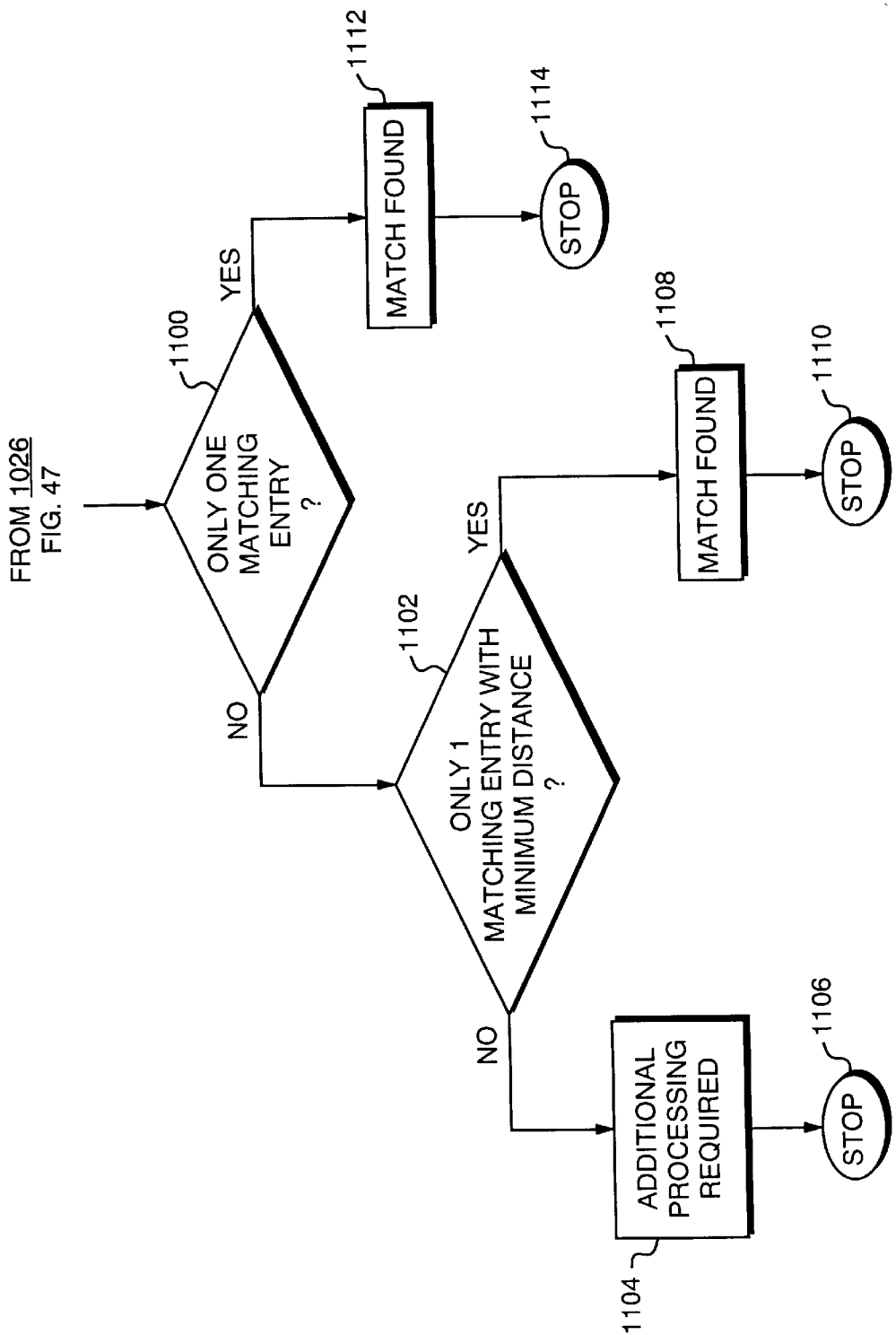

Referring now to FIG. 52, if a determination is made at step 1100 that there is only one matching entry, control proceeds to step 1112, where determination is made that a matching entry has been found. If at step 1100 a determination is made that there is more than one matching entry in the existing database for a foreign source update record, control proceeds to step 1102, where a determination is made as to whether or not there is only one matching entry with a minimum distance. If a determination is made that there is only one matching entry with a minimum at a distance, control proceeds to step 1108 where it is determined that an entry in the existing database with the minimum distance is considered a match to the update record in the foreign source update. If at step 1102 a determination is made that there is more than one matching entry with a minimum distance, control proceeds to step 1104 where additional processing may be required in accordance with the types of data included in the database. The additional processing required is generally the same types of processing that may be performed in accordance with the previously described step 1038 of FIG. 47.

Referring back to FIG. 46, if at step 1000 a determination is made that the phone number of the updated record is an 800 phone number, control proceeds to step 1002 where a determination is made as to whether or not the phone number, including the area code, and the zip code match one or more entries in the existing database. At step 1002, if there is a determination that one or more entries in the existing database match the phone number and zip code of the update record, control proceeds to step 1006 where a subset of one or more matching entries is found. Control then proceeds to point B indicated at step 1010 in FIG. 46 where execution continues.

If a determination is made at step 1002 that the phone number and zip code do not match any entries in the existing database, a determination is made at step 1004 that no match exists in the database for the current update record.

Figure 48:
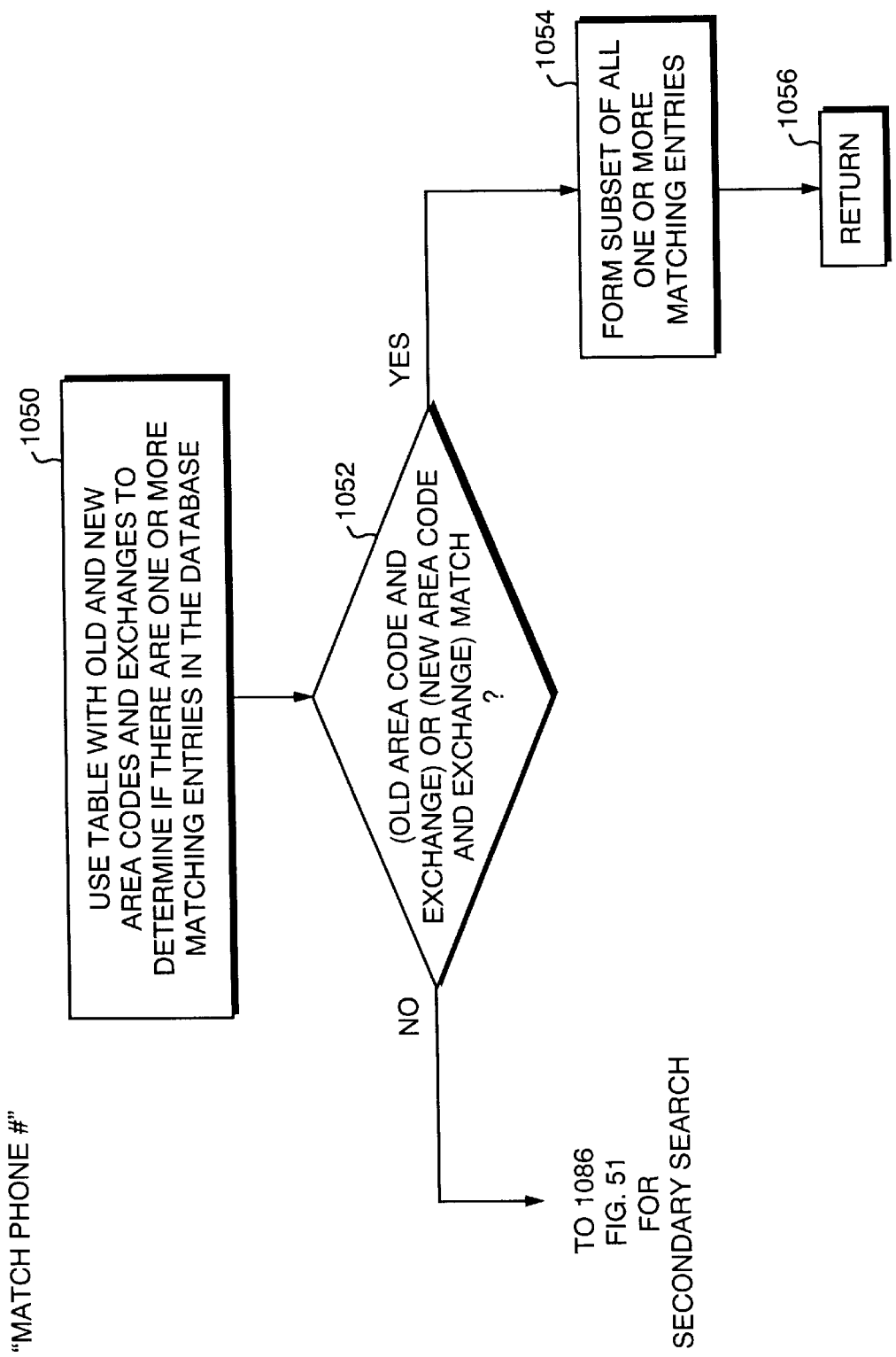

Referring now to FIG. 48, shown is a flow chart of an embodiment for the "match phone number" routine as performed at step 1008. At step 1050, a table is used with old and new area codes and exchanges to determine if there are one or more matching entries in the existing database which match the phone number of the current update entry. Generally, the processing step of 1050 and the decision made at step 1052 may be used, for example, where area codes have changed due to the increased volume of phone numbers which require additional area codes to a particular locality to be added. For example, the 508 area code may be expanded to include the 781 area code. Thus, an existing phone number may be included in the database with either the 781 or the 508 area code depending on the age of the data in the database. If a determination is made at step 1052 that either an old area code and exchange, or a new area code and exchange match, control proceeds to step 1054 where a subset of one or more matching entries is formed. Control proceeds to step 1056 where control returns to the calling procedure. In this instance, control returns to step 1008 where subsequent control proceeds to step 1010 of FIG. 46.

Figure 51:
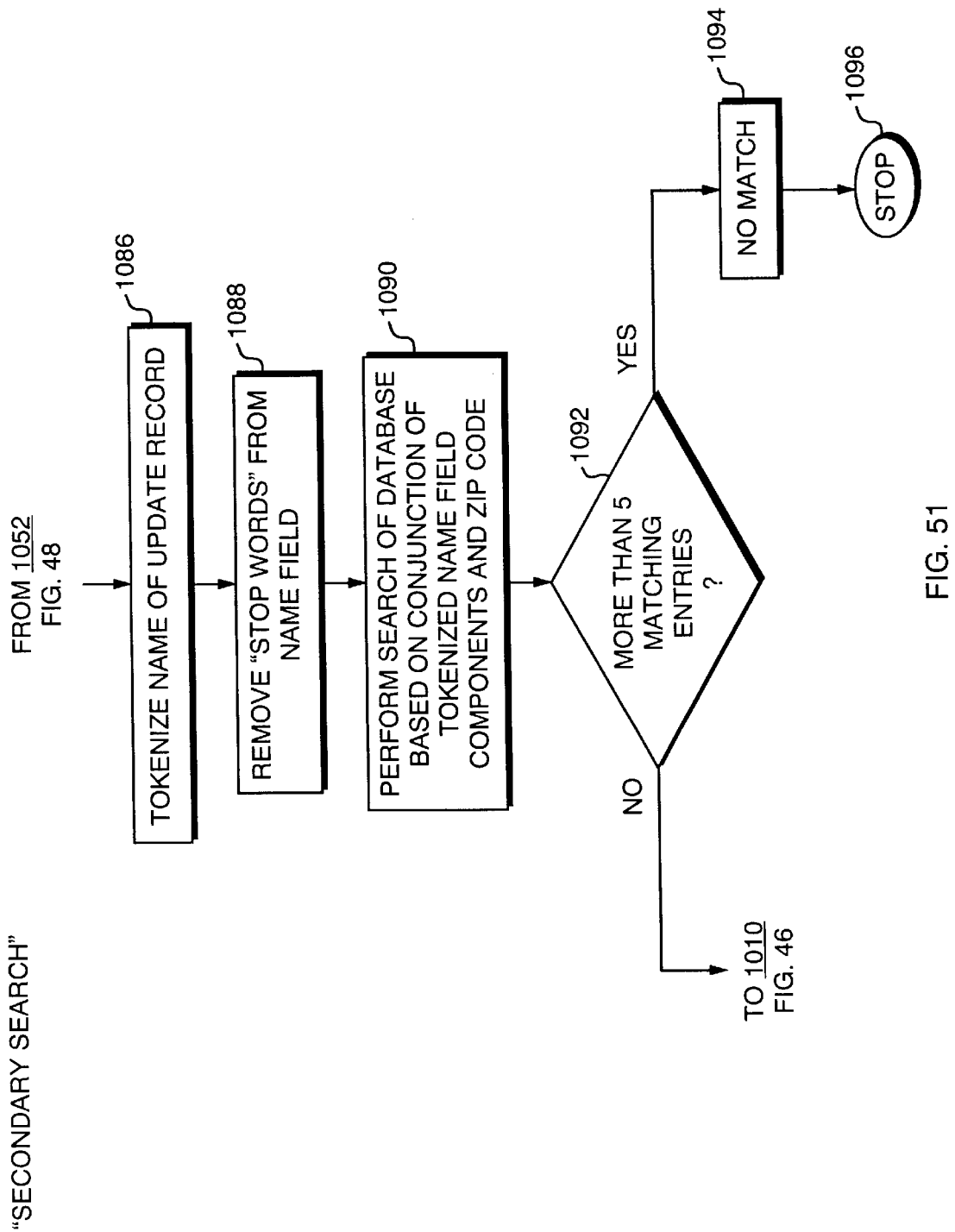

If at step 1052 a determination is made that there is no old or new area code and exchange in the existing database which match the current entry in the updated version of the database, control proceeds to node C of the "secondary search" in FIG. 51 at step 1086. Generally, the processing which occurs in the steps of FIG. 51 attempt to find semantic equivalents of the name fields indicating a possible match. At step 1086, the name of the update record is tokenized. At step 1088, "stop words" are removed from the name field. Generally, stop words may be words which may be ignored when doing a name comparison. For example, in this particular embodiment, the words "and", "or", "the","a", "an", "to", and "at" are considered "stop words" for which a matching entry may contain any number or combination of these and the match should still succeed. Thus, at step 1088, these words are removed and not considered when performing a name comparison.

At step 1090, a search of the existing database is performed on the conjunction of the tokenized name field components and the zip code. Generally, the search is being performed for entries in the existing database which match zip code and the different components of the name field. At step 1092, a determination is made as to whether or not there are more than 5 matching entries in the existing database for the current update record. If at step 1092 a determination is made that there are more than five matching entries in the existing database, control proceeds to step 1094 where a determination is made that no match has been found. If at step 1092, a determination is made that there is not more than five matching entries, control proceeds to point B in the processing which is shown in FIG. 46, step 1010 where these name matching entries are used as the subset upon which subsequent processing is performed.

Figure 49:
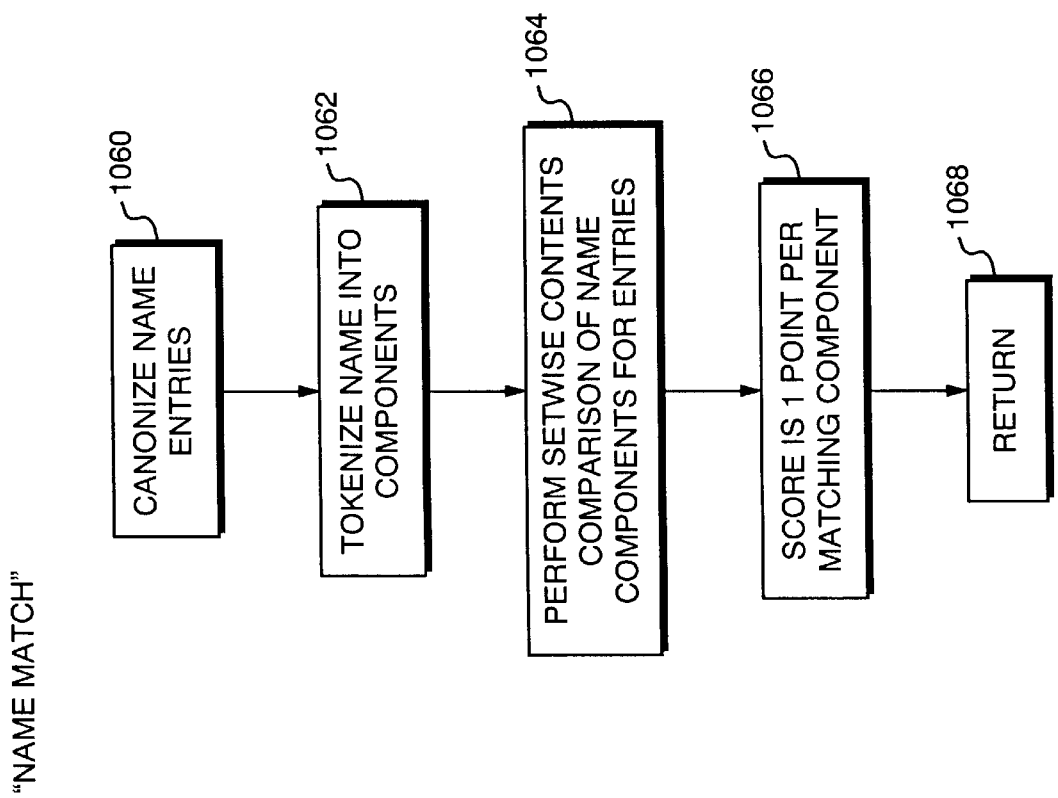

Referring now to FIG. 49, shown is a flow chart of the steps of one embodiment performing a "name match" as part of a routine processing as invoked from step 1010 of FIG. 46. Generally, the steps of FIG. 49 attempt to perform and find semantic equivalents of the names of a business in this particular instance. At step 1060, for each entry in the subset formed by step 1008, the name entries are canonized. Generally, canonization rules are a set of transformations which occur, for example, transforming abbreviations and the like to semantic equivalents allowing for a common denominator of terms to be searched for. For example, if all entries in a database use the entire work "incorporated" to indicate an incorporated business, then if a name entry includes the abbreviation "inc", this is expanded to the full name "incorporated" prior to being compared. Generally, the precise canonization rules or transformations depend upon the particular data being examined in a particular application.

Control proceeds to step 1062 where the name field is tokenized into components. At step 1064, a setwise contents comparison of the name components of each entry is determined against the current update entry. At step 1066, a score is computed for each name comparison of the existing database entry with a record of the updated version of the database. The score is computed as one point per matching component. At step 1068, control returns to step 1010 where subsequent processing resumes with step 1012.

Generally, the processing steps of FIG. 49 attempt to formulate a numeric quantity or metric for determining whether two name entries match. This weighted value or concatenation is used in further comparison in combination with other field, such as the zip code, and arriving at a final quantity in determining whether or not name fields of an existing database entry and an update record match.

Figure 50:
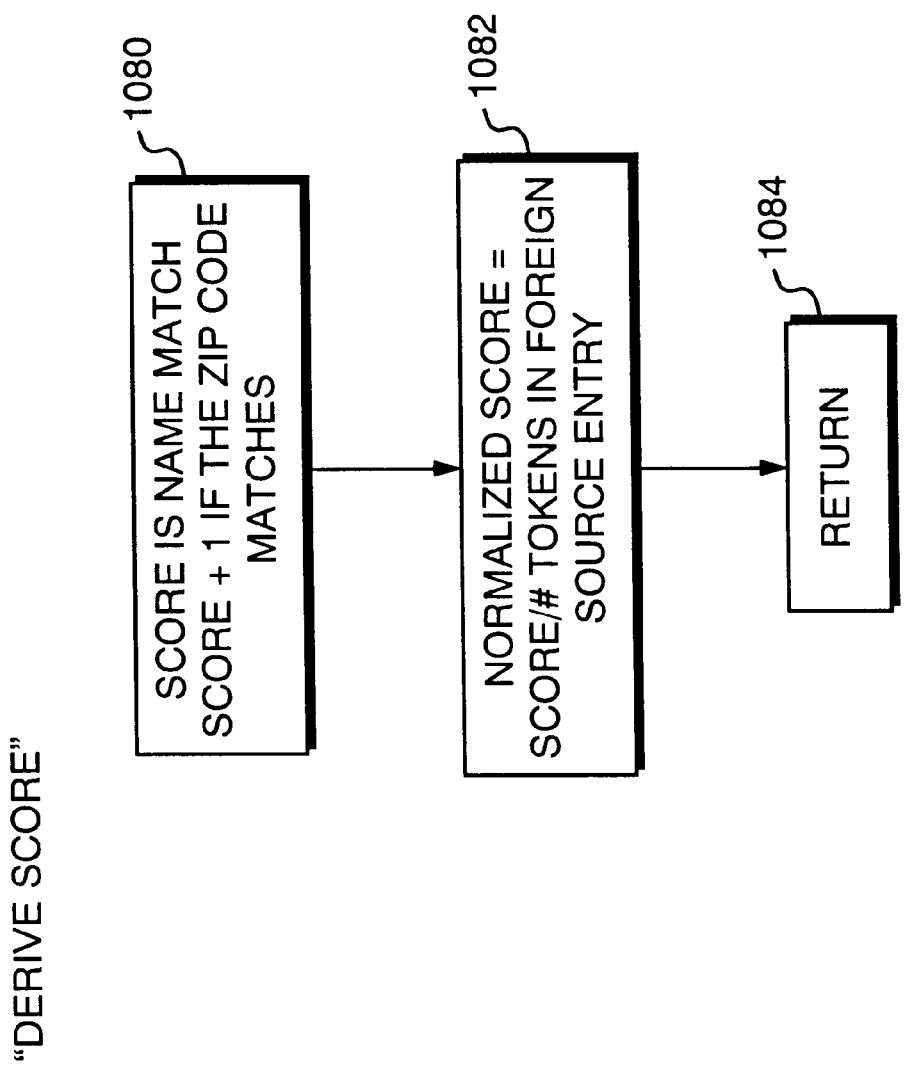

Referring now to FIG. 50, shown as a flow chart of the steps of one embodiment for performing the routine "derive score", as performed from step 1012 of FIG. 46. Generally, derive score attempts to produce normalized metric or score based on the name field and the zip code. At step 1080, the score previously derived from name match for each entry is updated by one if the zip codes of an existing database entry match an updated entry. At step 1082 this score is normalized by taking the score computed thus far and dividing it by the number of tokens in the foreign source entry name field. It should be noted that other techniques may be used to produced a normalized score as in step 1082. At step 1084, control returns to the point of call. In this particular instance, control returns to step 1012 where processing resumes with step 1020 of FIG. 47.

Just described with regard to FIGS. 46 through 52 are processing techniques for determining matching entries for foreign data. What will now be described are techniques which provide for data enhancements where the two databases or two data sources being integrated are from the same source. Generally, where there is this native source processing, there will be fewer differences between the data entries due to the fact that both data sets come from the same source. Thus, the techniques which are described in paragraphs that follow may generally be referred to as data enhancements. However, similar to the processing just described with regard to foreign source integration and processing, the concepts and processing steps which will be described may be readily adaptable to other types of data updates in accordance with other particular implementation and data sets.

The update techniques for native source assumes that two full sets of data are used—the updated database version, and an unfiltered or raw version 1504 of the existing working database. Generally, the techniques that are described below with regard to native source processing are data enhancement techniques applied to the unfiltered database 1504 to produce the working database 1508 of FIG. 45.

Figure 53:
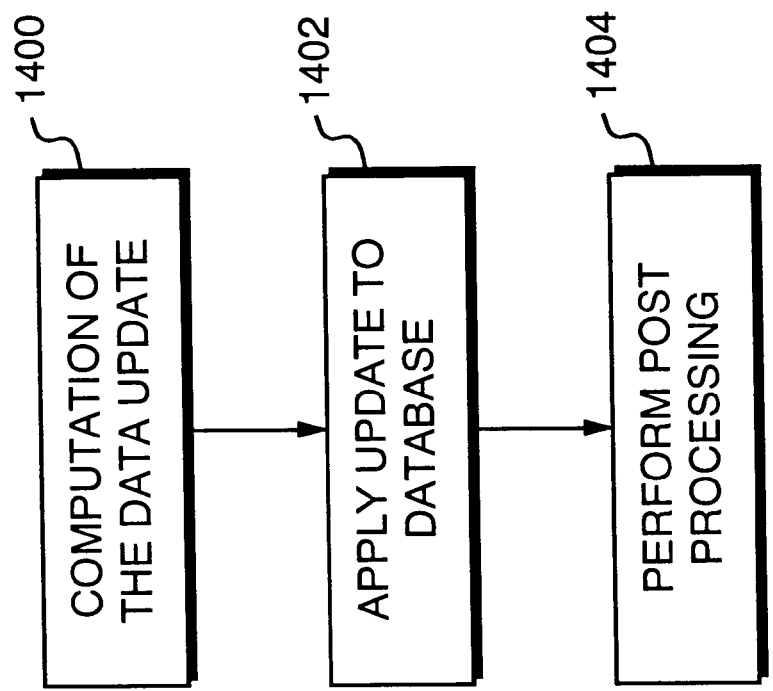
FIGS. 53 through 58 are flowcharts of a method of one embodiment for performing native source data integration processing.

Referring now to FIG. 53, at step 1400, the computation of the data update is performed using two complete sets of data from native sources. Generally, at step 1400, the latest set of data received such as from a data provider is submitted into the database and compared against the set that is in the existing database. All of the records in the data set are loaded in the following form. For comparison purposes, in the steps that follow there is a distinct record ID followed by a string where the string is all the fields from the record concatenated together for comparison purposes in steps that follow. In this particular instance record I.D.s are unique against the set and indexed. As a result of processing at step 1400, the delta or difference between the two data sets is produced. Each entry in this delta or difference is classified as an insert, delete, or update operation. A record is inserted into the existing database in which identifiers are in the new version of the data set but not in the existing database. All records which have identifiers in the existing database, but not in the new version, are slated for deletion from the existing database.

Records in which identifiers are in both sets, but, however have associated strings that differ are considered update records having data contents in the string that is updated for the corresponding identifiers. At step 1402, the update records which include inserts and update transactions are applied to the existing database. At step 1404, certain data post processing is performed as will be described further in the paragraphs that follow.

FIGS. 46–54 generally describe data integration of the native source updates which are applied to the database of business listings and categories. In summary, for both business listings and categories, comparisons are made between records of the native source unfiltered database and native source update.

Figure 54:
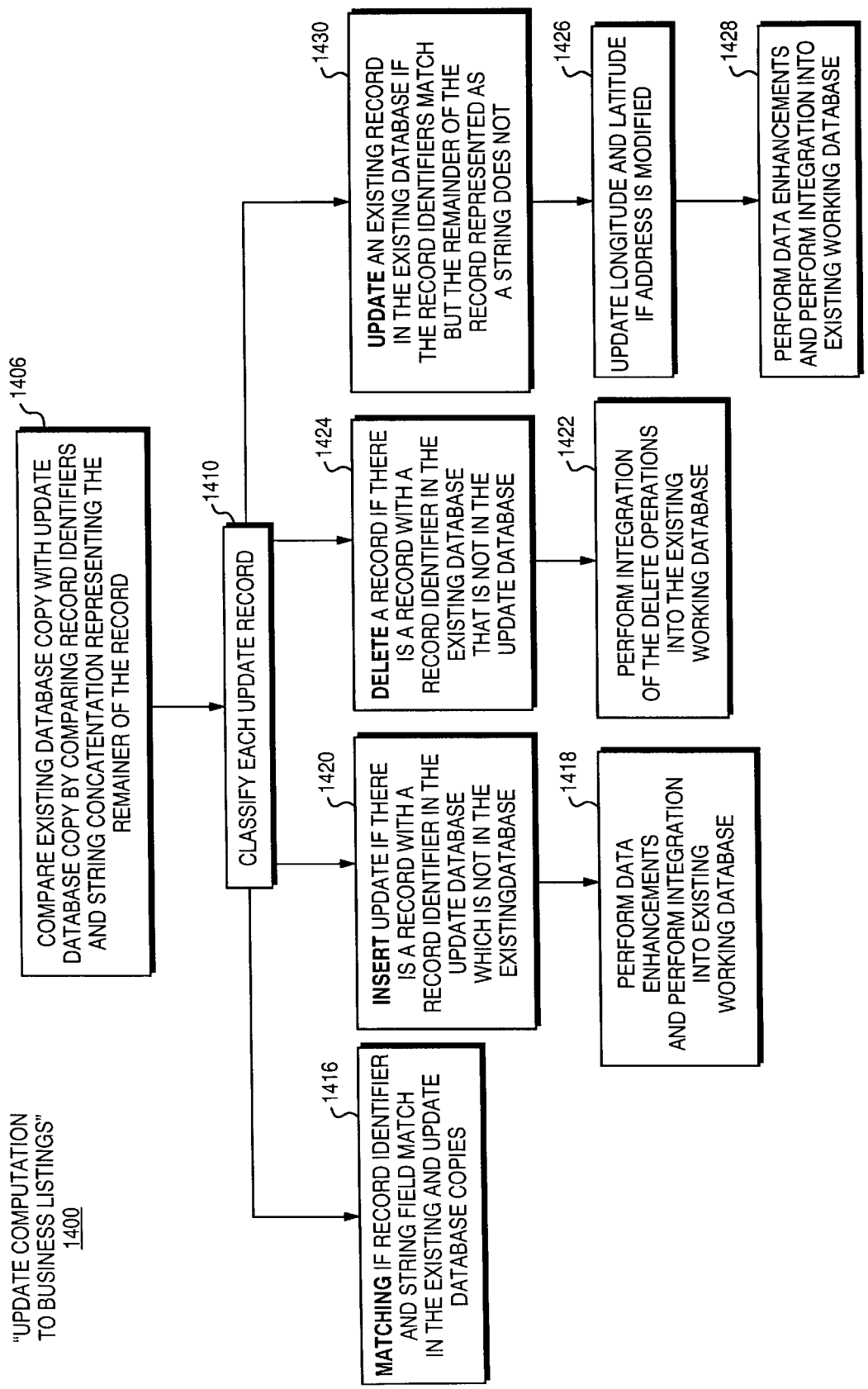

Referring now to FIG. 54, shown are more detailed steps of one embodiment of step 1400 involving the computation of the data update as pertaining to the native source business listings previously described. At step 1406 a comparison is made between the existing database copy with the updated database copy by comparing the record identifiers and the string concatenation which represents the remainder of the records. At step 1410 each update record is classified as one of a matching entry, an insertion, a deletion, or an update with respect to the existing database. At step 1416, a record is determined to be matching if the record identifier and string field in the existing and updated data base copies match.

At step 1420, a record has been classified as one to be inserted if there is a record with a record identifier in the update database which is not in the existing database. Subsequently, at step 1418, data enhancements are performed and the record is integrated into the working database. It should be noted that the data enhancements also performed in step 1428 is described in more detail in paragraphs that follow.

At step 1424, a record has been classified as one to be deleted from the existing database if there is a record with the record identifier in the existing database not in the updated database. Subsequently, at step 1422, the data operation is performed integrating the data updates into the existing working database.

At step 1430, a record is considered an update transaction to an existing record in the existing database if the record identifiers match, but the remainder of the record represented as a string does not match. Subseqently, at step 1426, the longitude and latitude of a record may be updated if the address has been modified. At step 1428, data enhancements may be performed to the record, and the data update is applied to the existing working database as well as the unfiltered database.

In the case of step 1416 where matching entries are found, no further processing may be required for existing database or the updated database record. However, at steps 1420, 1424, 1430, update records or transactions are generated to modify the existing database. It should generally be noted that any of the foregoing operations which are modifications, including updates and deletions, to the existing working database records may be conditionally performed in an embodiment of the invention. A protection or locking technique may be included in the database, for example, which prevents a deletion or modification of a particular business listing included in the database regardless of the processing classifications of FIG. 54.

The data enhancements, as performed at steps 1418 and 1428, are generally data filtering steps prior to integrating the data update into the working database 1508. The data filtering techniques generally facilitate matching corresponding records when performing updates. Data enhancements may include, for example, upper/lower case justification, detection of synonyms and/or acronyms, transformation of abbreviations as may be used in business names (e.g., corp., inc.), street addresses (e.g., st., pl.), and city and state names. Other embodiments may include other enhancements in accordance with the type of data and the various applications.

Figure 55:
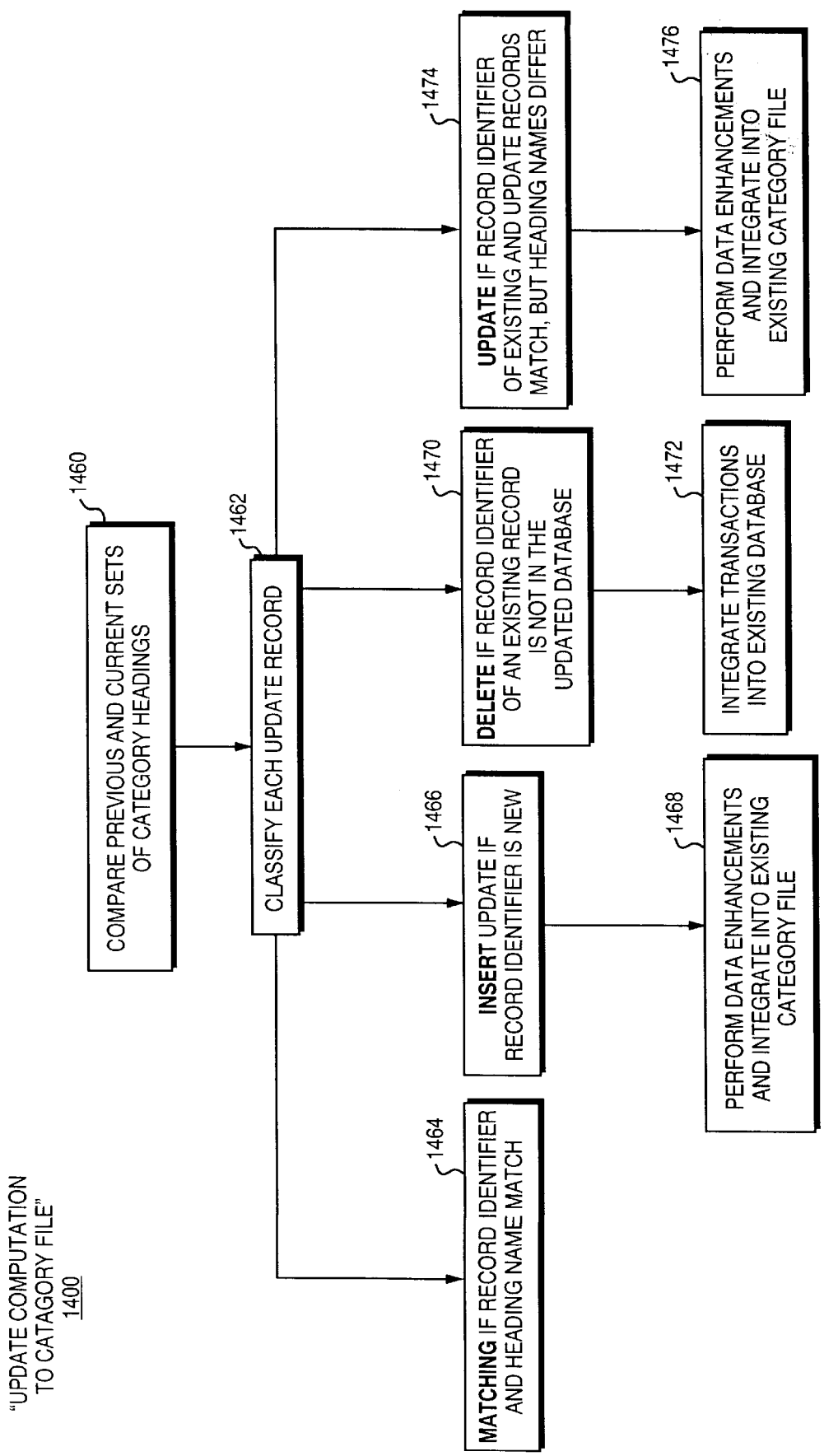

Referring now to FIG. 55, shown is an embodiment of a method for performing update computation of step 1400 as applied to the category file. Recall that the category file in one embodiment includes a category identifier and a corresponding header that is a text description of the associated category identifier. It should generally be noted that these updates are applied in a model similar to that of the business listing files for native source updates. The updates are first applied to a "raw" or unfiltered version of the category file, followed by data enhancements as appropriate, an then integration of the data updates into a working copy of the category file included in the working database 1508.

At step 1460, the current and updated category files are compared in terms of identifiers and associated headers. At step 1462, each update record is classified as one of several types of transactions.

At step 1464, a record in the updated category file is considered matching if the record identifier and the associated header match an entry in the current category file.

At step 1466, an record is inserted into the existing unfiltered database and working database if the record identifier is not in the existing unfiltered database copy of the categories. At step 1468, data enhancements may be performed and the resulting filtered data further integrated into the existing category file in the working database 1508. The data enhancements, as included in steps 1468 and 1476, are described in more detail in paragraphs that follow.

At step 1470, a record in the existing category file is deleted if the record identifier of an existing record is not in the updated version. At step 1472, this deletion operation may be performed to the working copy of categories included in the working database 1508.

At step 1474, an update record is used to update the database copies if the record identifier of an existing an update records match, but the heading names differ. At step 1476, data enhancements are performed and the update operation is integrated into the working copy of the categories includes in working database 1508.

The data enhancements, as performed at steps 1468 and 1476, upon the category listings may include processing of the headings. For example, the processing to enhance the text of the headings may include text transformations such as: upper/lower case justification, consolidation of abbreviations, and removal of idiosynchratic and slang terminology. The function of these data enhancements is to generally filter the data to provide more accurate determination of matching or corresponding categories.

Figure 56:
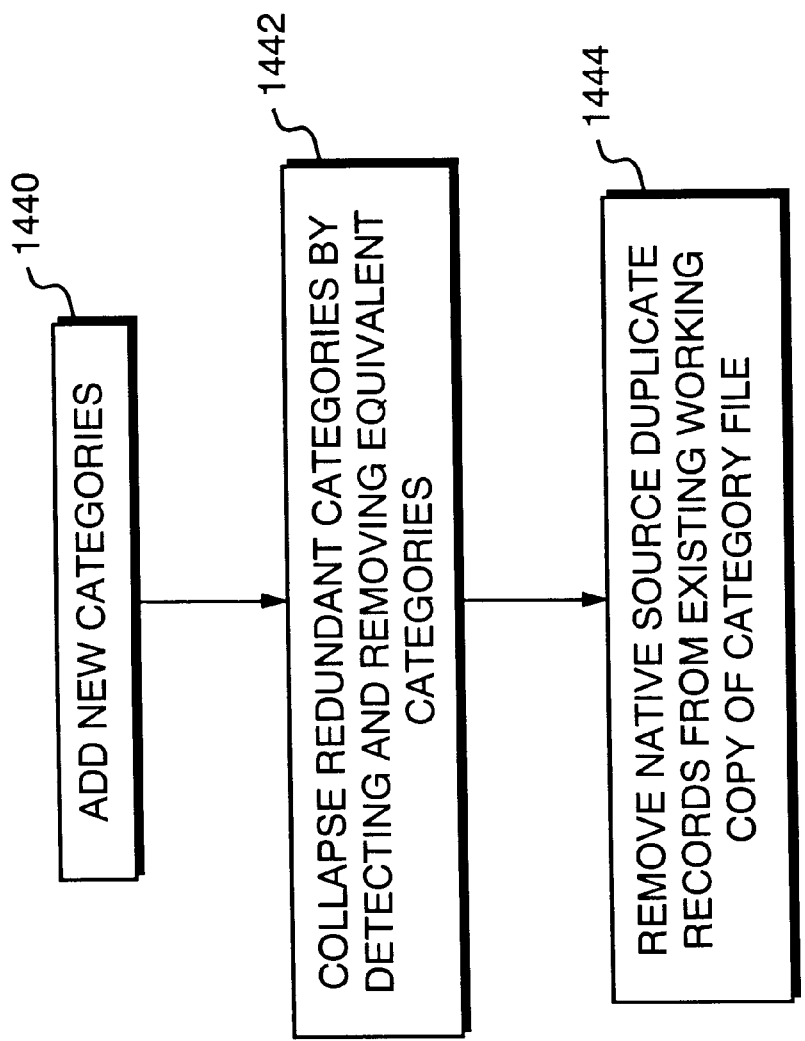

Referring now to FIG. 56, shown are general post processing steps for one embodiment of expanding more detailed steps of step 1404 of FIG. 53. Generally, these steps may be performed to the category file as included in the working database 1508.

At step 1440, new categories may be added. Generally, a data vendor may not provide an integrated version of all business categories. It may be possible to enhance some record categories as additional data is added. For example, a restaurant may be a particular type of category and there may be other subdata organized in the structure of the record indicating that there is a particular type of restaurant in accordance with the various ethnic cuisines, such as French or Italian. Post-processing as in step 1440 may be written to search the data file in accordance with recognized structural format and add additional categories in accordance with any categories and subcategories. For example, if a determination is made that there is a large number of restaurants with a subcategory of French, a new record category may be added which is "French restaurant". Similarly, an Italian restaurant category may be added. This is generally performed in accordance with the data organization and categories of the particular data being examined in each implementation.

At step 1442, redundant categories as stored by business are collapsed and detected by removing the equivalent categories. Generally, at step 1442, semantically equivalent categories are determined. Generally, this includes locating equivalent categories for which the spelling might be slightly different, or those fields which may be subsets or equivalents of other fields. For example, "animal doctor" may be interpreted as a semantic equivalent for "vet", or "veterinarian". Generally, this step may be done in an automated fashion using any programming language which is commercially available and may be used with the existing database. The technique involves dropping or not including special non-alpha-numeric characters or other words, similar to the stop words. White space may be compressed and comparison may be done on a case insensitive manner. The comparison may further be done by requiring an exact character match or with some at-a-distance technique similar to those previously described with other data processing.

At step 1444, the duplicate categories and records may be removed from the existing version as stored in the working database 1508.

It should be noted that in general the processing of step 1442 where there is a collapse of redundant categories by detecting and removing equivalent categories, different rules may be used to decide which category of several duplicates identified as the one to keep. For example, maybe the longest name, the shortest name, or simply the first name.

Figure 57:
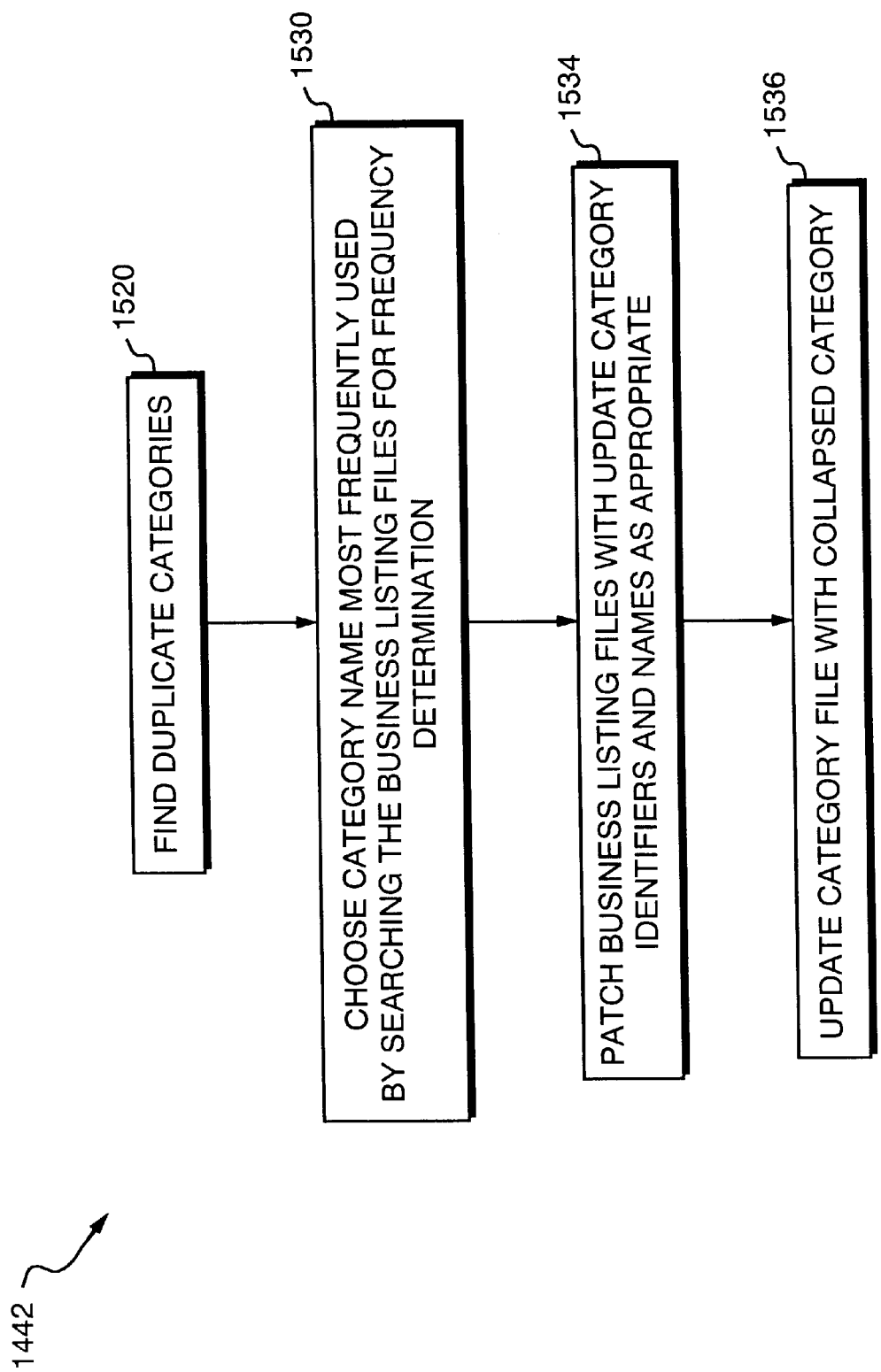

Referring now to FIG. 57, shown is a flowchart of one embodiment of a method of more detailed processing steps of step 1442 for collapsing redundant categories. At step 1520, duplicate categories are determined. A technique for determining duplicate categories is described in paragraphs that follow in conjunction with FIG. 58. At step 1530, duplicate categories in the unfiltered database may be examined as a group and one of the category names or headings is chosen to be the heading included in the collapsed category record. One technique for choosing the heading is be determining which category name is most frequently used, such as by examining the business listing files for frequency determination. At step 1534, the business listing files, as included in the unfiltered database, may be patched with the new heading and identifier corresponding to the collapsed resulting record. At step 1536, the category file is also updated to reflect the collapsed entry. It should be noted that these are made to the existing working database.

Figure 58:
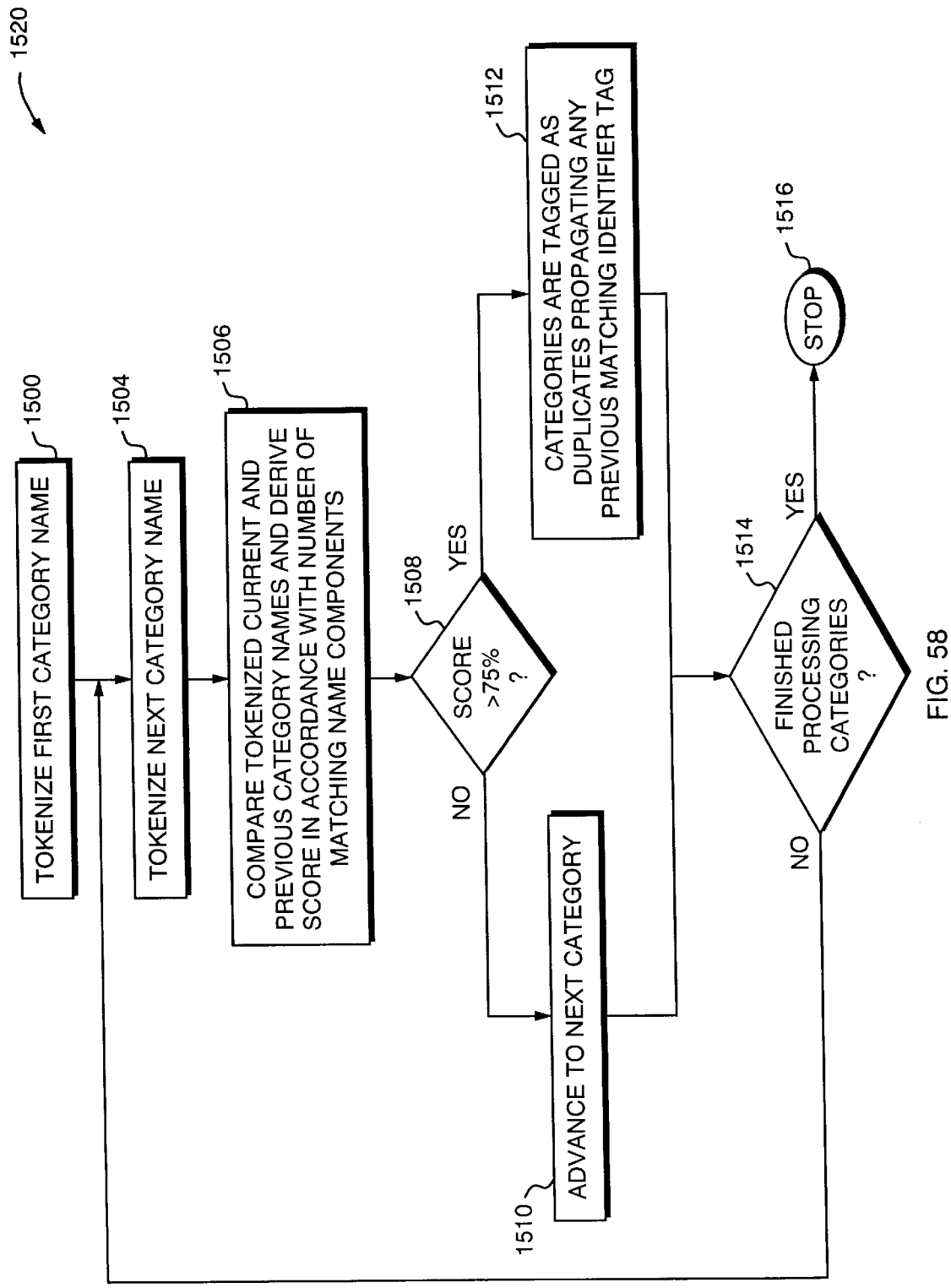

Referring now to FIG. 58, shown is a flowchart of an embodiment of method steps for detecting duplicates in the category file. Generally, these steps are more detailed processing steps of step 1520 of FIG. 57. At step 1500, a first category name in the category file of the unfiltered database is tokenized. In other words, each word included in the heading or category name is associated with a token. Similarly, in step 1504, the next record of a category is examined and also tokenized. At step 1506, a comparison of the two tokenized names is performed to derive a score in accordance with the number of matching name components. This may also be normalized, as described in accordance with the foreign source update processing techniques. At step 1508, a determination is made as to whether or not the score is greater than a predetermined threshold. In this instance, the threshold is 75%. If the score is greater than the threshold, control proceeds to step 1512 where the categories are tagged as duplicates propagating any previous matching identifier tag. In other words, the transitive matching technique is used in marking matching categories. For example, if ID1=ID2. Then, it is determined that ID2=ID5, ID5 is also marked as having ID1 as a matching identifier. Similarly, subsequent matches to ID5 further propagate the value ID1. Subsequently, control proceeds to steps 1510 for advancement to the next record. If it is determined at step 1508 that the score is not greater than the threshold, no match is found and control proceeds to step 1510 where the next category is advanced to. At step 1514, a determination is made as to whether all the categories have been processed in the category file. If they have, control proceeds to step 1516 where processing stops. Otherwise, control proceeds to step 1504 for further comparisons and determinations of equivalent categories.

It should generally be notes that various percentages and lengths used in the foregoing data integration techniques may be tuned or varied for each particular embodiment in accordance with, for example, the data type and record lengths. Adaptive tuning of values used in making determinations may be automated, for example, by adjusting thresholds in accordance with actual data values to filter out extreme data values.

It should also be noted that the category table or file may be used by the query engine when processing a data query. For example, the category file may be used to identify valid categories specified in a user query. It may also be used to categorize information displayed to a user. In other words, a resulting data set may be partitioned in accordance with the categories as included in business listings for the resulting query. For example, if a resulting data set includes 10 listings, these listings may be categorized or grouped in accordance with whether or not particular categories are associated with each listing. The information displayed to the user for these 10 listing may be 5 listings included in category A, and 5 listings included in category B. Thus, when the category table or file is updated, the table is propagated as part of the update data to the Front End Server and, subsequently, further to the query engine.

[Multi-media Data Transfer]

An efficient data transfer technique is used to transfer data between databases, such as between the Backoffice component 818 and the Primary Database 812 of FIG. 4. In this particular embodiment, the types of data that are transferred generally relate to advertisements such as those displayed to the user 800 of FIG. 2. Generally, advertisement data includes text data and non-text data. The non-text data may be referred to as "blob" data which includes, for example, image and audio data, as well as machine-executable programs, JAVA bytecode, and the like. The technique, which will be described in paragraphs that follow, generally uses different data channels depending on the type of data. For example, text data is transferred from the Backoffice component to the Front End Server 804 using a different data channel than blob data that is also transferred between the two components. A sending component may be located within the Backoffice component 818 which includes software that decides the type of data, the channel used to transfer the data, and how to break up the data into portions which are transferred to a receiving component located in the Front End Server 804, such as the primary database 812. Located on the receiving component, as may be included in the Primary Database 812, is software which decides how to synchronize or assemble data received from the Backoffice component 818. In this particular embodiment, the advertisement data is generally data that is displayed in response to a user query.

Generally, the text data included in this data transfer may be characterized as structured data, as included in text which is displayed to the user. The second type of data generally transferred is denoted as "blob" data which is generally not able to be decomposed or operated upon in different portions. For example, blob data may include a machine-executable program which is generally binary data type. Generally, the technique uses two separate data channels in which each channel transfers a different type of data. In this particular embodiment, one data channel is used to transfer the text data, and Database Link™ software, as included in the commercially available Oracle™ database, is used to facilitate database communication of text data. Therefore the database routines, such as those included in the Database Link software, may be used in transferring text data between databases. In this particular embodiment, the Oracle database does not support direct non-text manipulation, such as for transferring data of different types, such as blob data. Therefore, a second different data channel is used to transfer the blob data from one database to another in which the second channel is external to the database since the version of the Oracle database software used in this embodiment does not provide the needed support for direct non-text data manipulation. The blob data, which may also generally be characterized as multi-media data, is transferred asynchronously from the text data between databases.

As will be described in paragraphs that follow, the blob data in this embodiment is copied from one database to another using a C++ program with calls to vendor-supplied library routines. This is in contrast to the text data transfer which is done by a separate data channel, and the software used performs remote database copies as if they were local. In this embodiment, the text data transfer may be performed by calls to the Oracle procedures executed under the control of the Oracle database software. Generally, the data channels used to transfer both the text and the blob or multi-media data may be network connections between the databases. Other types of connections between the databases may also be possible, such as a dedicated hard line to facilitate database communication, as known to those skilled in the art. As will be described in paragraphs that follow, data is organized and associated with a particular advertisement that may be displayed to a user.

Figure 59:
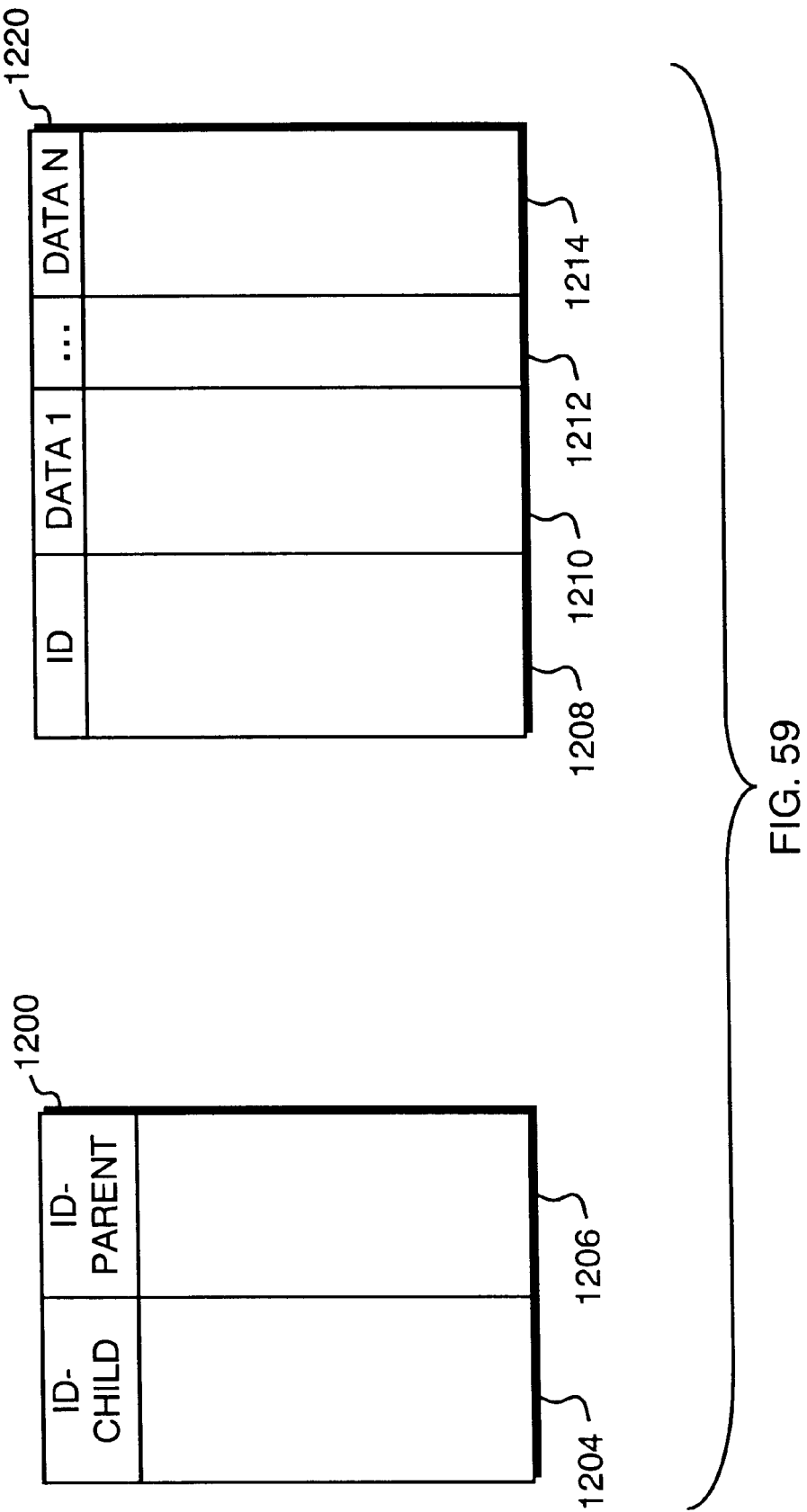
FIG. 59 is an example of an embodiment of data tables included on a sending node for a multi-media data transfer.

FIG. 59 is a block diagram of two tables in a preferred embodiment depicting one technique for storing the advertisement data. In this particular embodiment, the advertisement data and the relation between the different components of the advertisement data are described in two tables stored in the sending databases. Table 1200 is a relational mapping table which generally describes the relation between the various data entities as included in a particular advertisement page. In this particular embodiment, as will be described in an example, the relational mapping data describes a parent/child relationship between various data entities of an advertisement page forming a tree-like structure. The data table 1220 includes the actual data as described by the relational mapping table 1200. The data included in the data table 1220 includes a variety of data types as may be displayed with regard to an advertisement.

For example, the data included in table 1220 may be text data, machine executable code, or a JAVA program. In this particular embodiment which uses the Oracle database software, one restriction is that each row of the data table 1220 may contain at most one field of blob data. Thus, if an advertisement, in this particular embodiment, requires the use of multiple blob files, they must be stored in different rows of the data table 1220. Other implementations and embodiments may have similar or other restrictions that may effect the particular organization of the data as required for advertisements or other data displayed to the user. It should generally be noted that the structure of the tables depicted in FIG. 59 are particular to this implementation and embodiment of the invention. Other embodiments of the invention may include different table structures in accordance with various implementation restrictions.

The relational mapping table 1200 includes two columns of data. The first column 1204 is the record ID of the child data entity. The second column 1206 is the record ID of the parent data entity. The data table 1220 generally includes multiple columns depending on how many data fields are required for a particular implementation. In this particular embodiment, a record identifier 1208 is used to uniquely identify a particular data entity in a table. Also included are data fields data-1 1210 through data-n 1214 in which each of these data fields includes one particular type of data entity as may be displayed to the user in response to a data query.

Figure 60:
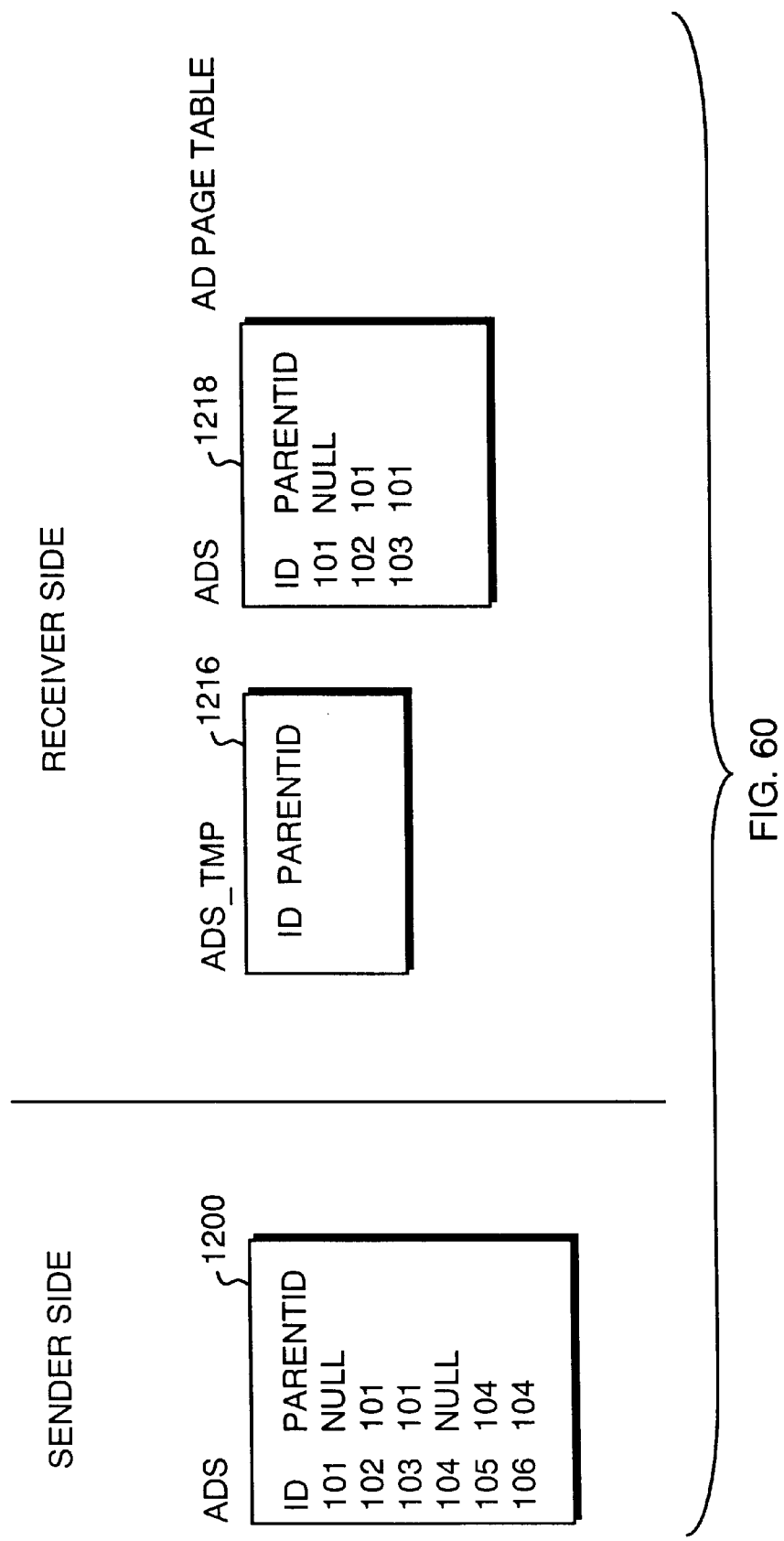
FIG. 60 is an example of an embodiment of the tables as appearing on the sending side and the receiving side in the multi-media data transfer.

Referring now to FIG. 60, shown is a more detailed diagram of the tables as used in a data transfer on a sending and receiving side using this data transfer technique. Shown in FIG. 60 is an example of a relational mapping table 1200 which includes multiple advertisement pages. In this particular embodiment, one tree-like structure is used to represent one advertisement page. As shown in FIG. 60, two tree structures may be produced using the data described in the relational mapping table 1200. What will be described in paragraphs that follow is the data transfer of the advertisement page associated with the root node with the identifier 104 which includes identifiers 104, 105 and 106 in its tree-like structure.

Figure 61:
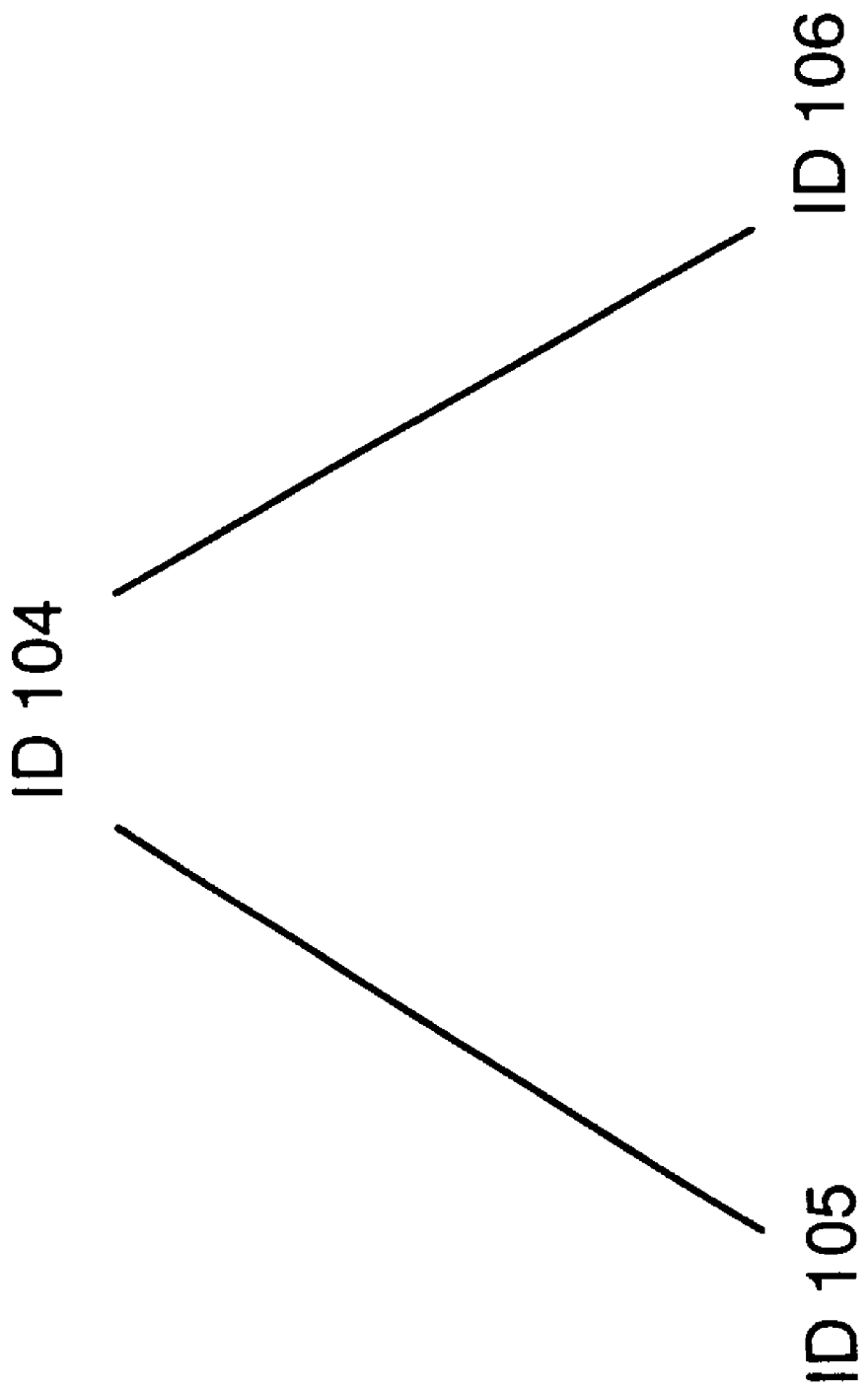
FIG. 61 is an example of a representation of a tree structure representing the relationships between entitites used in the multi-media data transfer.

Referring now to FIG. 61, shown is the tree-like structure described by the relational mapping table 1200 for the advertisement page with the root node identifier 104 shown in FIG. 60.

Referring back to FIG. 60, on the receiver side of the data transfer, shown are two tables, temporary table 1216, and ad page table 1218. n this particular embodiment these two tables are created on the receiver side for each advertisement transferred from the sender. In the snapshot of FIG. 60, the two tables of data on the receiver side depict tables after the transfer of the ad page with the root node of the identifier 101 and prior to the transfer of the data associated with the advertisement page with the root node beginning with the root node of identifier 104. Generally created on the receiver side for each advertisement page is a separate ad page table 1218. The temporary table 1216 is filled with data during the data transfer and after the data is properly assembled on the receiver side, the temporary table 1216 is not used until the next data transfer operation. In this particular embodiment, the table ends in a state such that no data from the data transfer having just occurred is located in the table 1216.

Figure 62:
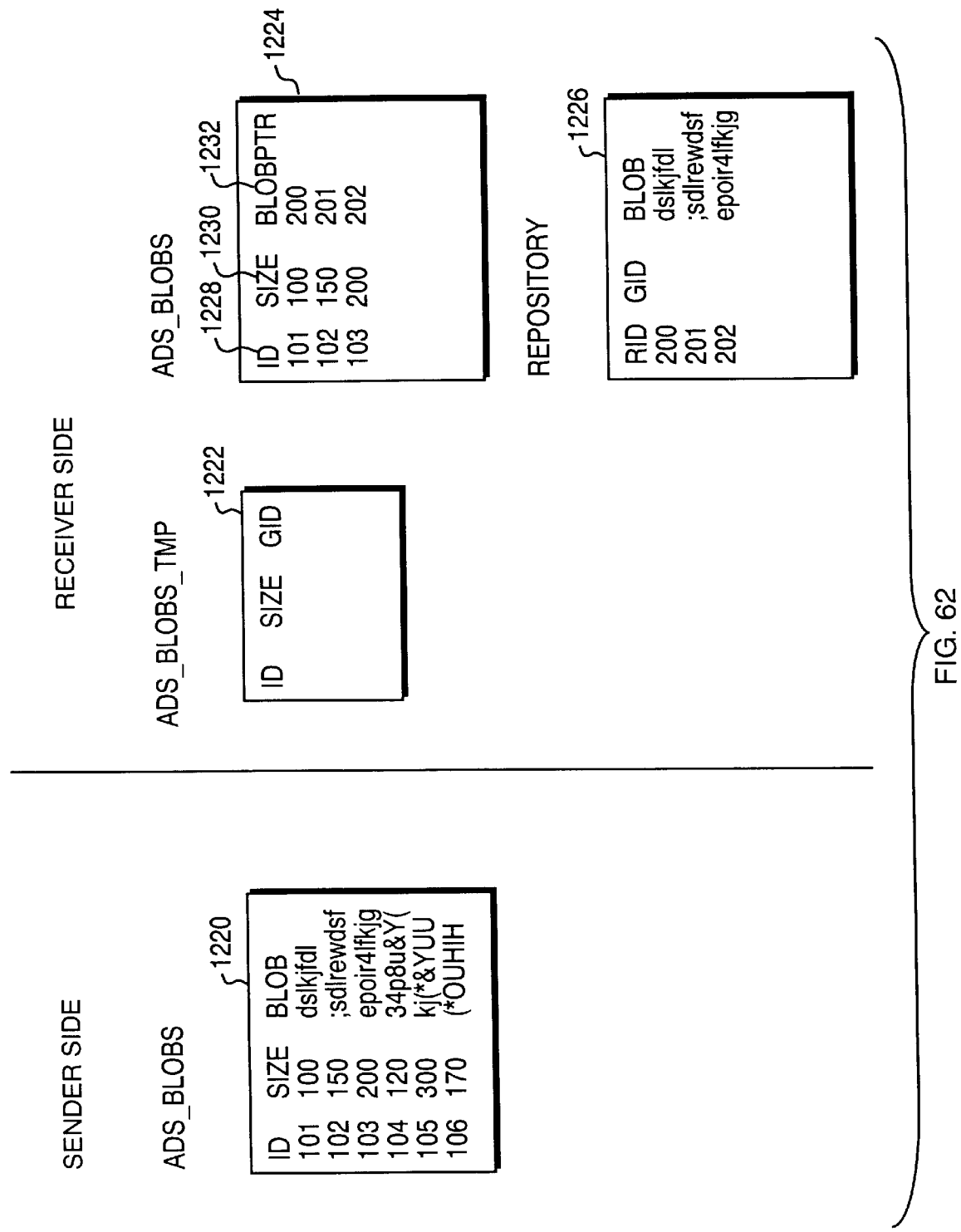
FIG. 62 is a snapshot of the tables that may be included in a preferred embodiment in sending data in a multi-media data transfer.

Referring now to FIG. 62, shown is a block diagram of the data on the sender side and the receiver side as associated with the data table 1220 previously discussed in FIG. 59. In the example which will be described in paragraphs that follow involving the data transfer of identifiers 104–106, each identifier is associated with only blob data. It should be noted that this general technique and the data included in the data table 1220 may additionally include text data associated with each identifier or row in the table. An entry in the table 1220 may also include only text data. As previously described in this embodiment, the limitation is that only one field entry of blob data may be associated with each row in table 1220. On the receiving side three tables are associated with transferring data which is blob data from the data table 1220. These three tables include a blob temporary table 1222, a blob table 1224, and a repository table 1226. It should generally be noted that any text data included in table 1220 on the sender side may be transferred using the data transfer channel. What is described in FIG. 62 is that portion of the data included in the data table 1220 which is blob data. In this example, only blob data is included in the advertisement page with the root node 104 which will be described.

The blob temporary table 1222 is a temporary table used in the transfer of text information associated with blobs from the sending node to the receiving node. The blob table 1224 in this particular embodiment, is an aggregate blob table which includes the blob data for multiple advertisement pages. In other words, the snapshot of the data tables of FIG. 62 shows that data associated with one advertisement page with the root node identifier 101. After the completion of the advertisement page with the root node identifier 104 on the receiving side, the blob table 1224 will also include information to retrieve the blob data associated with identifiers 104 through 106. It should be noted that the contents of the blob table 1224 do not include the actual blob data itself. Rather, as will be noted in the description that follows, the fields included in the blob table 1224 point to and further describe the actual blob data which is contained in the repository table 1226. The blob table 1224 in this embodiment includes three fields per each entry associated with a blob data entity. It includes a sending record identifier 1228, a size 1230, and a pointer 1232 to the actual blob data. The sending record identifier 1228 identifies a particular blob uniquely within a particular table or advertising page in this particular embodiment. Thus, each of the entries in the record identifier column 1228 may not be unique for all of the advertisement pages or data. Rather, the purpose of the record identifier is to map or identify the particular blob pointer associated with a unique record identifier from the sending database. The size 1230 indicates the size in bytes of the blob described by the blob pointer field 1232. In other embodiments, the size field may include other units to identify the size of the particular blob data. The blob pointer field 1232 acts as an identifier or pointer into the repository 1226 to uniquely identify within the repository a particular piece of blob data. It should be noted that other embodiments or implementations may include additional fields in the blob table 1224 as well as in the repository 1226 in accordance with other pieces of data that may be required in order to enable the transfer to occur in a particular implementation.

Figure 63:
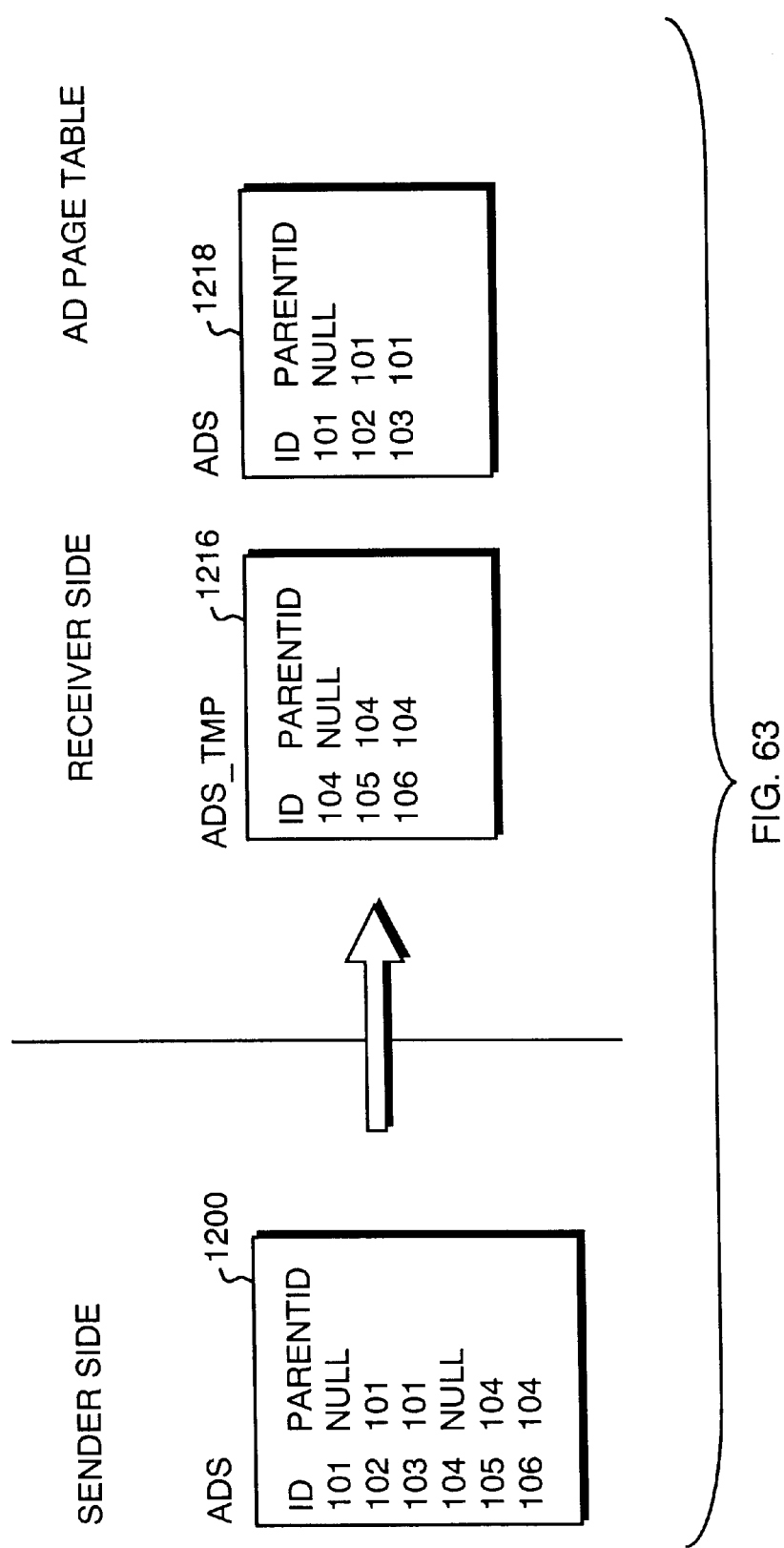
FIG. 63 is a snapshot of an example of an embodiment of the tables on the sending and receiving side at another point when performing a multi-media data transfer.

FIGS. 62 through 66 show the block diagrams of an embodiment of transferring the data associated with an advertisement from the sending side to the receiving side. FIG. 63 depicts a snapshot of the tables associated with the text or Database Link transfer channel as included in the sending and receiving sides. The data table 1200 on the sending side has no modifications from the previously described initial table as depicted in FIG. 60. However, the tables on the receiving side have been modified from those previously described in FIG. 60. In particular, the temporary table 1216 serves as a temporary placeholder for the data involved in the data transfer of the particular ad page described beginning with root node identifier 104. Generally, the data associated with a particular advertisement page is extracted from the relational mapping table 1200 and is temporarily copied to and stored in the temporary table 1216 on the receiving side.

Figure 64:
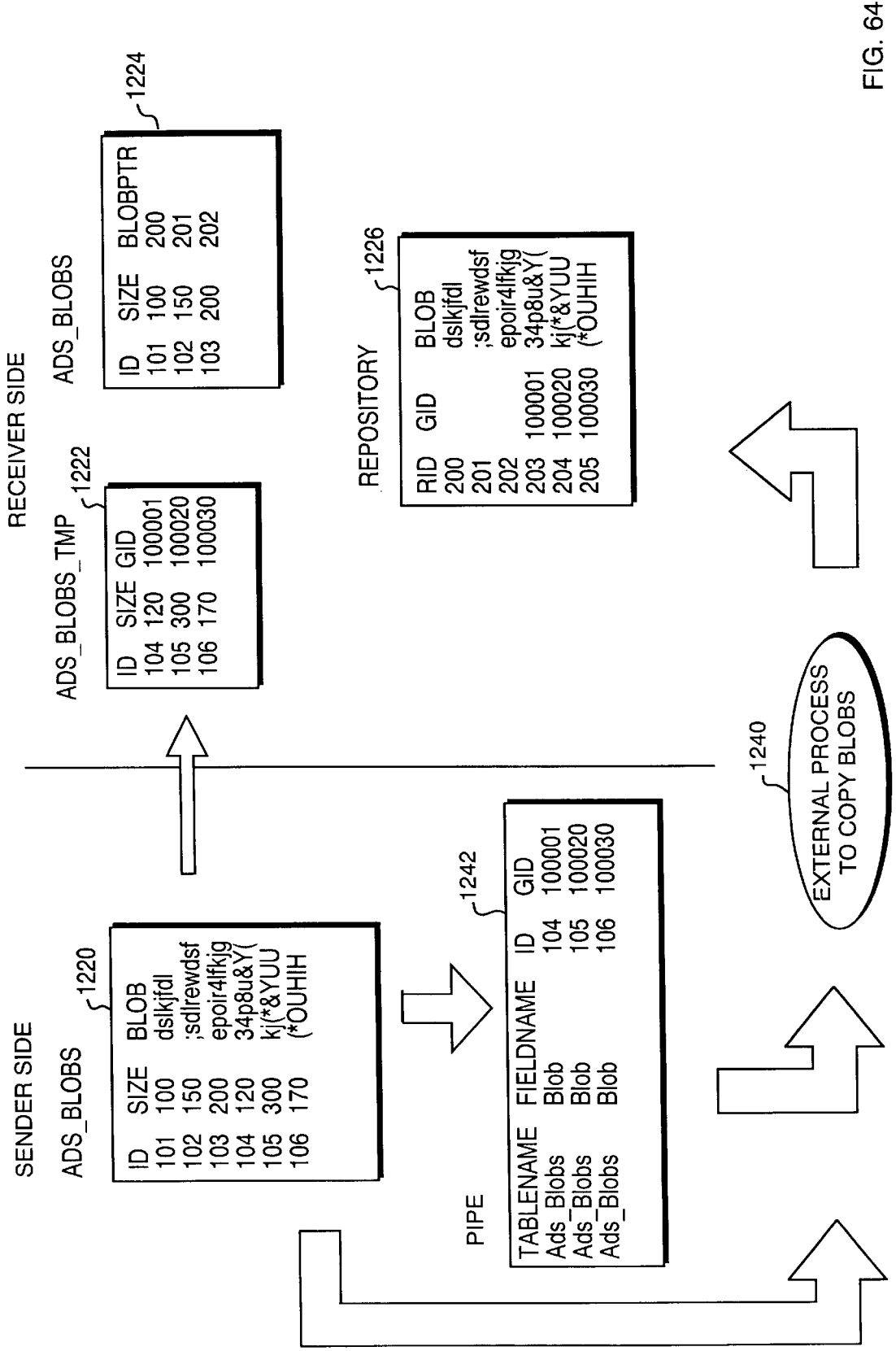
FIG. 64 is an example of an embodiment of tables and external processes on the sending and receiving side using the multi-media data transfer.

Shown in FIG. 64 are the tables associated with transferring the actual data from the sending side to the receiving side. The data included in the data table 1220 is segregated into text data and non-text data. The text data is transferred using the text channel. The non-text, multimedia data, or blob data, is transferred using an external process which creates a second multimedia data transfer channel in order to send data from the sending side to the receiving side. In this particular embodiment of the data table 1220, the id and the size fields are copied to the blob temporary table 1222. Additionally, a global id (Gid) is generated on the sending side prior to transmitting these fields to the receiving side. This global id is transferred to the receiving side and included in each associated entry of the temporary table 1222. Generally, the Gid is a unique identifier associated with each record uniquely identifying the record among all tables associated with database information.

The blob data from table 1202 and the associated information in table 1242 are transferred to an external process 1240 located on the sending side. In this particular embodiment, an Oracle™ pipe is the communication means used to transfer the data from the data table 1220 to the external process 1240. The external process 1240 further transmits the data via a multimedia data channel to the receiving side. Table 1242 may also be viewed as a temporary table which serves as a placeholder for that data which is transferred by the external process 1240 to the receiving side. Located in temporary table 1242 are four pieces of information including a table name, a field name, an identifier, and a global identifier associated with each blob data entity. The table name generally describes or identifies the particular table within which a piece of blob data is located or associated. In this particular embodiment, each table is associated with a particular advertisement or advertisement name. The field name identifies the type of non-text data. In this particular embodiment the field name is "Blob" referring to blob or multi-media data. The identifier field (Id) of table 1242 is the unique record identifier copied from table 1220. The global identifier (Gid) is a unique global identifier, identical to that which is produced on the sending side prior to sending the text data to the temporary blob table 1222. This information is passed or transferred to the external process 1240 which copies the actual blob data to the receiving side as well as the additional information described in temporary table 1222.

It should be noted that in this particular embodiment, the external process 1240 is a C++ program with library calls to facilitate the transfer of data between the databases. However, it should be noted that this is an external process with regard to the database. In other words, in this particular embodiment the facilities used to transfer the data from the sending side to the receiving side are external with respect to the database. In this particular embodiment, "external" generally refers to the fact that the external process 1240 executes outside of the Oracle process space. Certain tasks must be performed by the external process in order to transfer the data from the sending side to the receiving side. For example, the external process must connect to each of the databases in order to access and transfer the data. This is in contrast to the Database Link or text channel which is internal to the database and no such connections are implied. In other words, the routines which perform the data transfer of the text are internal to the database and data copying, for example, in this embodiment, is performed between remote databases as if they were local copies. The precise way in which both the text and blob data transfers are performed within other preferred embodiments may vary with implementation and facilities available for communication and data transfer.

It should also generally be noted that the external process may copy blob data from multiple tables in which the associated field name may differ with each table. Therefore, the field name may also be included in table 1242. The external process uses this field name to retrieve blob data to be copied. Other embodiments may communicate this field name using other mechanisms.

The external process 1240 uses the data included in the temporary table 1242 to fetch or access the blob data associated with a particular table name and field name to subsequently index into each particular table name using the identifier to extract the actual blob data. This blob data is copied to the repository table 1226 on the receiving node by process 1240. In FIG. 64, the repository table 1226 includes the blob data associated with advertisement identifier 104. This data is appended to already existing data in the repository 1226.

It should generally be noted that the transfer of the text data through a first data channel and the transfer of the blob data through an alternate or second multi-media data channel are performed asynchronously. When the receiving side has determined that all of the necessary data entities associated with a particular table or advertisement have been transferred successfully to the receiving side, the process of assembling the data into the advertisement page begins. It should also generally be noted that the data described in tables 1224 and 1226 are functionally equivalent to the data stored in table 1220. For example, table 1224 includes a blob pointer field which acts as an index into the repository table 1226, whereas table 1220 includes the actual blob data in a field. Thus, the use of the blob pointer field in table 1224 which acts as an index into the repository table 1226 performs the same function as the actual data in the blob data field of the data table 1220.

Figure 65:
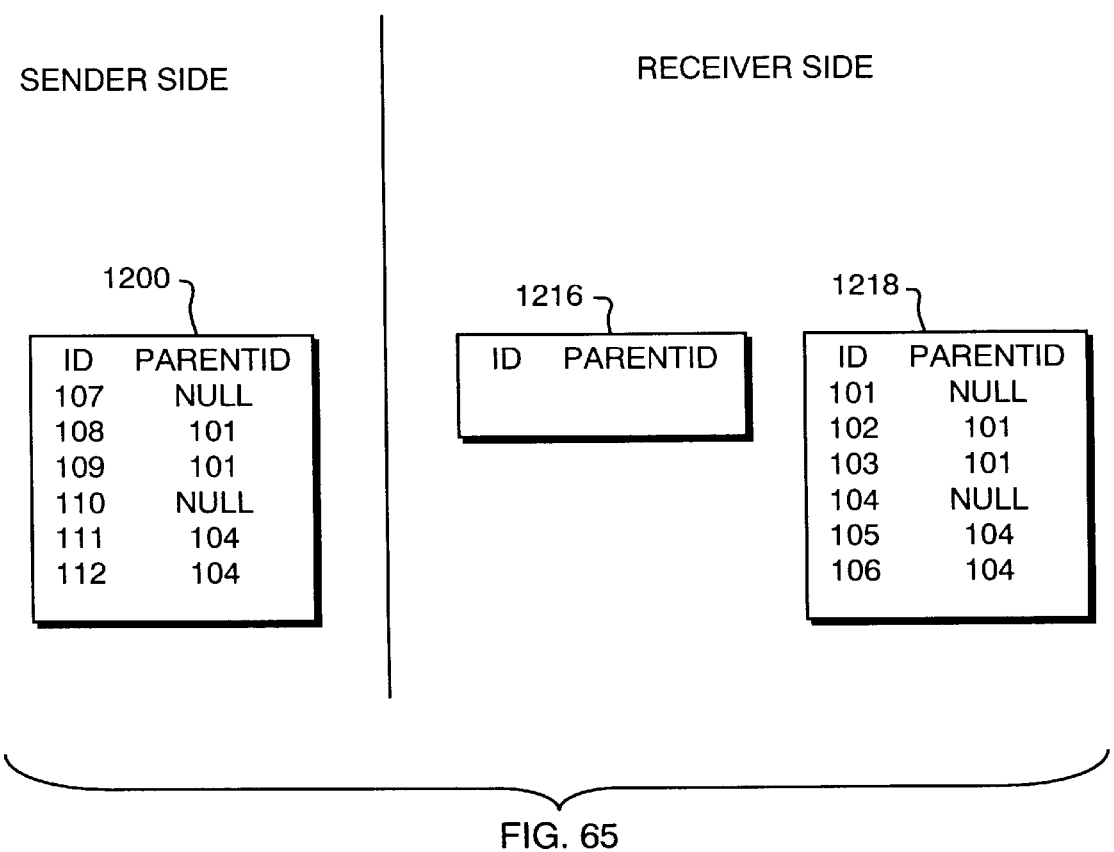
FIG. 65 is an example of an embodiment of the tables resulting from the text data integration.
Figure 66:
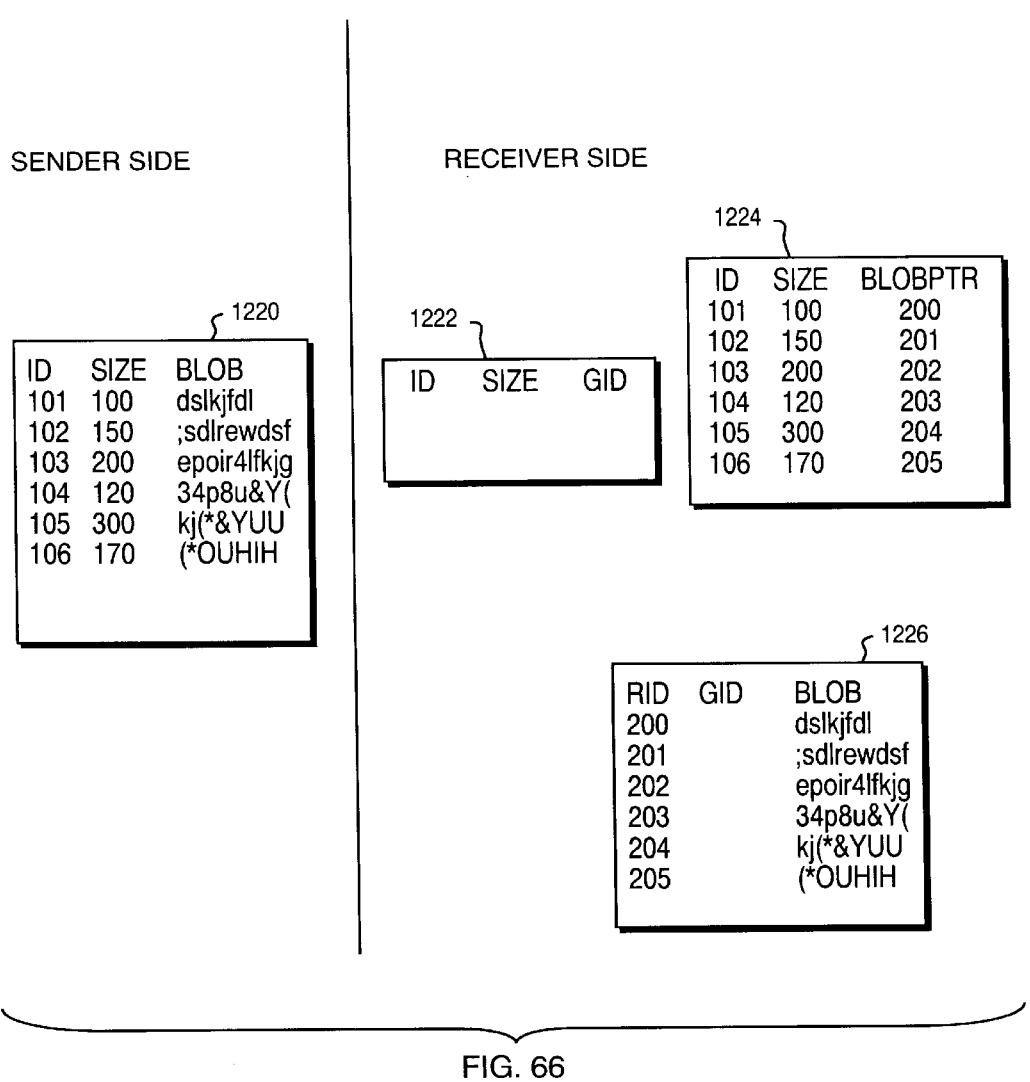
FIG. 66 is an example of a block diagram of an embodiment of the data table whose contents have been transferred to the receiving side.

What will be described in conjunction with FIGS. 65 and 66 is the integration process of the tables of the text and the blob data for the advertisement page identified by the sending identifier 104. Referring now to FIG. 65, shown is a block diagram of an embodiment of the tables resulting from the text data integration. In particular, table 1200 on the sending side remains the same as in previously described figures. On the receiving side, table 1216 data has been integrated and copied into the table 1218. The function of temporary table 1216 is generally to hold that text data associated with the relational mapping table which is transferred from the sending side to the receiving side until all of the data entities associated with the particular advertising page or table being transferred have arrived on the receiving side. At this point, the data integration on the receiving node begins. The software on the receiving side performs a state integration process. The previously described task of integrating the data from temporary table 1216 into table 1218 is one such task performed by this integration software.

Referring now to FIG. 66, shown is a block diagram of an embodiment of the data table 1220 whose contents have been transferred to the receiving side. The assembling software on the receiver side integrates the data from temporary table 1222 into table 1224. Additionally, a link is established in table 1224 to the data in table 1226 and the associated global identifier removed. Each entry in table 1222 is copied into table 1224. In particular, the Id and Size fields are copied into table 1224 for identifiers 104, 105, and 106. The integration software then uses the global Id obtained from temporary table 1222 to index into the repository 1226 in search for a matching global identifier entry. When a matching global identifier is found in table 1226, the repository Id from table 1226 is copied into the blob pointer field (Blob Ptr) of table 1224. Subsequently, the global Id in table 1226 for the corresponding entry is reinitialized to an empty field. The resulting table 1226 shows this process as repeated for each entry in the previously described table 1222 from FIG. 64.

Figure 67:
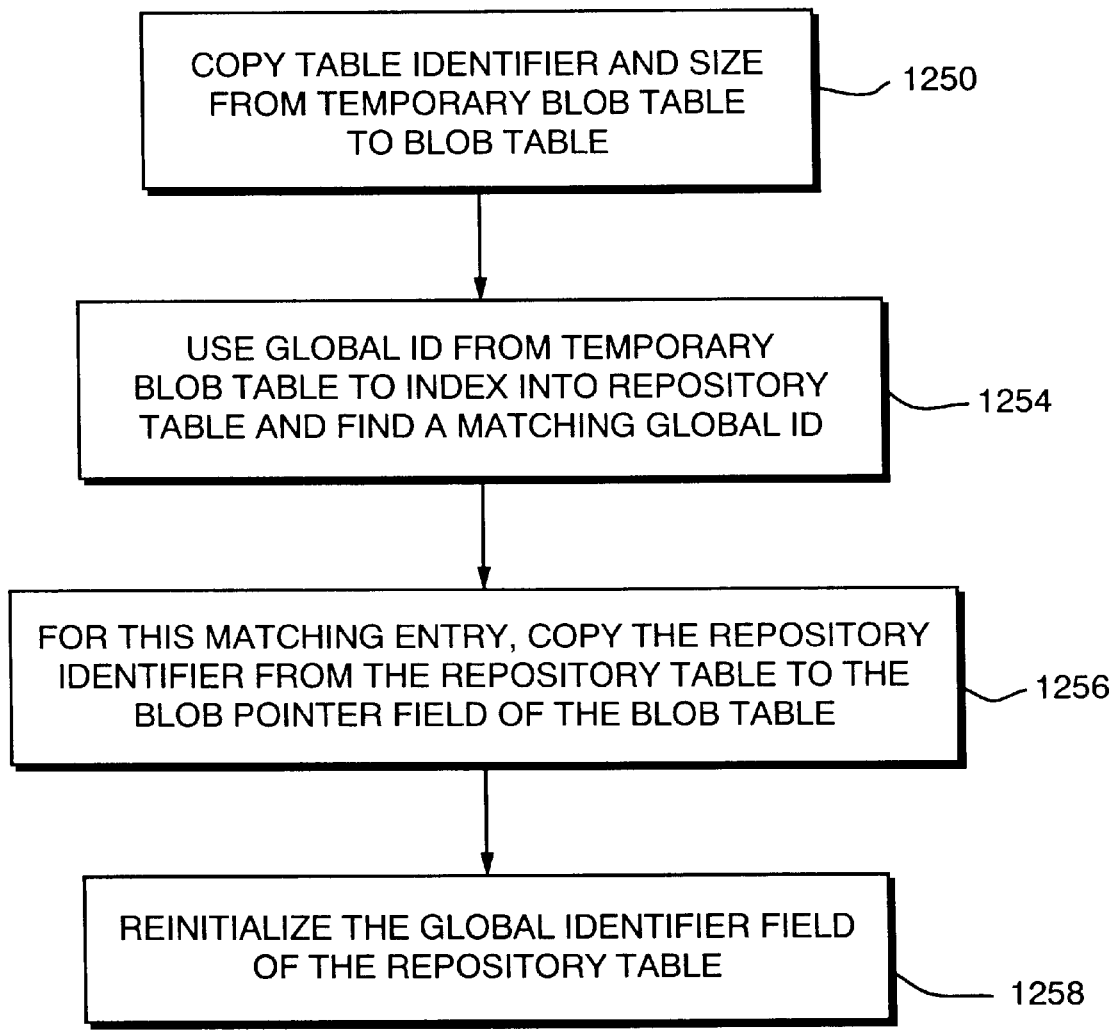
FIG. 67 is a flowchart of a method of the steps of one embodiment for assembling blob data into a repository table when performing a multi-media data transfer.

Referring now to FIG. 67, shown are method steps of one embodiment for assembling the blob data into the repository table. The steps described in FIG. 67 generalize the method previously described in conjunction with FIGS. 64 and 66 wherein the data shown in FIG. 64 is integrated and assembled into the tables on the receiving side resulting in those as displayed in FIG. 66. Generally, at step 1250, the record identifier and table size are copied from the temporary blob table to the blob table. At step 1254, the global identifier from the temporary blob table is used as an index into the repository table to finding a matching global identifier. For this matching entry, as in step 1256, the repository identifier is copied from the repository table to the blob pointer field of the blob table. At step 1258, the global identifier field of the repository table is reinitialized. The end result of performing the steps as described in FIG. 67, result in the tables as displayed in FIG. 66 representing the integrated or assembled blob table in which the blob data is integrated into the repository table 1226 as further described by the blob table 1224. It should generally be noted that the files resulting from the copying of the text and the blob data as described in FIGS. 65 and 66 have a particular relationship. Generally, the sending and receiving side for the text data have mirrored files. In this particular example, table 1200 and table 1218 are "mirror images" of each other. The temporary table 1216 is used in performing the transfer as a temporary table until all of the data for this particular data transfer has arrived on the receiving side. At that point, the data is integrated from the temporary table into the final resulting table 1218 resulting in a table 1218 which mirrors that on the receiving side which is on the sending side in table 1200.

Regarding the multi-media or blob data on the sending side and the receiving side, the resulting tables 1224 and 1226, in combination, are functionally equivalent to the data described in the sending side in table 1220. In this particular embodiment, one of the reasons for not further merging the data of tables 1224 and 1226 is due to the fact that transferring blob data, including a copy of the blob data from table 1226 to be integrated into table 1224, requires the use of an external program in order to compress the tables further. This is due to the fact that in order to perform any transfer of data which is not text, an external program, similar to external program 1240, is generally used since a version of the database software, as in this embodiment, may not be capable of copying and directly manipulating non-text data as needed in performing data operations.

The tables which are described in the preceding figures and associated descriptions may have a different number of entries and fields particular to each implementation of the concepts which have been described herein. What has been described is a flexible and efficient technique for performing data transfers. In this particular embodiment, the data transfer is between two databases. The techniques described may be adapted and used within other applications and a variety of environments.

The overall technique is generally to copy the text and blob or multi-media data asynchronously on two separate channels. This data is copied from a first database to a second database. Initially, the data is located on the second database in a temporary location until all of the portions of the data associated with a particular data transfer arrive at the second database. When it has been determined that all portions of the data have successfully arrived on the second database, the assembly process of copying the data from the temporary locations and merging the information into other data tables is performed on the second database.

Generally, the foregoing technique for data transfer may be used in a variety of applications, such as for the data transfer between databases. In one embodiment, this technique is included in a system for online Interactive Yellow Pages, GTE Superpages for the publication of multimedia advertisement content of GTE Superpages business customers. Generally, the GTE Superpages system includes two major components: the server component which serves versatile user requests for the information of more than 11 million businesses in the United States and (2) the Backoffice component that facilitates advertisement content, creation management and publication. Both these subsystems include databases where advertisement business information is persistently stored. The advertisement content produced or modified in the back office is published in the Superpages by virtue of its transfer from the persistent storage in the back office to the persistent storage in the server. Generally, the business advertisement includes an integrated set of structured textual information, such as business name, address, and multimedia or blob data, such as graphics, video, audio, job applets.

The data transfer technique described is generally a technique for transferring data using two data links between two databases. One of these data links is an internal data link with respect to the database, the second data link is an external data link with respect to the database. The internal data link is optimized for the structured text data transfer while the external one is optimized for the multimedia data transfer, such as the transference of data stored in binary objects in the database. This technique for data transfer generally alleviates the limitations of the existing database technology which does not provide for the transferring of multimedia objects using the internal data link. Moreover, by using the two data links to transfer the various data types, performance and stability are improved over an alternative prior art approach which uses only the external link for transferring both text and multimedia or blob data.

Generally, the transfer technique includes four collaborative processes: a process on a sending component which decomposes data structures and the like into text and non-text components assigning transient tags to the non-text components; two asynchronous transfer processes, one per data type, that each transfer, respectively, text and non-text components to a receiving component; and a process on the receiving component that reassembles transferred data and replaces transient tags with persistent unique tags.

This technique uses a multimedia data repository cable which is created and maintained in the receiving component, such as the receiving database in this embodiment. Once the data is transferred, the non-text or multimedia data items are stored in this repository with transient tags. Using the transient tags, the reassembly process correlates the text tables with the multimedia objects and replaces them with persistent unique tags, thus leading to the reintegration of the transferred data.

The previously described technique includes features which provide for efficient decomposition and reassembly of data for efficient data transfer, as between two databases. Additionally, the multimedia repository serves as a vehicle for the reassembly of decomposed data items which are reassembled on a receiving component, such as a receiving database.

[Incremental Update]

In paragraphs that follow, a description is provided of an incremental update procedure as performed upon the various databases included in the Front End Server component 804. The data in the Backoffice component 818 may be updated, for example, on a daily basis. These deltas or changes to this database in the Backoffice component are subsequently also applied to the copy of the database in the Front End Server component. It should generally be noted that in this application, as in the GTE Superpages online system, the number of transactions or updates to a database ranges from 30,000 to a half a million on a daily basis in accordance with the required data updates for the existing database. However, the techniques which will be described in paragraphs that follow may be applied to different systems with different transaction throughput and tuned in accordance with each particular implementation.

Generally, this update technique is used to provide data updates for both native and foreign sources, and on-line updates, as described in accordance with data processing techniques in other sections of this application.

Generally, data updates to the databases included in the Front End Server may first be integrated into the Backoffice component. Subsequently, these data modifications may be "pushed" to the Front End Server and integrated into the various data stores included therein, as will be further described in more detail in following sections. Generally, in this embodiment, data updates may originate from several sources, including native and foreign source updates, and on-line data entry, such as through an Internet connection via a browser. The native and foreign source updates may generally be characterized as larger updates or data integration efforts. These are generally described in other sections of this application. The on-line data entry technique for updating information that may be included in the Backoffice component may be performed as previously described through the menus initially displayed to a user, such as at the GTE Superpages Internet site, that provide access to the Backoffice component data information.

The data integration techniques, as related to the foreign and native source updates to integrate the data updates into the Backoffice component, are generally more detailed and involved than the integration of the on-line specified modifications. In the former case, the data updates may generally be a large number of data modifications requiring more computer resources than in the latter case. Thus, for example, the on-line modifications may be incorporated on a daily or other predetermined time period using some data enhancement techniques as described in other sections of this application. Other data updates may require additional time and computer resources and not be able to be completed, for example during non-peak usage, such as overnight on a daily basis. Thus, additional planning and different processing techniques may be used with the various types and volume of data updates as included each embodiment.

Once the data modifications are incorporated into the Backoffice component, the data updates, including the updates to advertisement data and other data associated with each business listing, may be propagated to the Front End Server component. The non-text or multimedia data, for example, as included in advertisements with image files, may be transferred to the Front End Server from the Backoffice using multimedia transfer techniques, as generally described in other sections of this description. The updates to the Primary Database included in the Front End Server may be communicated as a table of commands created in the Backoffice component and transferred, as by a network connection, to the Front End Server. Generally, in this embodiment, the table created in the Backoffice includes an application developed command language corresponding to the various types of record updates and modifications that may be included in this particular embodiment. Each of these commands may be further translated in the Front End Server into one or more actual database commands that perform the table operation. For example, an entry in the table of database update commands may be specified as follows:

COMMAND RECORD # OPTIONAL DATA
DELETE 1–5

In this above example table, three fields of data may be included. A Command field specifies the type of data command. The Record #field identifies which records in the Primary Database this command applies. The Optional Data includes data that may be related to the specified command. For example, if the command were update, the data field may specify the data which is to be included in the records specified. In the above example, the command is to delete records 1–5. This single table command may be translated, for example, by software included in the Primary Database, into 5 database commands in accordance with the particular database software. The software which builds the table in the Backoffice and translates the commands into one or more database commands may be developed using a commercially available software system that is capable of communicating with the underlying database to perform the required operations.

It should be noted also that the entire table may be transferred from the Backoffice to the Front End Server, or it may be divided into sections and updates performed for each section. Additionally, each command may be sent as a separate message in other embodiments in accordance with the number of updates and other associated computer resources and costs for each data transaction. This may vary with implementation.

Figure 31:
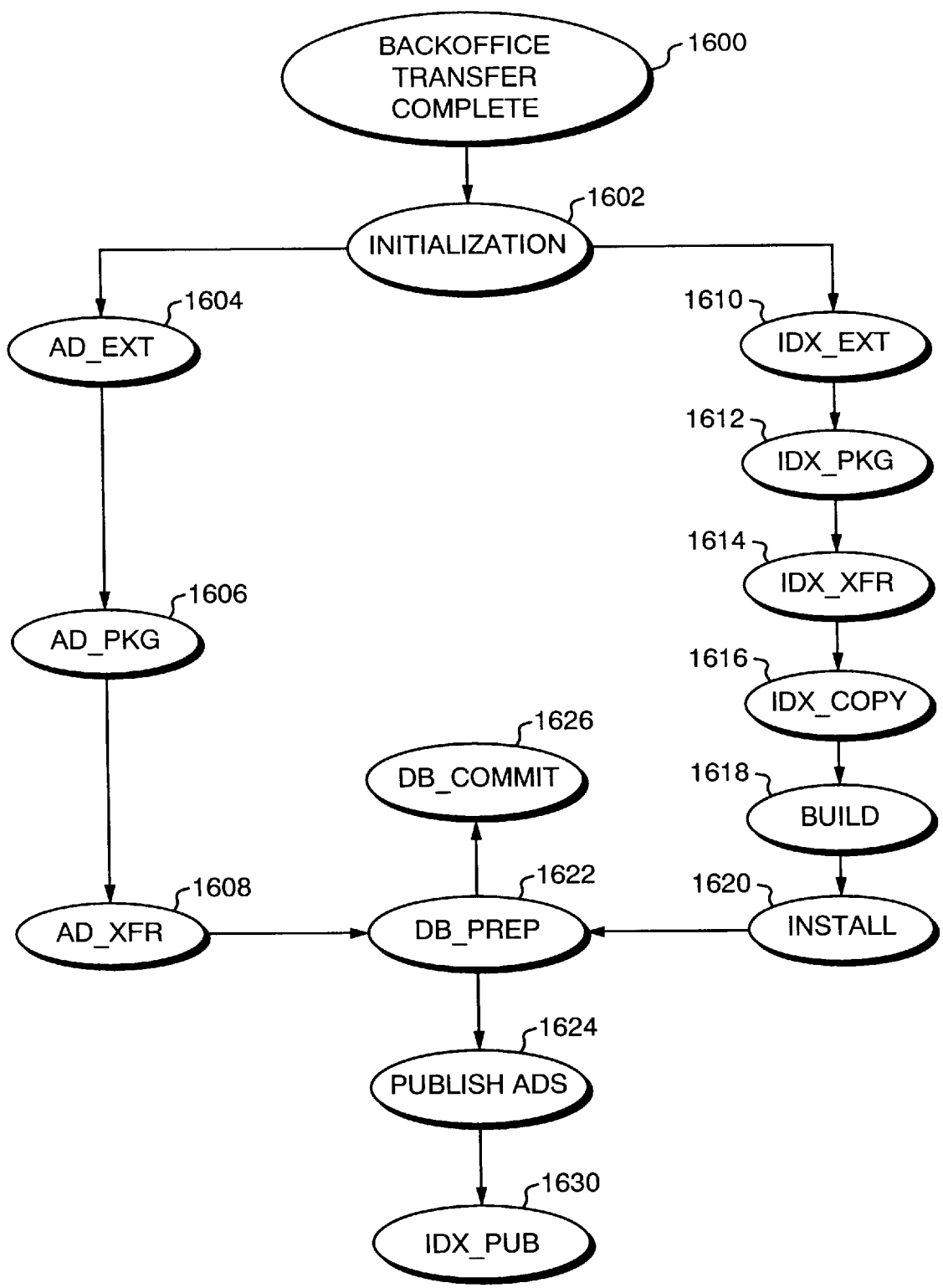
FIG. 31 is an example of a dependency graph as may be included in one embodiment of the invention for performing incremental update.

Referring to FIG. 31, shown is an embodiment of a dependency graph for performing the various processes in an incremental update. At step 1600, the Backoffice data transfer must complete prior to beginning the update to the database in the Front End Server component. The Backoffice data transfers is complete when multimedia and text data has been transferred from the Backoffice component, such as data required when updating an advertisement page. Additionally, other information from the Backoffice component is transferred to the Front End Server component 804, such as in the form of an operational table. The operational table may include information about the updated normalized data, which has been applied to the Backoffice component, and which is now to be applied in this incremental update procedure to the Primary Database copy of the normalized data.

At step 1602, an initialization procedure may be executed to synchronize the beginning of the update procedure for the steps that will be described in paragraphs that follow. As indicated by FIG. 31, steps 1604, 1606, and 1608 may be performed independently and at the same time as steps 1610 through 1620. The coordinating point labeled DB Prep at step 1622 serves as the coordinating point for the different procedures performed in updating the database on the Primary Database, and the local copies of necessary files, such as the Term list identifiers, located on each of the server nodes.

At step 1604, the various advertisements are extracted from the data tables, such as those transferred from the Backoffice component in the multimedia and text data transfer. At step 1606, the various advertisement pages are packaged and made into a complete advertisement page to be stored in the Constructed Ad Repository 842. At step 1608, the constructed ads are transferred and included in the Constructed Ad Repository. It should be noted that in this embodiment the existing copy of the Constructed Ad Repository is updated in accordance with those particular ads which have changed. Thus, the Constructed Ad Repository is updated on a delta or change basis.

Simultaneously, steps 1610 through 1620 may be performed in conjunction with steps 1604 through 1608. This may be done, for example, in a parallel fashion. Steps 1610 through 1620 indicate that process by which the various identifiers and other files associated with the Primary and Secondary database are updated. Steps 1604 through 1608 reflect the updating of the Constructed Ad Repository 842 on an as-needed basis in accordance with changes which have occurred in the advertisements.

At step 1610, various changes to the Term lists identifiers are extracted. In other words, it is determined at step 1610 what identifiers in the Term lists need to be updated in accordance with the changes transferred from the Backoffice component. This is described in more detail in paragraphs that follow. At step 1612, these various identifier updates are packaged. At step 1614, these various identifier changes are transferred to each of the server nodes. In this embodiment, the actual data transferred at step 1614 are the raw operational commands as may be supplied by the Backoffice component to be applied to the existing Term lists. At step 1616, at each node, a working copy is made of the existing Term lists. At step 1618, on each of the server nodes, the changes are made to the working copy local to each server node. At step 1620, the updated term list is installed. At this point, the updated term list is not yet available for public use in the sense that it is published. However, a new version of the Term lists has been created which includes the updated information as supplied in the transfer step 1614.

At step 1622, database preparation steps are performed. Step 1622 serves several purposes. One is a coordination point for the updates of the various ads, as well as the various term list identifiers. Secondly, step 1622 serves as a step within which the normalized Primary Database information is propagated from the normalized copy of the Primary Database to a denormalized form in the Primary database and the denormalized form in the Secondary Database. In other words, the changes which are transmitted from the Backoffice component and reflected in the normalized Primary Database copy are now further propagated to the denormalized Primary database and the denormalized Secondary database copy. Additionally, at step 1622 as part of the database preparation, the validity of the transactions and updates are verified such that at step 1626 the database knows it may fully commit to performing the update to the denormalized copies as used in performing user queries.

Steps 1624, and 1630, and, respectively, step 1626 may be performed in parallel. After the database preparation of step 1622, the ads may actually be published as in step 1624 in which the updated copies of the Constructed Ad Repository are actually made available for use. Additionally, any updated images as stored in the Image Repository are also available for use. At step 1630, the previously installed identifiers included in the Term lists, as installed in step 1620, are published in step 1630. At step 1630, the publication of the various identifiers included in the Term lists generally means that the Term lists are available for use, as by the Query Engine. At step 1626, which may be performed in parallel with the steps of publishing the ads and publishing the identifiers, the database commits to performing the update.

It should generally be noted that steps 1614 through 1620 are performed independently for each server node in this embodiment. Additionally, the actual amount of processing performed on the Term lists varies in accordance with the number of updates or transactions, as will be described in conjunction with FIG. 32.

Figure 32:
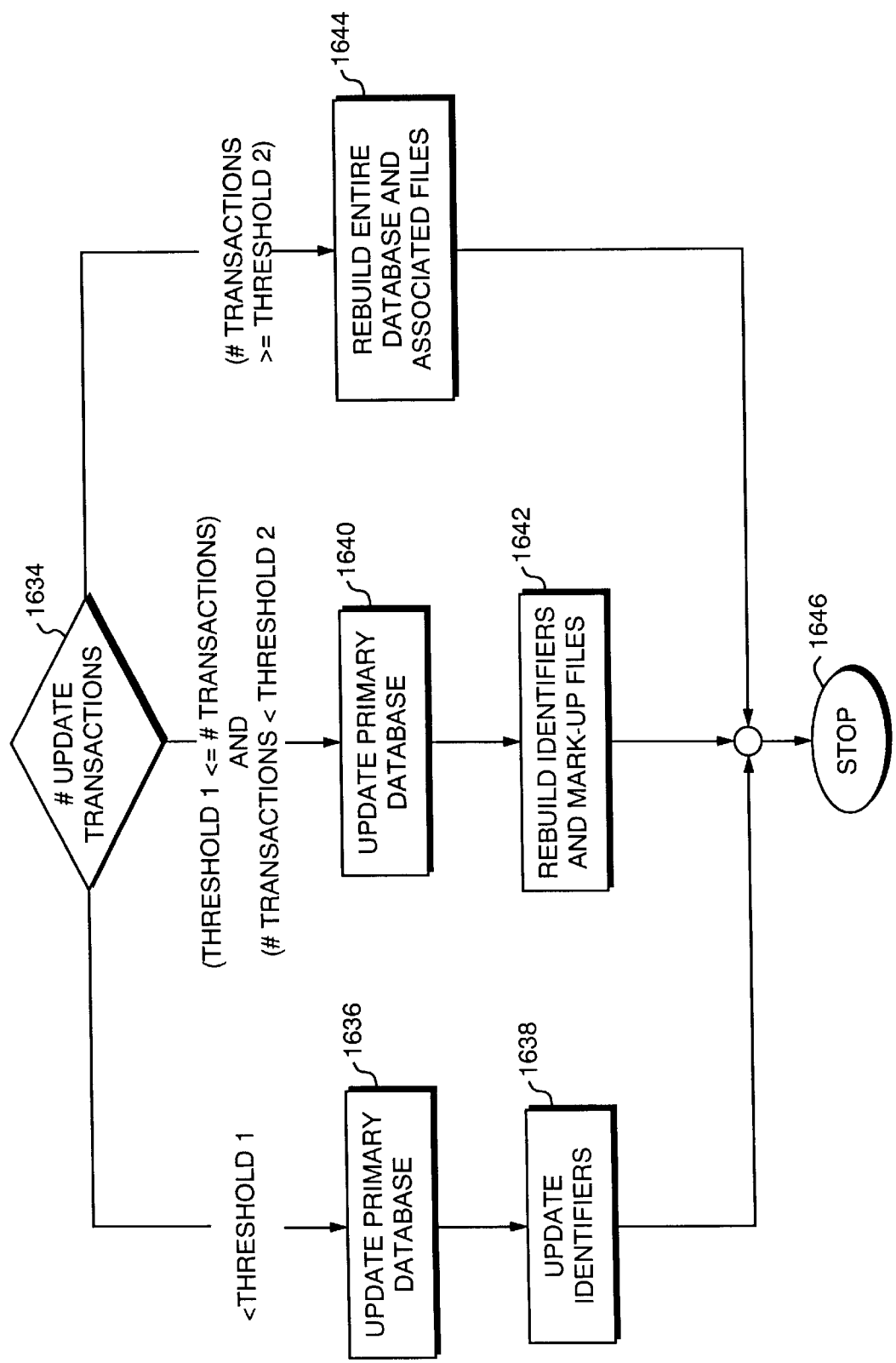
FIG. 32 is an example of a flowchart of the method steps for performing different update techniques in accordance with the number of transactions.

Referring now to FIG. 32, shown is one embodiment of the various method steps for performing update steps in accordance with a particular number of update transactions as sent from the Backoffice component 818. At step 1634, a determination is made as to the number of update transactions. This determination involves a comparison with two threshold values each describing a particular threshold number of transactions. Generally, THRESHOLD 1 describes a relatively small number of transactions. In this particular embodiment, a relatively small number of updates generally refers to less than 30,000 update transactions. Also specified is a THRESHOLD 2 value which generally represents a second, larger number of transactions. In this particular embodiment, THRESHOLD 2 represents approximately half a million transactions or update entries which corresponds to approximately five to ten percent of the number of records included in the Primary Database. Generally, as described in conjunction with FIG. 32, one of three update techniques may be applied. If the number of update transactions as determined at step 1634 is less than the THRESHOLD 1 or a relatively small number of updates, steps 1636 and 1638 are executed. In step 1636, the normalized Primary Database is updated. Generally, this is performed at step 1602 of FIG. 31 in which the copy of the normalized Primary Database is updated in accordance with the operational table as transferred from the Backoffice component indicating the actual database update operations. At step 1638, due to a relatively small number of transactions required, the actual identifiers of the Term lists are updated. In other words, the Term lists are updated as opposed to being rebuilt.

At step 1634, if a determination is made that the number of transactions is greater than or equal to THRESHOLD 1, and also less than the greater threshold, THRESHOLD 2, steps 1640 and 1642 are executed. At step 1640, the Primary Database is updated, as previously described in conjunction with step 1602 in which the normalized copy of the Primary Database is updated. At step 1642, all of the identifiers as included in the Term lists are rebuilt. In this particular embodiment, both identifiers and markup files are rebuilt due to the use of the mark-up files by the Verity Information Retrieval software. As previously described in conjunction with FIG. 25, the Extraction Routines are executed to again produce the markup language files and various update records needed to update the denormalized data of the Primary Database. In step 1642, the Information Retrieval software is executed to produce entire new sets of the Term lists. Step 1642 is in contrast to step 1638. Rather than rebuild the Term lists as in step 1642, the Tern lists are updated in step 1638.

If a determination is made at step 1634 that the number of update transactions is greater than or equal to the larger threshold, THRESHOLD 2, step 1644 is executed. At this point, a determination has been made that the number of update transactions is so large that it has been deemed more efficient to rebuild the entire database and associated files, rather than update or patch the existing database and associated files, as in updating the identifiers of the Term lists of step 1638.

The previously described procedure of performing a multimedia data transfer is used to transfer, for example, the multimedia and text data associated with ads, as may be included in the Constructed Ad Repository 642 and Image Repository 842 of FIG. 4. The granularity which indicates that an advertisement page has changed requiring the entire advertisement page to be replaced in the Constructed Ad Repository is if a single component within an ad page has changed. In this case, the entire ad page is reconstructed and replaced in the Constructed Ad Repository 842. For other systems, a different granularity of change may be used. Generally, as previously described, the various markup files and Term lists are built as needed in accordance with the number of transactions as described in conjunction with FIG. 32. The actual threshold values may be determined in accordance with tuning of a particular system and the size of the database the number of transactions in each particular system. In this particular embodiment, the database as included in both the Front End Server and the Backoffice component are Oracle™ databases. The Oracle™ procedural language, PL/SQL, may be used to read the operational table and perform the updates as needed to the normalized form of the data as stored in the Primary Database included in the Front End Server component. Similarly, the same procedural language in files may also used to update the denormalized Primary Database copy and the denormalized form of the data as stored in the Secondary Database. Other embodiments may employ other techniques to update both the Primary and Secondary databases in accordance with a particular implementation.

In this particular embodiment, the previously described incremental update procedure is one that is generally used to perform daily updates. However, in other embodiments, the same procedure may be used on a larger time period of transactions or updates. Due to the volume and size of the previously described embodiment, this procedure is one which performs well when performed on a daily basis. For other systems which may perform a similar number of transactions for a larger time period, the previously described techniques may also be used.

In this particular embodiment, as may be included in the Backoffice component, the various updates to a particular record or for a particular business or service may be collapsed before actually issuing the various database commands to perform the updates. In other words, within a certain amount of time, such as within five hours, a single record may be inserted, deleted and modified dozens of times. The end result of these modifications for the small time interval may result in no net modification or amendment to a particular record. Thus, one optimization, as may be included in the Backoffice component in a preferred embodiment, may collapse various updates associated with a particular record or business before actually issuing commands which perform a database update as applied to the copies in the Backoffice 818 and Front End Server 804 components. Generally, this may be determined by using a finite state machine with the states of "insert", "delete", and "modify". If the same record, for example, is modified twice and then deleted, the net result is that only a "delete" database command should be issued rather than issue two updates followed by a delete.

Also, in this particular embodiment, the contents of the Page Cache 848 and the Query Cache 850 are reinitialized when an update is performed, as in performing the incremental update procedures described in conjunction with FIGS. 31 and 32. The data included in the PHTML execution tree is also reinitialized.

A failure may occur when performing any of the steps associated with FIGS. 31 and 32. If a failure occurs when performing certain steps, then a recovery procedure may be performed. In this particular embodiment, a failure may occur for example, when using the Information Retrieval software, as depicted in conjunction with FIG. 25. This may be due, for example, to a problem, such as a software bug, with the Information Retrieval software 908. For example, an error may occur when extracting the identifiers associated with step 1610. Generally, step 1610 as previously described includes building the Term lists as determined in accordance with the number of update transactions in accordance with FIG. 32. If an error occurs, for example, when producing or rebuilding the identifiers in the Term lists as in performing step 1642 and step 1644, it may be a recoverable error if another node has successfully built the identifier files, for example. In this instance, where there has been a successful build of the various identifiers on another server node, a recovery procedure may be to copy the updated version of the Term lists from one node to another node which has been unsuccessful in the building the Term lists. This copy may occur, for example, after a predetermined number of builds of the Term lists on a particular node have failed. In this particular embodiment, this has been determined to be a recoverable error with which an alternative step or technique may be applied to also achieve the end result of the updated Term lists. Other embodiments of the invention may also include other alternative techniques in accordance with those steps associated with a particular system which it determines to be recoverable.

In the previously described embodiment, the update techniques may be included in a distributed computing system having multiple data representations as stored in a plurality of server nodes. The foregoing techniques provide for synchronized updates of the various data stores in the plurality of server nodes.

[Targeted Banner Advertisements]

User query information may be used to influence the displays shown to the user by the browser 824. In addition to displaying matching categories or business listings, as depicted in FIG. 44, the information retrieval software 908 can be used to assist in selecting other information to be displayed to the user, based on the nature of the user's query.

In an embodiment of the invention, a banner ad 50 can be displayed to the user. Based on the user's query, the banner ad 50 may be targeted to characteristics of the user that are inferred from the user's query. For example, an advertiser might conclude that a user who has entered a query with the category "art supplies" is interested in art, so that an advertisement for an art show or related matter would be an appropriate banner ad 50. Banner ads 50 can also be targeted geographically, so that ads for businesses from a selected geographical area can be associated with search queries that include that geographical area as a search term. It should be understood that a system for targeting banner ads using user queries can use a range of information retrieval techniques, such as the Verity techniques described above in connection with processing of information retrieval requests using the term lists 836. However, in an embodiment, a separate banner ad retrieval program 909 is part of the query engine 862.

Figure 68:
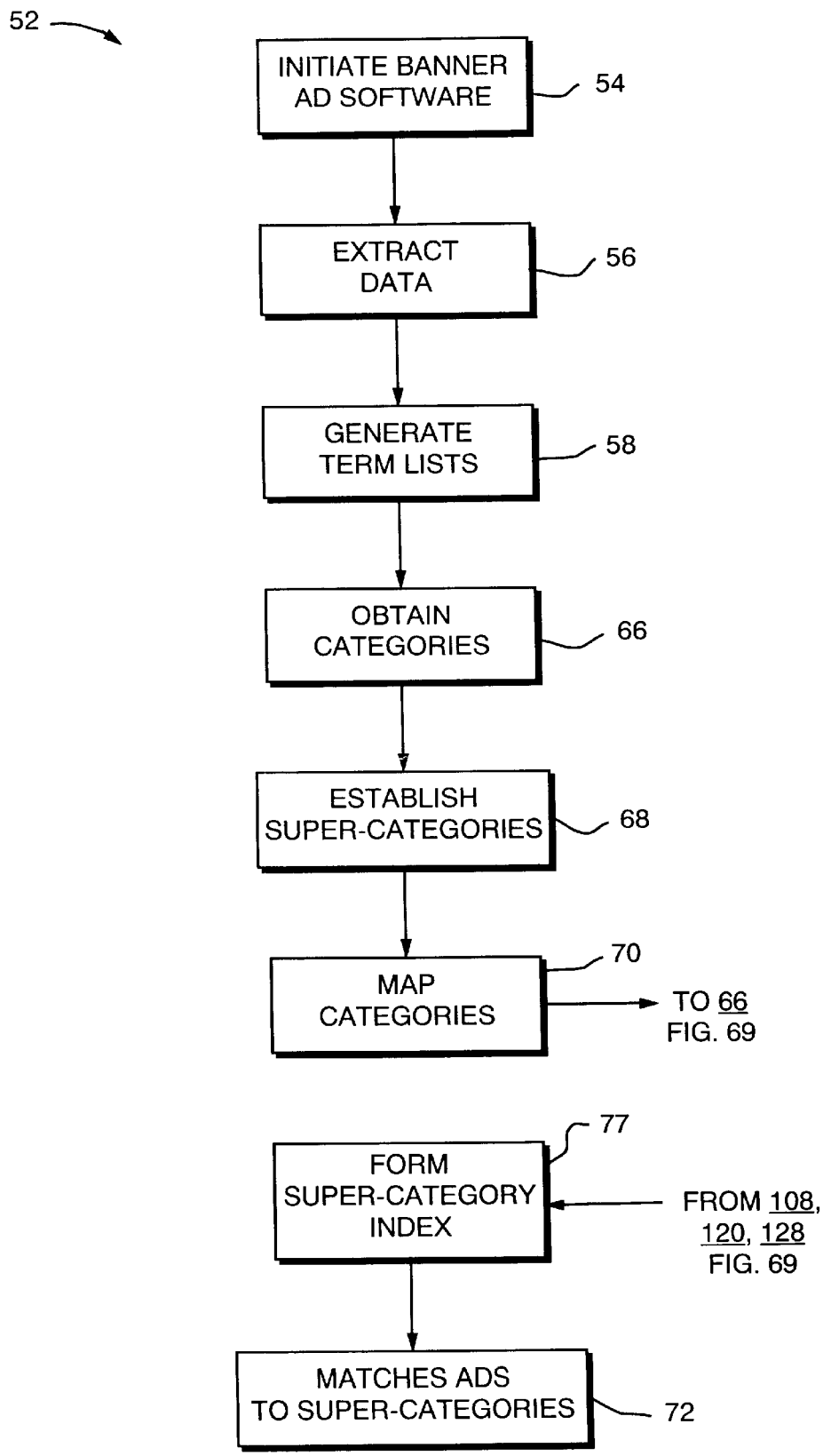
FIG. 68 is a flow chart setting forth method steps for establishing super-category term lists and for matching advertisements to super-categories, to assist in targeting an advertisement to a user of an on-line query tool.
Figure 69:
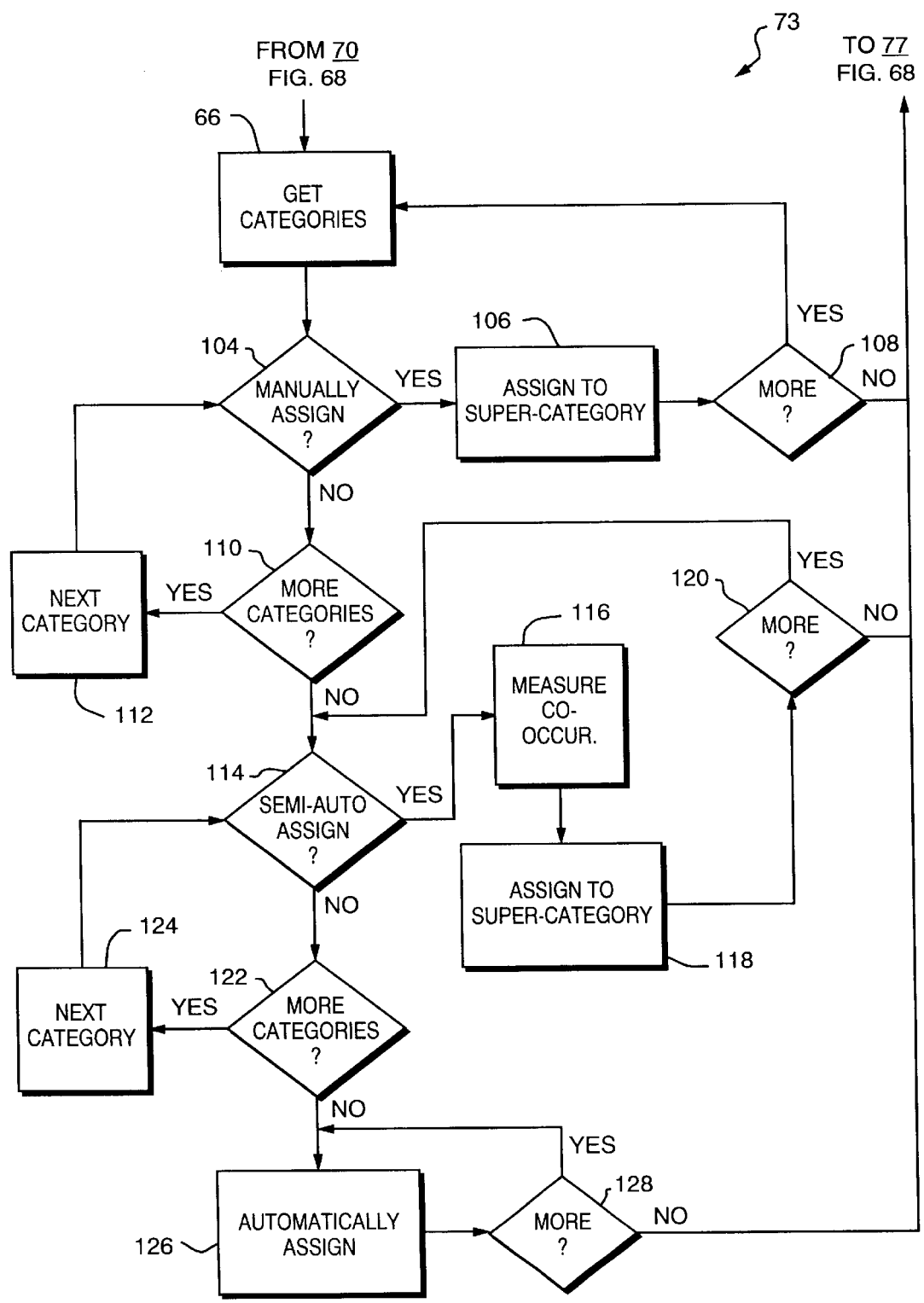
FIG. 69 is a flow chart setting forth method steps for mapping categories to super-categories.

Initialization steps that permit execution of a banner ad retrieval program 909 are set forth in a flow chart 52 on FIG. 68. Upon initialization, at a step 54, the system initiates the banner ad retrieval software 909. At a step 56, the banner ad retrieval software 909, in a manner similar to the information retrieval software 908, uses extraction routines to access markup language files and extract data. The banner ad retrieval software then generates banner ad term lists 837. At a step 66, the banner ad retrieval software retrieves a list of all yellow pages categories. In an embodiment, the categories are all of the available categories of business listings, such as all available yellow pages categories. Next, at a step 68, the system establishes a set of super-categories. The super-categories may consist of a sub-set of the categories, or other categories. The super-categories are preferably smaller in number than the categories, as the super-categories will be used to simply assignment of targeted banner ads to particular user queries and results of the queries. Next, the system may map categories to super categories in a step 70. The mapping at the step 70 many be a many-to-many mapping. A variety of techniques may be used to map categories to super-categories. One such technique uses a combination of automatic and manual mapping. Steps for accomplishing such a technique are set forth in a flow chart 73 depicted in FIG. 69. First, at a step 104, it is determined for a first yellow pages category whether the category is to be manually assigned. If so, then at a step 106 the category is assigned to a super-category. This may be accomplished by user input in a conventional form. Next, at a step 108, it is determined whether any unassigned categories remain. If at the step 108 additional categories remain, then control returns to the step 104, where it is determined whether the next category is to be manually assigned. If at the step 108 no categories remain to be assigned, then control is control is returned, as represented by off-page connector B, to the flow chart 52 of FIG. 68.

If at the step 104 it is determined that the category will not be assigned manually, then it is determined, at a step 110, whether there remain any additional categories to be assigned. If so, then at a step 112, the category is skipped and processing proceeds to the next category at the step 104. Thus, all categories that are to be assigned manually may be assigned prior to automatic assignment of categories.

If at the step 110 it is determined that no additional categories exist, then all categories to be assigned manually have been assigned, and control proceeds to a step 114, where the system returns to the first category that was not manually assigned, and it is determined whether the category will be assigned automatically based on the manual assignments. If at the step 114 it is determined that the category will be assigned automatically based on the manual assignments, then, at a step 116, the system may compare terms that appear in the category to terms that appear in each of the manually assigned categories. The system may thus obtain a ranking of the manually assigned categories in order of the degree of co-occurrence of terms. Next, at a step 118, the system may assign the same super-category as was assigned the highest-ranked of the manually assigned categories. Next, at a step 120, the system may determine whether there are any additional categories. If not, then control passes, as depicted by off-page connector B, to the flow chart 52 of FIG. 68. If additional categories remain, then control proceeds to the step 114 for the next category.

If at the step 114 for a particular category it is determined that a category will not be automatically assigned based on the manual assignments, then at a step 122 a determination is made whether additional categories remain to be assigned. If so, then at a step 124 processing skips to the next category and control is returned to the step 114 for the next category. Thus, after manual assignment of all categories that are to be manually assigned is complete at the steps 104 through 106, then all categories that are to be automatically assigned based on the manual assignments may be completed at the steps 115 through 118 before control proceeds to the step 126.

At the step 126, processing returns to the first remaining category that was not previously assigned. At a step 128 the system may determine certain statistics regarding the co-occurrence of terms between the category and one of the super-categories (perhaps also including the terms in the categories assigned to the super-categories). A variety of co-occurrence techniques can be used. At a step 130 the system may assign the category to the super-category for which the highest co-occurrence is found. At a step 132 it is determined whether additional categories remain to be assigned. If not, then control proceeds, represented by off-page connector B, to the flow chart 52 of FIG. 68. If so, then control proceeds to the step 126 for processing of the next un-assigned category. Although an embodiment of a technique for mapping categories to super-categories is disclosed herein, it should be understood that other techniques are available. For example, manual mapping could be executed after all automatic mapping is completed, or the system could rely entirely on automatic mapping.

Once control has returned to the flow chart 52 of FIG. 68, meaning that all yellow pages categories have been mapped to a super-category, at a step 77 the banner ad retrieval software 909 may index the various super-categories in a banner ad term list 837. The banner ad term list 837 may take the form of a linked list of the super-categories, with each element in the list consisting of all of the terms that appear in the super-category, as well as all of the terms that appear in each of the categories that was matched to the super-category. It should be understood that these terms may be expanded, as described in connection with FIG. 40 above, so that synonyms and related terms are also stored with each super-category element. Storage of these terms may be in a hierarchical structure that is capable of execution using PHTML scripts or similar techniques.

Next, at a step 72 the system may match one or more banner advertisements to each super-category. Thus, if that super-category is found to be the appropriate super-category, the matching banner ad or ads will be displayed.

At any time after initialization of the system, the system may generate a banner ad for display to the user. The banner ads may be stored on a server, which in an embodiment is a separate banner ad server 809. Depending on the desires of the host, the banner ads may be either conventional banner ads or targeted banner ads. In the case of conventional banner ads, the banner ad server 809 may store the banner ads in a conventional manner and cycle between different ads according to a predetermined routine, such as a round-robin routine, so that when the system calls for a banner ad (such as via an appropriate URL for the banner ad server), the current banner ad is sent to the front end server 804 for further processing and display to the user in a banner on the user's browser 824.

Figure 70:
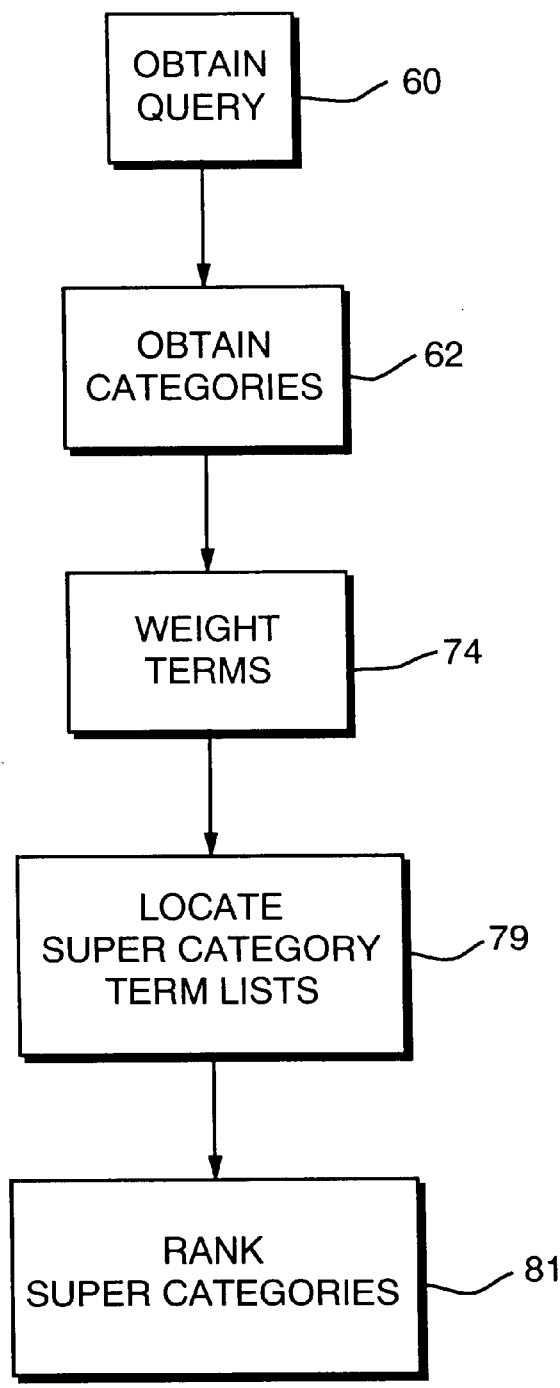
FIG. 70 is a flow chart setting forth method steps for executing a modified query in an on-line query tool designed to assist in targeting an advertisement to a user of an on-line query tool.

If a targeted banner ad is desired, then the banner ad retrieval software 909 may be initiated. Steps that may accomplished by an embodiment of the banner ad retrieval software 909 are depicted in a flow chart 132 as shown in FIG. 70. First, at a step 60, the banner ad retrieval software 909 obtains the user's query. Next, at a step 62, the banner ad retrieval software obtains the categories that match the user's query. These categories may be the categories that are obtained by the information retrieval software 909 in response to a user query. For example, if the user enters a query for "art supplies," as depicted in FIG. 43, the user might retrieve a list of matching categories, such as the eight matching categories depicted in FIG. 44. In an embodiment, the categories are those that were displayed as a results page in the flow chart 88 at the step 102 in FIG. 41. That is, the categories are yellow pages categories of each of the business listings retrieved in the information retrieval query that was executed by the system.

Once a list of categories is obtained at the step 62, a variety of techniques could in theory be used to identify a banner ad for the category. For example, an advertisement could be assigned to each category. Thus, referring to FIG. 44, the category "Arts & Crafts" could be assigned a particular banner ad (or set of scrolling banner ads), while the category "Artists Materials & Supplies" could be assigned a different banner ad or ads. This approach presents a number of problems. First, the number of actual yellow pages categories is very large, more than seventeen thousand in an embodiment of the system disclosed herein, so that the process of assigning ads to categories on a one-to-one basis would be extremely time consuming and laborious. Also, because advertisements often include time-sensitive material, they are changed frequently, meaning that the ongoing process of assigning ads to category could be very difficult. Since many of the categories are quite similar to each other, as in the above example of "Arts & Crafts" and "Artists Materials & Supplies" it is instead preferable to assign ads to super-categories, as was disclosed in connection with FIG. 68.

Another problem with an approach of matching advertisements directly to categories is that additional information about the user's preferences may be available from the user query. A system that relies only on the categories ignores any information from the user query that might permit further refinement of the advertisement selection.

Referring to FIG. 70, once the banner ad retrieval software 909 has obtained the terms in the user query and the terms in each of the matching categories, the terms may be weighted or normalized by the number of occurrences of the terms and the number of listings in which a term occurs in a step 74.

Next, at a step 79, the banner ad retrieval software 909 may locate the particular terms that appear in the user query and in the categories obtained at the steps 60 and 62 in the banner ad term lists 837. Location of a relevant term list 837 may be accomplished through use of a table of pointers or other conventional technique. In the case of use of a table, the argument of the table may consist of a tokenized version of the term and the table may point to the location of the linked term list 837 for that term in the database that stores the banner ad term lists 837.

Figure 71:
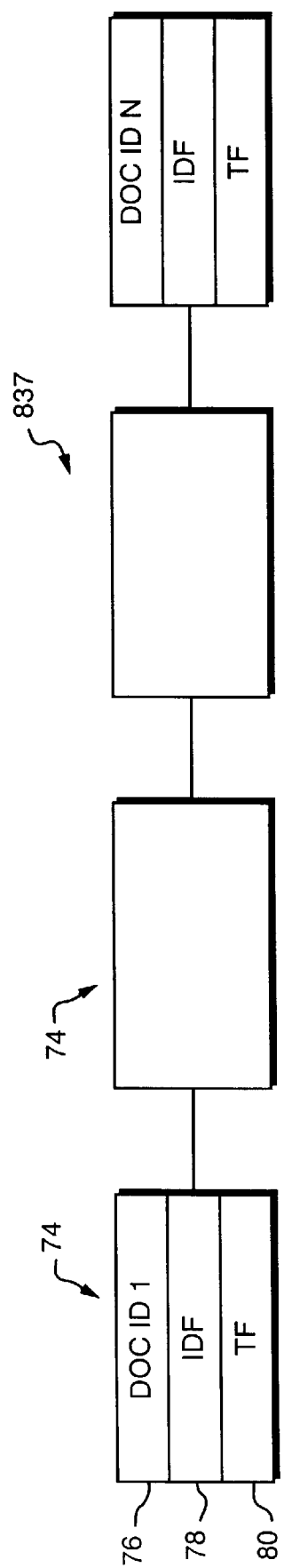
FIG. 71 is a diagram showing an example of a linked super-category term list.

Referring to FIG. 71, a structure for a linked banner ad term list 837 is depicted, in which a linked list of super-categories is depicted. One linked list may be established for each term that appears in a user's query or in a category, such as a yellow pages category, retrieved by the information retrieval software 909. Thus, for a given term, such as "restaurant," a linked list 837 of super-categories was established at the initialization step 77 depicted in the flow chart 52 of FIG. 68. The linked list may link elements 74, with each element 74 corresponding to a document (a document in this case consisting of all of the words in a particular super-category, plus all words in the categories mapped to the super-category) that includes the term. The elements 74 may include sub-elements, including a document identifier 76 for identifying the category and certain statistics regarding the document, including the term frequency 78, TF, which indicates the number of times the term appears in the document, and the inverse document frequency 80, IDF, which indicates the inverse of the number of times the term appears in the entire set of documents that are being searched.

From the table of linked lists of super-category terms established in the step 77, the banner ad retrieval software 909 may at a step 81 rank the super-categories. In particular, the system at the step 81 may rank the documents, i.e., the super-categories, according to the appearance of the words occurring in the user query and in the categories.

The ranking may be performed by a variety of techniques. One such technique obtains a number for each term that appears in the user query and in the categories that consists of the product of the term frequency for that term and the inverse document frequency for that term. The sum of all the resulting numbers may be calculated for all super-categories, and the super-category with the highest sum may be the highest ranked document. The banner ad that was assigned to that highest ranked super-category at the step 72 of the flow chart 52 can then be displayed upon completion of the ranking step 81 of the flow chart 132.

Other techniques for weighting may also be used. For example, if a term is a high frequency term, it may not make much difference in logical significance whether the term occurs, for example, one thousand times, in the search, or whether the term occurs one million times. In order to collapse the significance of such high frequency terms, it may be desirable to use the a logarithm or related measure of the term frequency and the inverse document frequency, rather than the raw numbers. Thus, the inverse document frequency may be defined as:

$IDF = \log (N - IDF_r)/\log (N)$ where N is the number of documents in the document set and IDF is raw inverse document frequency number. Similarly, a statistic can be used to determine the term frequency, TF. A statistic known as Robertson's term frequency for a document is defined as follows:

$RTF = TF/((TF + 0.5 + 1.5(DL/ADL))$ where TF is the raw frequency of a term in a document, DL is the length of the document, and ADL is the average length of a document in the search.

These statistics may be further improved by weighting other factors. For example, it is possible to weight each term that appears in one of the categories that is retrieved upon execution of a user query and to normalize the IDF and RTF statistics over the weights. Thus, if a particular category deserves a higher weight, then it might be accorded higher weight in ranking super-categories. For example, a category that is manually mapped to a super-category might be given a higher weight than a category that is automatically mapped. The user query might be given a higher or lower weight, than other information. Categories with a large number of listings may be given higher weight. In an embodiment, each category is given a weight corresponding to the number of listings that are associated with the category, normalized by dividing the total number of listings. In an embodiment, the user query terms are each given a weight of one. In the weighting process, the weight may be multiplied by the term element in performing the sum of the product of term frequency and inverse document frequency over all terms for all documents in the super-category linked list. Thus, with the weights, a normalized version of the Robertson's term frequency statistic can be obtained, permitting improved tuning of search queries beyond what is accomplished with use of the conventional Robertson's term frequency.

Upon completion of the ranking step 81, the highest ranked super-category is selected, and a banner ad that was assigned to that super-category at the step 72 of the flow chart 52 of FIG. 68 is selected. The banner ad may be retrieved, such as via a URL, from the banner ad server 809, for display to the user via the browser 824.

While the invention has been disclosed in connection with the preferred embodiments shown and described in detail, various modifications and improvements thereon will become readily apparent to those skilled in the art. Accordingly, the spirit and scope of the present invention is to be limited only by the following claims.

What is claimed is:

1. A method executed in a computer system for performing a data transfer comprising:

selecting data to be transferred from a first location to a second location in which the data includes a text portion and a non-text portion;

transferring the text portion using a first data channel from the first location to the second location storing the text portion in a temporary location; and transferring the non-text portion using a second data channel from the first location to the second location, and wherein said transferring of the text portion and said transferring of said non-text portion are performed asynchronously, and initially the text and non-text portions are copied to a temporary location, and then merged with other data from another data transfer.

2. A method of performing a data transfer comprising:

selecting an advertising page to be transferred from a first location to a second location, advertising data of said advertising page being represented by a relational mapping table describing the relationship between data entities associated with said advertising data, and a data table including the advertising data represented by said relational mapping table, said relational mapping table including only text data and said data table including text and multi-media data;

transferring the text data of said relational mapping table using a first communication channel to a temporary relational mapping table located at the second location;

transferring the text data of said data table to a temporary table located at the second location;

transferring the multimedia data to a repository at the second location; said repository being at a location which includes other multimedia data from other data transfer operations associated with other advertising pages;

merging said temporary data table into another data table by copying the text data from said temporary data table to the other table at said second location;

for each entry of said temporary data table, identifying a matching entry in said repository in which a global identifier of said temporary data table matches a corresponding global identifier of said repository; and copying a repository identifier of said matching entry from said repository to said entry in said other data table; said repository identifier being a pointer to the multimedia data located in said repository and being a link between an associated entry in said other data table describing said matching entry in said repository.

3. The method of claim 2, wherein said transferring of the text data and said transferring of the multimedia data are performed asynchronously.

4. The method of claim 3, wherein the advertising data transferred from the first to the second location is merged after all portions of the advertising data are at the second location.

5. The method of claim 4, wherein, merging data at said second location includes:

transferring text data from said temporary relational mapping table to a second relational mapping table at said second location, said second relational mapping table including other text data associated with a previous data transfer.

6. The method of claim 2, wherein said merging said temporary data table into another data table, said identifying a matching entry in said repository, and said copying a repository identifier are performed as part of a data merging process after the data transfer has been successfully completed.

7. A computer program product for publishing advertisement data comprising:

a sending component that divides the advertisement data into one or more portions, each of said portions having a corresponding data type, said one or more portions have a relationship that is indicated in a relational mapping table describing the relationship between one or more data entities included in an advertisement page;

first communication means for transferring portions of an advertisement page having corresponding data entities included in the advertisement data of a first data type;

second communication means for transferring portions of an advertisement page having corresponding data entities included in the advertisement data of a second data type; and a receiving component that includes machine executable code to integrate and assemble said one or more portions of data in accordance with said relational mapping table;

wherein said first communication means is used to transfer text data and said second communication means is used to transfer non-text data.

8. The computer program product of claim 7, wherein said non-text data includes at least one of: a machine executable program, image data, byte code, graphics data, audio data.

9. A computer program product for publishing advertisement data comprising:

a sending component that divides the advertisement data into one or more portions, each of said portions having a corresponding data type, said one or more portions have a relationship that is indicated in a relational mapping table describing the relationship between one or more data entities included in an advertisement page;

first communication means for transferring portions of an advertisement page having corresponding data entities included in the advertisement data of a first data type;

second communication means for transferring portions of an advertisement page having corresponding data entities included in the advertisement data of a second data type; and a receiving component that includes machine executable code to integrate and assemble said one or more portions of data in accordance with said relational mapping table;

wherein said sending component and said receiving component are used to transfer data between a first database and a second database.

10. A computer program product for publishing advertisement data comprising:

a sending component that divides the advertisement data into one or more portions, each of said portions having a corresponding data type, said one or more portions have a relationship that is indicated in a relational mapping table describing the relationship between one or more data entities included in an advertisement page;

first communication means for transferring portions of an advertisement page having corresponding data entities included in the advertisement data of a text data type;

second communication means for transferring portions of an advertisement page having corresponding data entities included in the advertisement data of a non-text data type; and a receiving component that includes machine executable code to integrate and assemble said one or more portions of data in accordance with said relational mapping table;

wherein said first communication means is optimized for structured data transfers and said second communication means is optimized for multimedia data transfers.

11. A computer program product for publishing advertisement data comprising:

a sending component that divides the advertisement data into one or more portions, each of said portions having a corresponding data type, said one or more portions have a relationship that is indicated in a relational mapping table describing the relationship between one or more data entities included, in an advertisement page, said sending component further including machine executable code for assigning transient tags to non-text portions of said advertisement page;

first communication means for transferring portions of an advertisement page having corresponding data entities included in the advertisement data of a first data type;

second communication means for transferring portions of an advertisement page having corresponding data entities included in the advertisement data of a second data type; and a receiving component that includes machine executable code to integrate and assemble said one or more portions of data in accordance with said relational mapping table and machine executable code for replacing said transient tags with persistent unique tags as part;

wherein said sending component and said receiving component are asynchronous transfer processes.

12. A computer program product for performing a data transfer comprising:

means for selecting data to be transferred from a first location to a second location in which the data includes a text portion and a non-text portion;

means for transferring the text portion using a first data channel from the first location to the second location storing the text portion in a temporary location; and means for transferring the non-text portion using a second data channel from the first location to the second location, and wherein said transferring of the text portion and said transferring of the non-text portion are performed asynchronously, and initially the text and non-text portions are copied to a temporary location and then merged with other data from another data transfer means for assembling the text portion and non-text portion at said second location in an advertising page in which said text portion and said non-text portion have a hierarchical relationship in said advertising page.

13. The computer program product of claim 12 wherein said data that is transferred is advertising data that is published.

14. A computer program product for performing a data transfer comprising:

machine executable code for selecting an advertising page to be transferred from a first location to a second location, advertising data of said advertising page being represented as a relational mapping table describing the relationship between data entities associated with said advertising data, and a data table including the advertising data represented by said relational mapping table, said relational mapping table including only text data and said data table including text and multimedia data;

machine executable code for transferring the text data of said relational mapping table using a first communication channel to a temporary relational mapping table located at the second location;

machine executable code for transferring the text data of said data table to a temporary data table located at the second location;

machine executable code for transferring the multimedia data to a repository at the second location, said repository being a location which includes other multimedia data from other data transfer operations associated with other advertising pages;

machine executable code for merging said temporary data table into another data table by copying the text data from said temporary data table to the other data table at said second location;

machine executable code for identifying a matching entry in said repository for each entry of said temporary data table, in which a global identifier of said temporary data table matches a corresponding global identifier of said repository; and machine executable code for copying a repository identifier of said matching entry from said repository to said entry in said other data table, said repository identifier being a pointer to the multimedia data located in the repository and being a link between an associated entry in said other data table describing said matching entry in said repository.

15. The computer program product of claim 14, wherein the advertising data transferred from the first to the second location is merged after all portions of the advertising data are at the second location.

16. The computer program product of claim 15, further including:

machine executable code for transferring text data from said temporary relational mapping table to a second relational mapping table at said second location, said second relational mapping table including other text data associated with a previous data transfer.

17. A method for publishing advertisement data comprising:

dividing the advertisement data into one or more portions, each of said portions having a corresponding data type, said one or more portions have a relationship that is indicated in a relational mapping table describing the relationship between one or more data entities included in an advertisement page;

transferring portions of an advertisement page having corresponding data entities included in the advertisement data of a first data type using a first communication means;

transferring portions of an advertisement page having corresponding data entities included in the advertisement data of a second data type using a second communication means; and integrating and assembling said one or more portions of data in accordance with said relational mapping table.

18. The method of claim 17, wherein said first communication means is used to transfer text data and said second communication means is used to transfer non-text data.

19. The method of claim 17, wherein said non-text data includes at least one of: a machine executable program, image data, byte code, graphics data, audio data.

20. A method for publishing advertisement data comprising:

dividing the advertisement data into one or more portions, each of said portions having a corresponding data type, said one or more portions have a relationship that is indicated in a relational mapping table describing the relationship between one or more data entries included in an advertisement page;

transferring portions of an advertisement page having corresponding data entries included in the advertisement data of a text data type using a first communications means;

transferring portions of an advertisement page having corresponding data entries included in the advertisement data of a non-text data type using a second communications means; and integrating and assembling one or more portions of data in accordance with said relational mapping table;

wherein said first communication means is optimized for structured data transfers and said second communication means is optimized for multimedia data transfers.

* * * * *